US 8,888,636 B2

(12) United States Patent
Ikegami et al.

(10) Patent No.: US 8,888,636 B2
(45) Date of Patent: Nov. 18, 2014

(54) POWER OUTPUT APPARATUS

(75) Inventors: Takefumi Ikegami, Saitama (JP);
Noriyuki Abe, Saitama (JP); Shigeru Koyama, Saitama (JP); Atsuhiro Sakai, Saitama (JP); Shinji Fujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1400 days.

(21) Appl. No.: 12/621,929

(22) Filed: Nov. 19, 2009

(65) Prior Publication Data

US 2010/0125020 A1    May 20, 2010

(30) Foreign Application Priority Data

Nov. 19, 2008  (JP) .................................. 2008-296011
Mar. 2, 2009   (JP) .................................. 2009-048074
Oct. 26, 2009  (JP) .................................. 2009-245770

(51) Int. Cl.
| | |
|---|---|
| *F16H 3/72* | (2006.01) |
| *B60K 6/48* | (2007.10) |
| *B60K 6/365* | (2007.10) |
| *B60K 6/547* | (2007.10) |
| *F16H 3/00* | (2006.01) |

(52) U.S. Cl.
CPC ................ *B60K 6/547* (2013.01); *F16H 3/725* (2013.01); *B60K 6/48* (2013.01); *F16H 3/006* (2013.01); *Y02T 10/6221* (2013.01); *B60K 6/365* (2013.01)
USPC ............... 475/5; 475/207; 475/208; 475/218; 74/329; 74/330; 74/340

(58) Field of Classification Search
USPC ......... 475/5, 207, 208, 218; 74/329, 330, 340
See application file for complete search history.

(56) References Cited

U.S. PATENT DOCUMENTS

| 6,558,283    B1 | 5/2003 | Schnelle |
|---|---|---|
| 2001/0022245 A1 | 9/2001 | Rogg |

(Continued)

FOREIGN PATENT DOCUMENTS

| DE | 19945474 A1 | 4/2000 |
|---|---|---|
| EP | 1209017 A2 | 5/2002 |

(Continued)

OTHER PUBLICATIONS

Japanese Office Action dated Jan. 15, 2013, issued in corresponding Japanese Patent Application No. 2009-048074.

(Continued)

*Primary Examiner* — Derek D Knight
(74) *Attorney, Agent, or Firm* — Westerman, Hattori, Daniels & Adrian, LLP

(57) ABSTRACT

A power output apparatus 1 to 1D including an engine 6, a motor 7, and a transmission 20 to 20D having two transmission shafts connected to the engine 6 is provided. The transmission includes a power combination mechanism 30 adapted so as to be able to rotate first to third elements differentially from each other. The first element is connected to any one of the two transmission shafts, the second element is connected to a driving shaft 9 or 9, and the third element is connected to the motor 7. The second element combines the power transmitted from the first element and the power transmitted from the third element, and transmits the combined power to the driving shaft 9 and 9. The other transmission shaft of the two transmission shafts transmits power to the driving shaft 9 or 9 without going via the power combination mechanism 30.

54 Claims, 45 Drawing Sheets

(56) References Cited

U.S. PATENT DOCUMENTS

| | | |
|---|---|---|
| 2004/0251064 A1 | 12/2004 | Imai |
| 2006/0142104 A1 | 6/2006 | Saller |
| 2008/0009379 A1 | 1/2008 | Steinwender |
| 2008/0236917 A1* | 10/2008 | Abe et al. ............... 180/65.4 |
| 2009/0011887 A1* | 1/2009 | Komada et al. ............ 475/5 |

FOREIGN PATENT DOCUMENTS

| | | |
|---|---|---|
| JP | 2000-156903 A | 6/2000 |
| JP | 2002-165304 A | 6/2002 |
| JP | 2007-290677 A | 11/2007 |
| JP | 2008-273469 A | 11/2008 |
| JP | 2010-149840 A | 7/2010 |
| WO | 2008-046185 A1 | 4/2008 |

OTHER PUBLICATIONS

Japanese Office Action dated Nov. 2, 2010, issued in corresponding Japanese Patent Application No. 2009-245770.

Japanese Office Action dated Dec. 11, 2012, issued in corresponding Japanese Patent Application No. 2011-050600 (3 pages).

European Search Report dated Feb. 16, 2010, issued in corresponding European Patent Application No. 09176538.8.

* cited by examiner

<LOW MODE STOP>

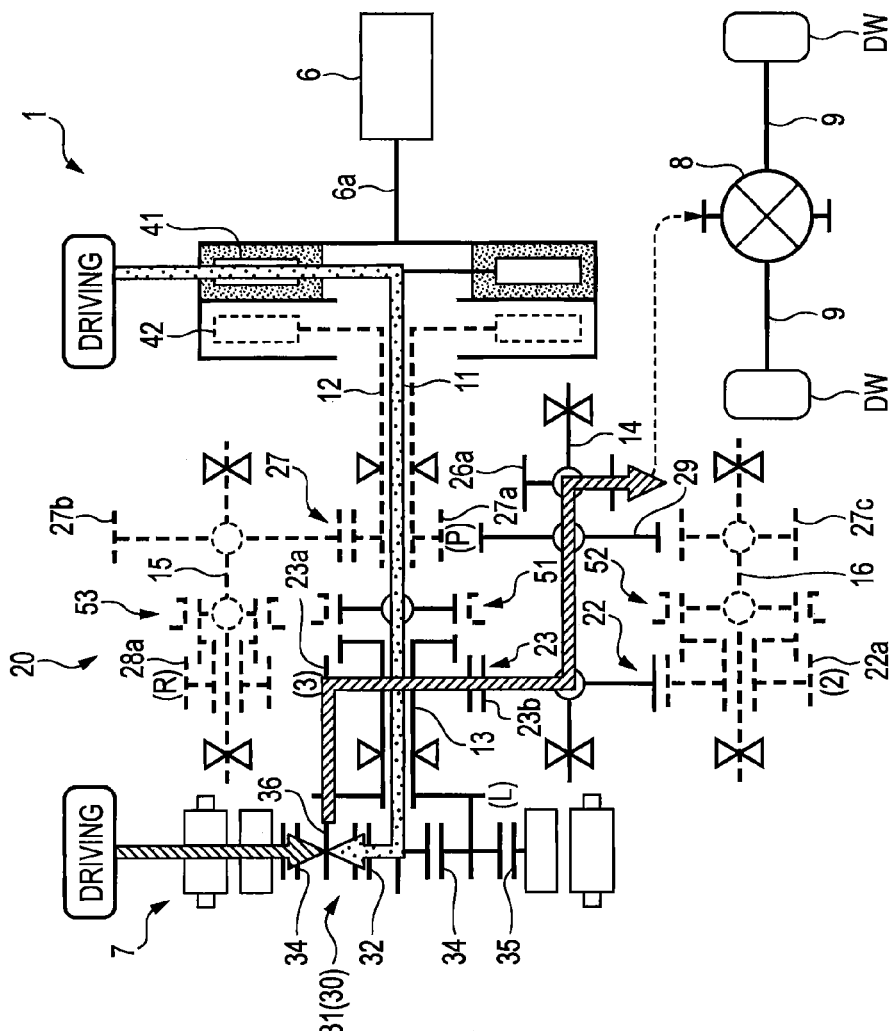
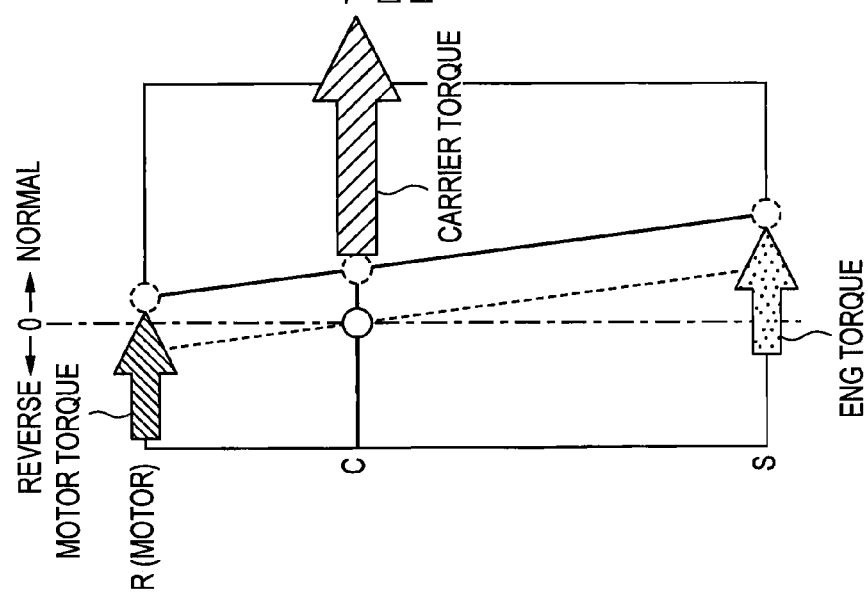

<LOW MODE ACCELERATION PATTERN>

<LOW Pre2 MODE>

<2ND MODE>

FIG. 8A

FIG. 8B
<FIRST MODE OF 2ND TRAVELING, ASSISTING>

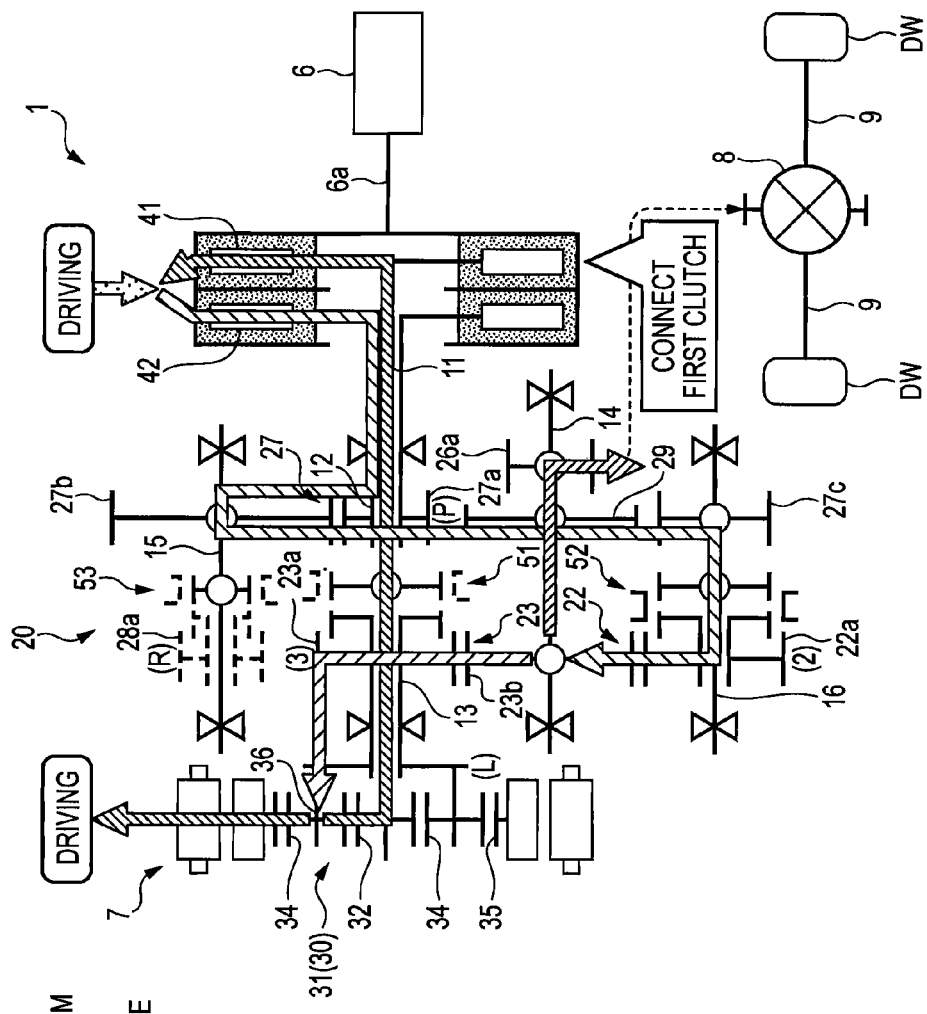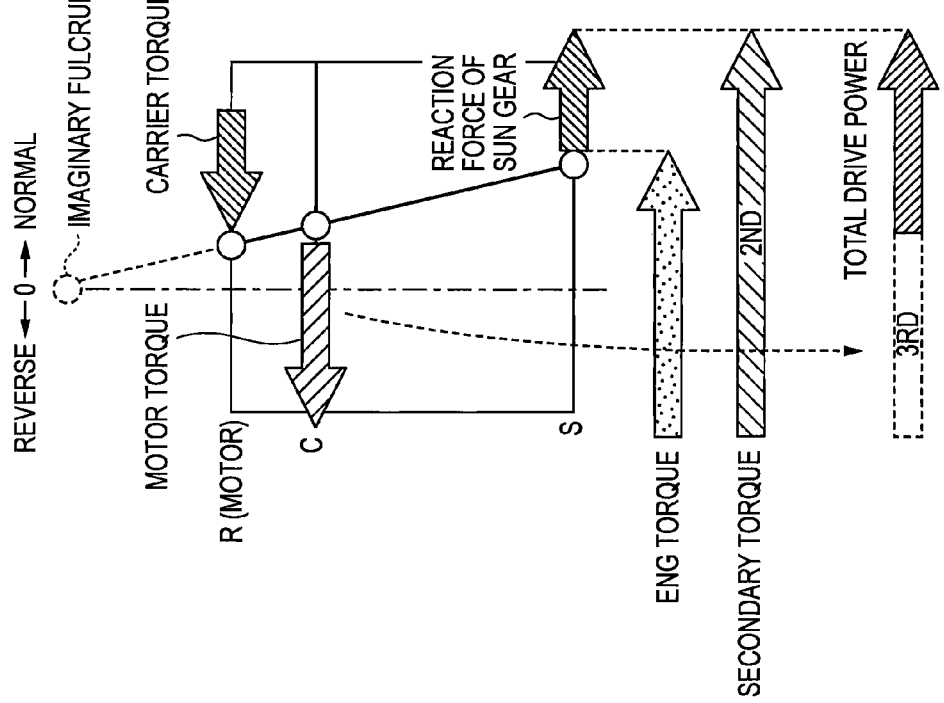

<SECOND MODE OF 2ND TRAVELING, ASSISTING>

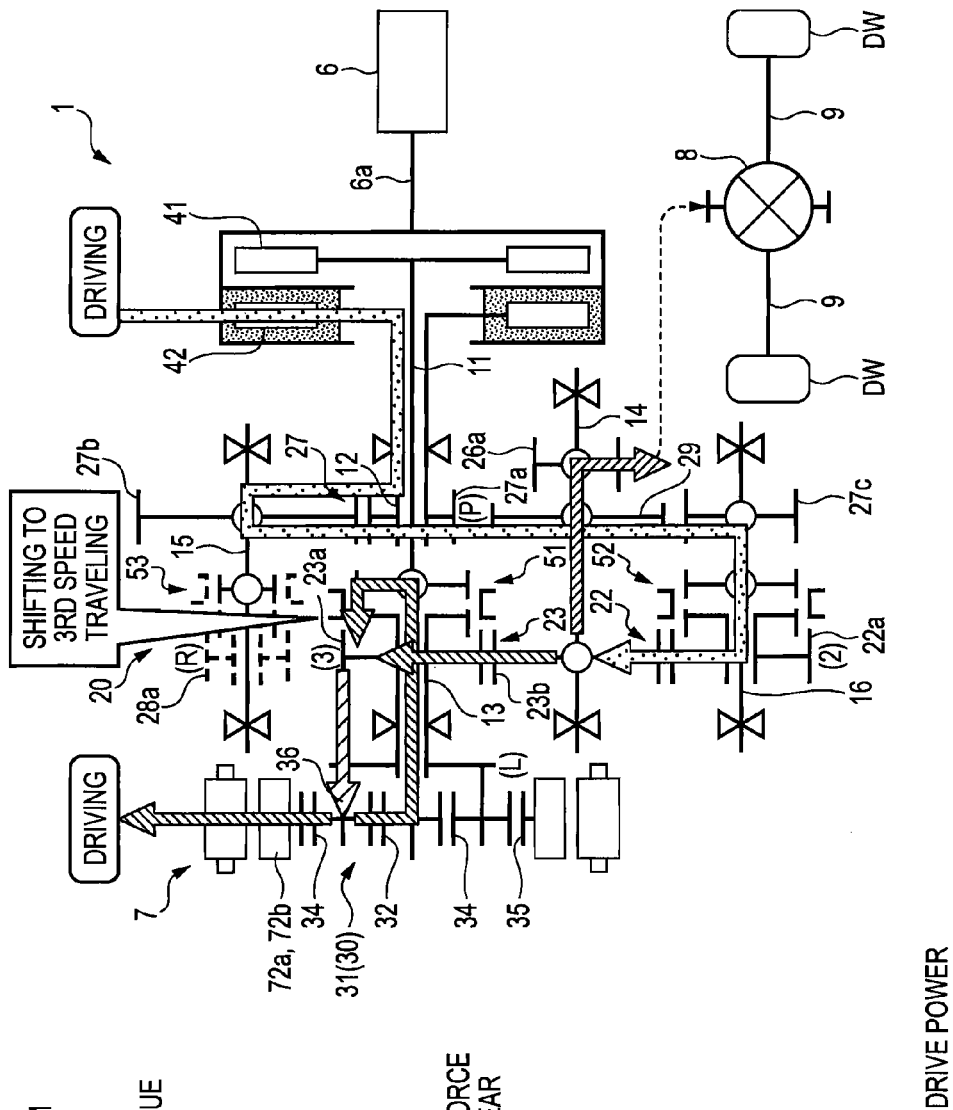
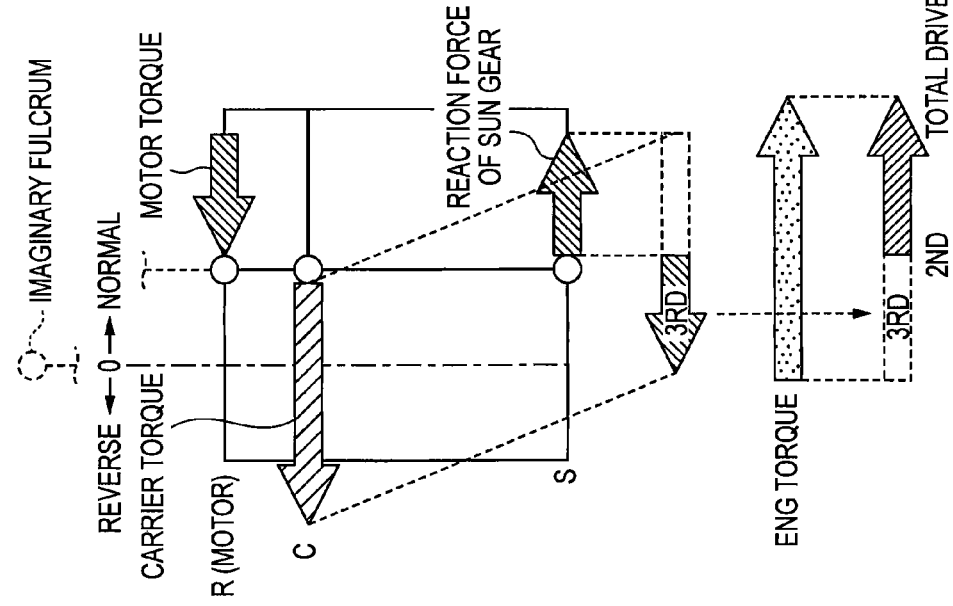

FIG. 12A  <2ND Pre3 MODE>
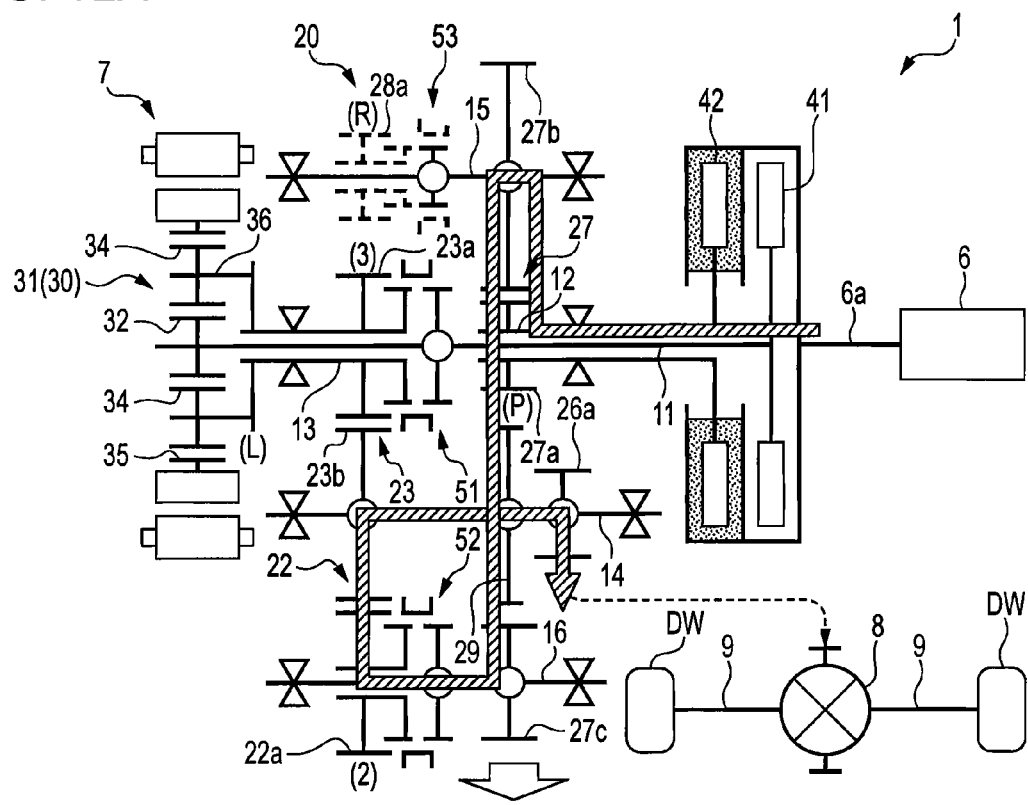
FIG. 12B  <3RD Post2 MODE>
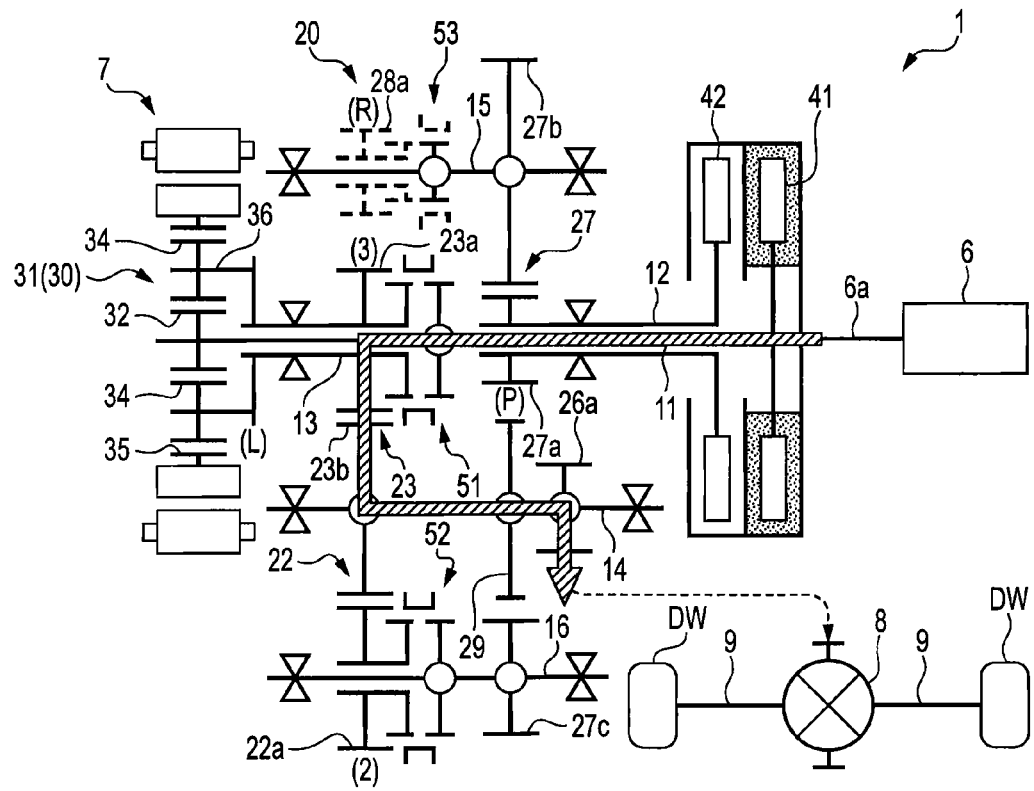

<FIRST MODE OF 3RD TRAVELING, ASSISTING>

<FIRST MODE OF 3RD TRAVELING, CHARGING>

<FIRST MODE OF MOTOR TRAVELING>

<FIRST START MODE OF MOTOR TRAVELING>

<SECOND START MODE OF MOTOR TRAVELING>

FIG. 18A
FIG. 18B
<ENGINE START DURING STOP>
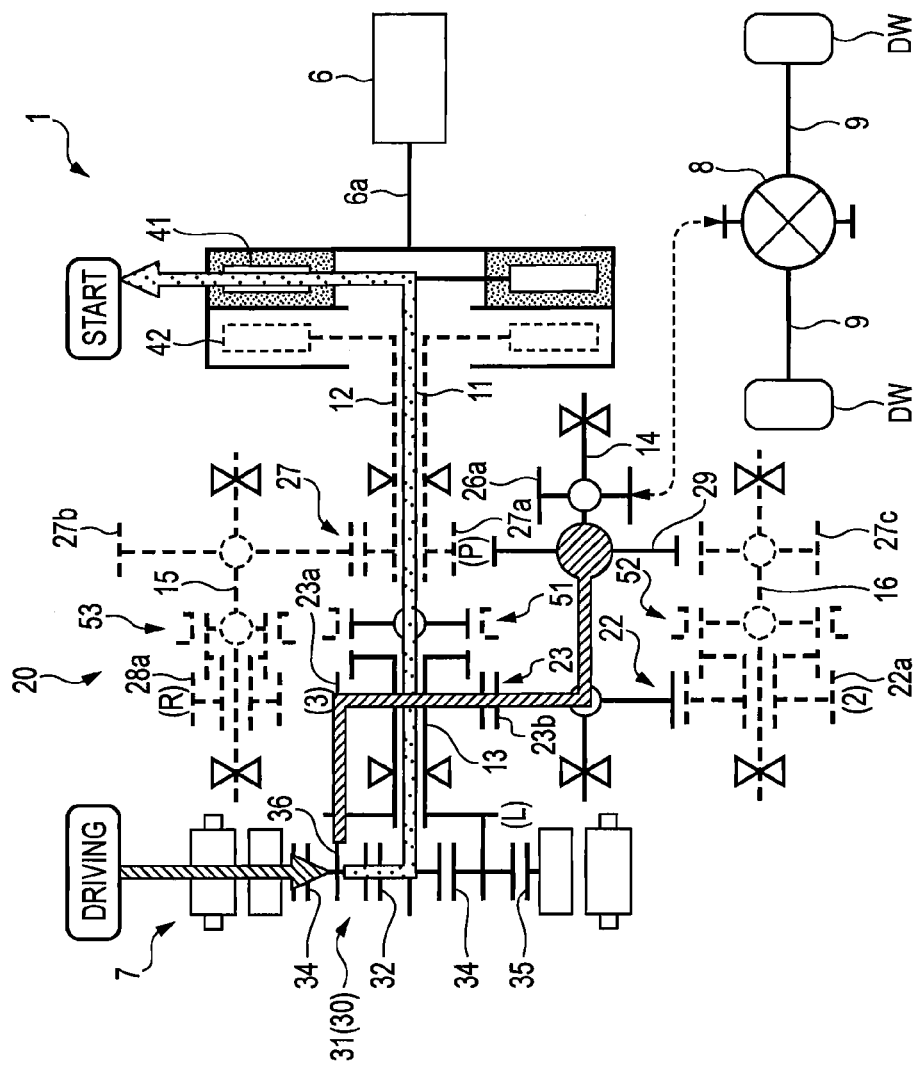
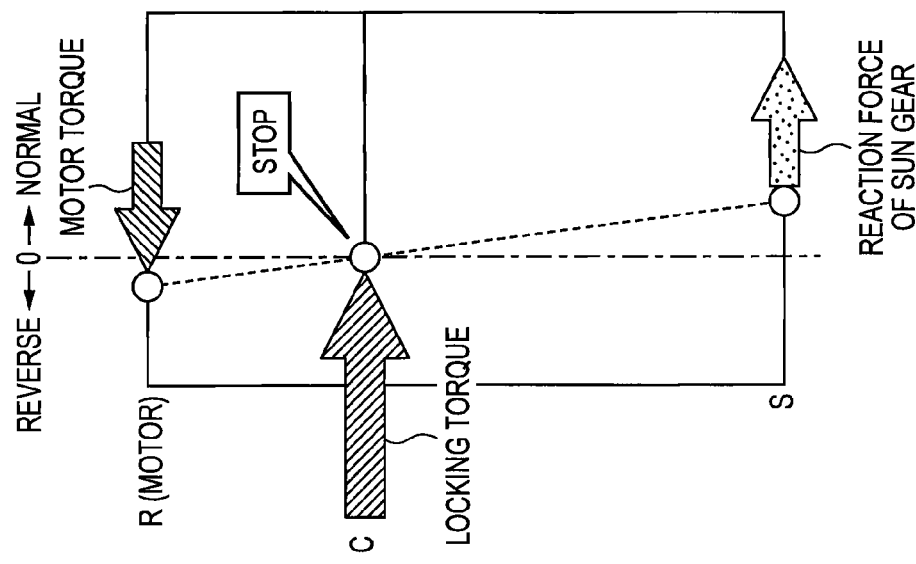

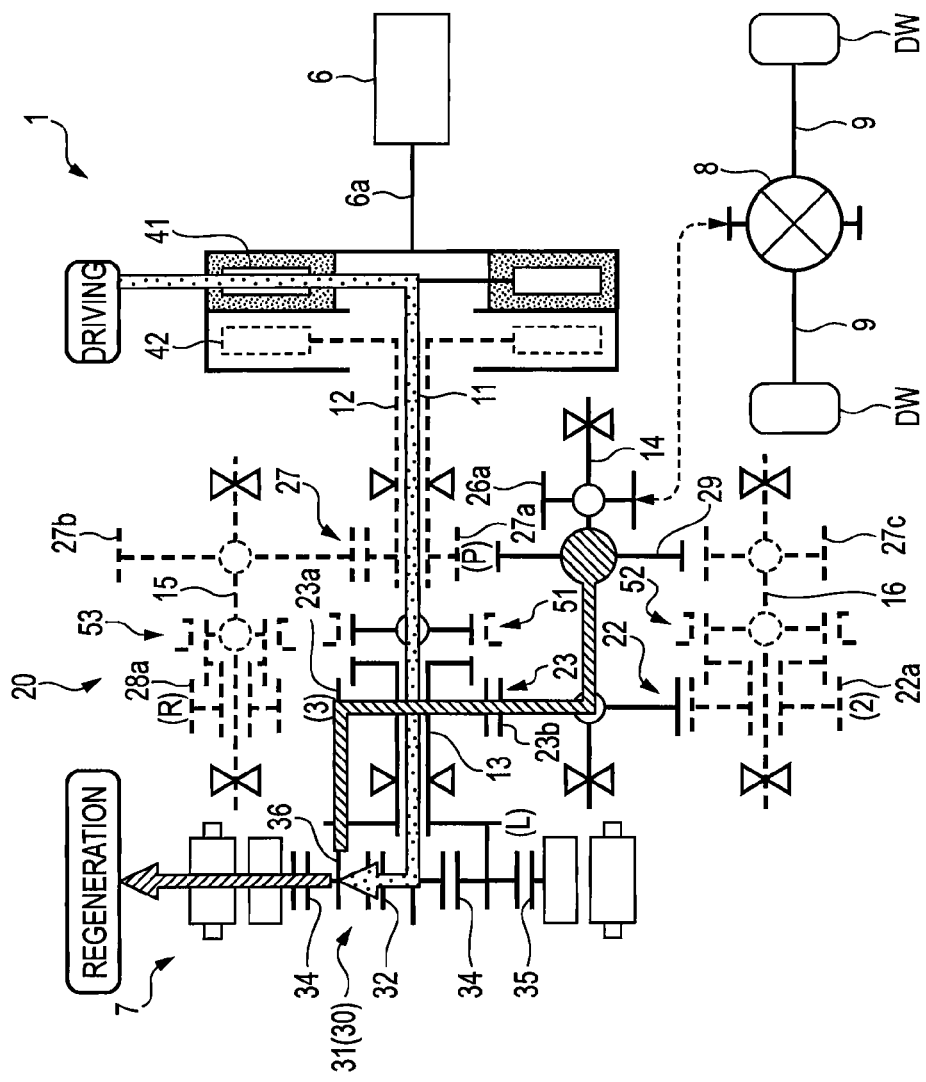
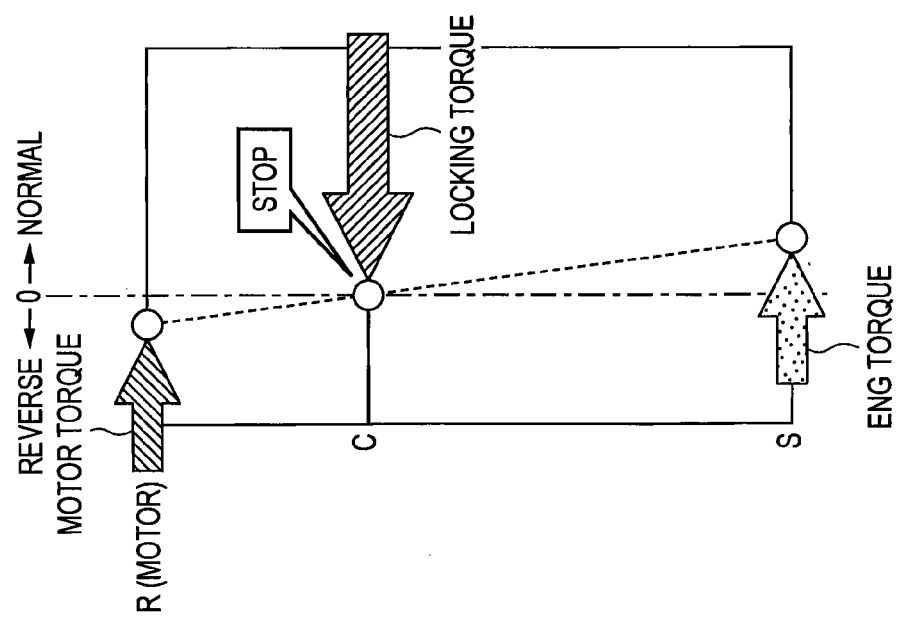

FIG. 20

| VEHICLE STATE | | CLUTCH | | SPEED CHANGE SHIFTER | | MOTOR | | | ENGINE |
|---|---|---|---|---|---|---|---|---|---|
| FUNCTION | MODE | 1ST | 2ND | 1ST | 2ND | ROTATIONAL DIRECTION | TORQUE APPLICATION DIRECTION | STATE | |
| TORQUE COMBINATION DRIVING | LOW | ● | | - | - | REVERSE | NORMAL | CHARGING | DRIVING |
| | | ● | | - | - | NORMAL | NORMAL | DRIVING | DRIVING |
| | LOW Pre2 | ● | | - | 2 | REVERSE | NORMAL | CHARGING | DRIVING |
| | | ● | | - | 2 | NORMAL | NORMAL | DRIVING | DRIVING |
| NORMAL DRIVING | 2ND | | ● | - | 2 | X | X | X | O |
| | | ● | ● | - | 2 | NORMAL | NORMAL | DRIVING | O |
| | | ● | ● | - | 2 | NORMAL | REVERSE | CHARGING | O |
| | 2ND Pre3 | | ● | 3 | 2 | NORMAL | NORMAL | DRIVING | O |
| | | | ● | 3 | 2 | NORMAL | REVERSE | CHARGING | O |
| | 3RD Post2 | ● | | 3 | 2 | NORMAL | NORMAL | DRIVING | O |
| | | ● | | 3 | 2 | NORMAL | REVERSE | CHARGING | O |
| | 3RD | ● | | 3 | - | NORMAL | NORMAL | DRIVING | O |
| | | ● | | 3 | - | NORMAL | REVERSE | CHARGING | O |
| MOTOR TRAVELING | (3RD) | | | 3 | - | NORMAL | NORMAL | DRIVING | |
| | | | | 3 | - | NORMAL | REVERSE | REGENERATION | |
| ENGINE START IN MOTOR | (3RD) | ● | | 3 | - | NORMAL | NORMAL | DRIVING | START |
| | | | ● | 3 | 2 | NORMAL | NORMAL | DRIVING | START |
| PARKING | ENGINE START | ● | | - | - | REVERSE | REVERSE | DRIVING | START |
| | GENERATION | ● | | - | - | REVERSE | NORMAL | CHARGING | O |

<THIRD MODE OF 2ND TRAVELING, ASSISTING>

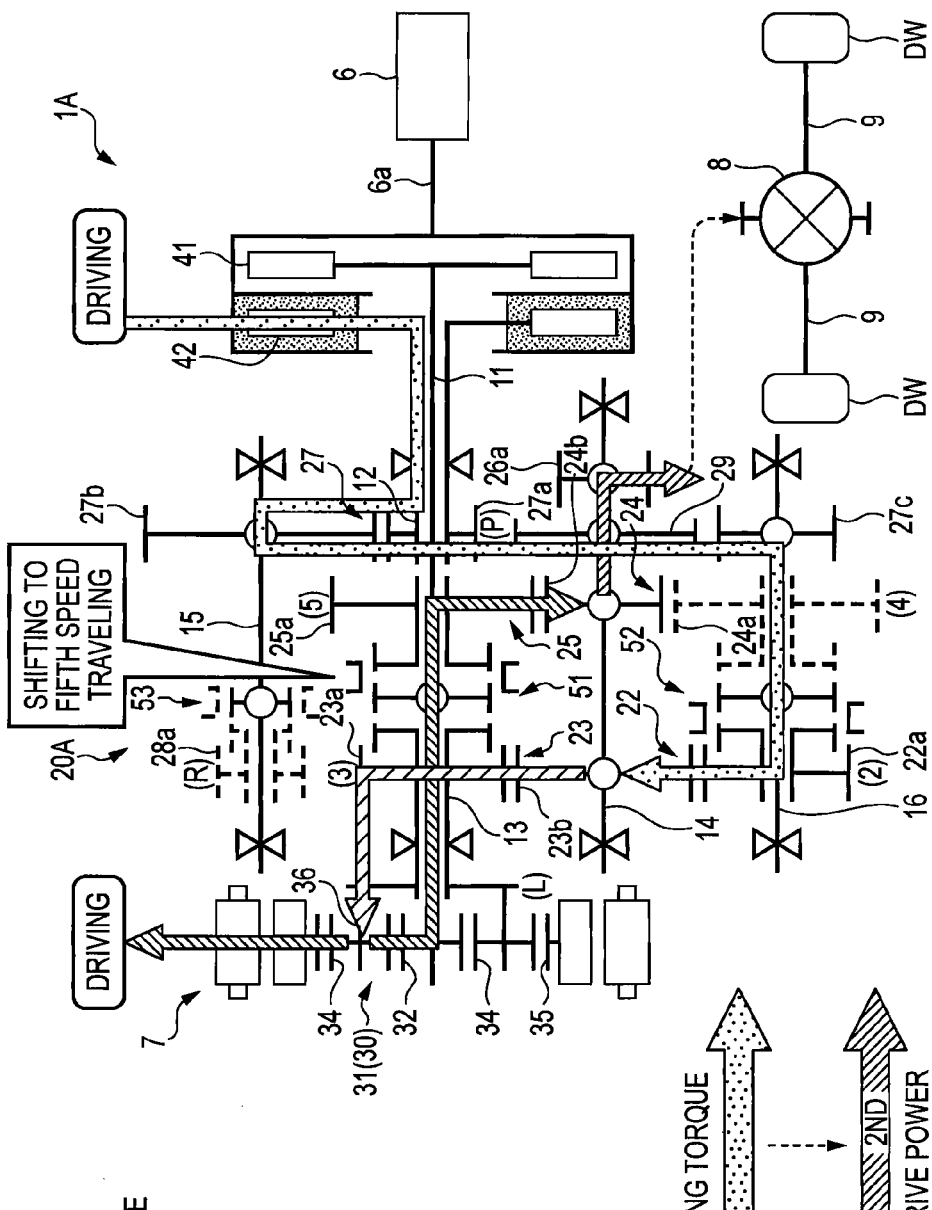
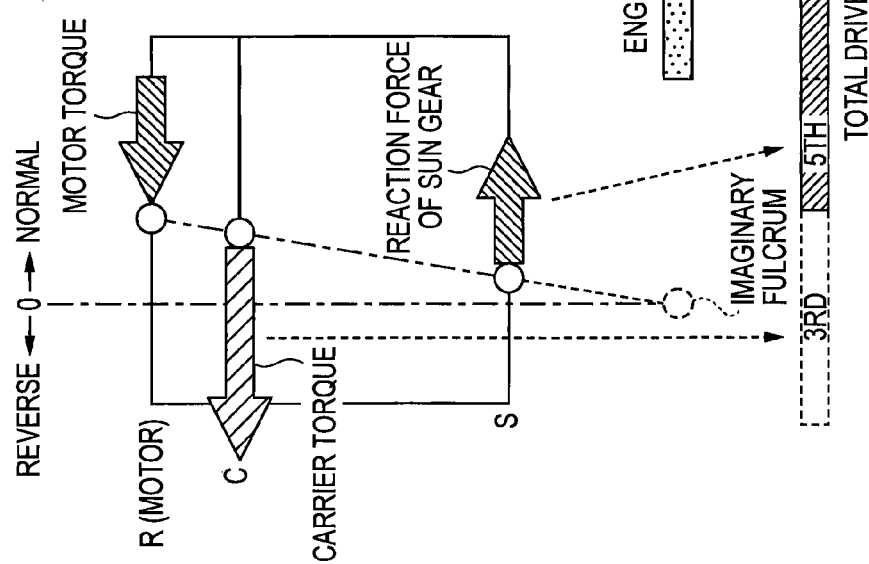
FIG. 24A
FIG. 24B
<THIRD MODE OF 2ND TRAVELING, CHARGING>

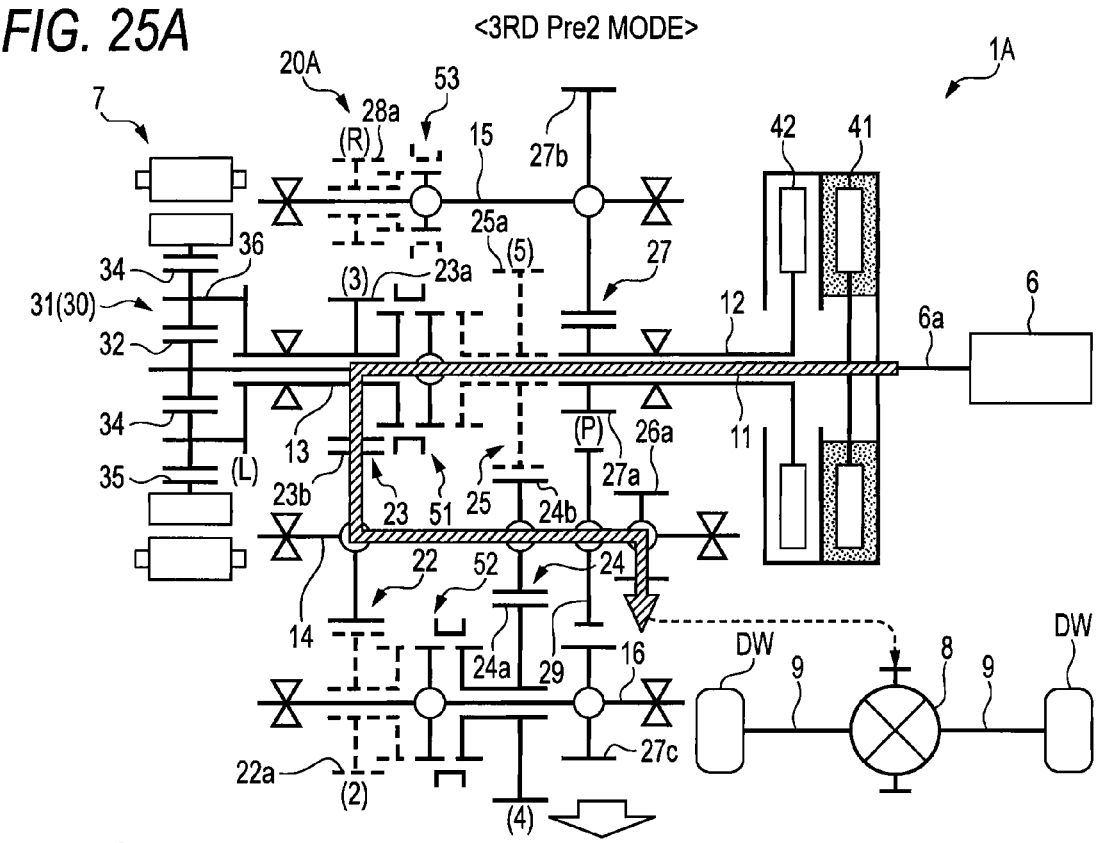
FIG. 25A  <3RD Pre2 MODE>
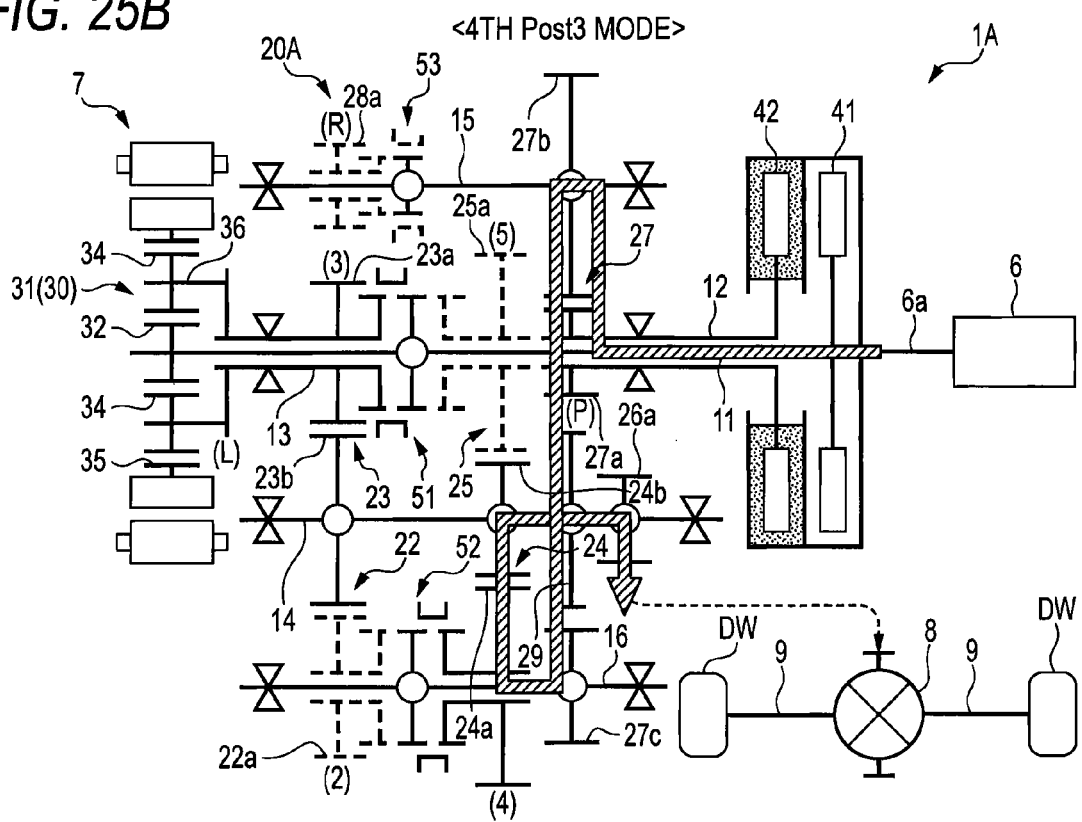
FIG. 25B  <4TH Post3 MODE>

<FIRST MODE OF 4TH TRAVELING, ASSISTING>

<FIRST MODE OF 4TH TRAVELING, CHARGING>

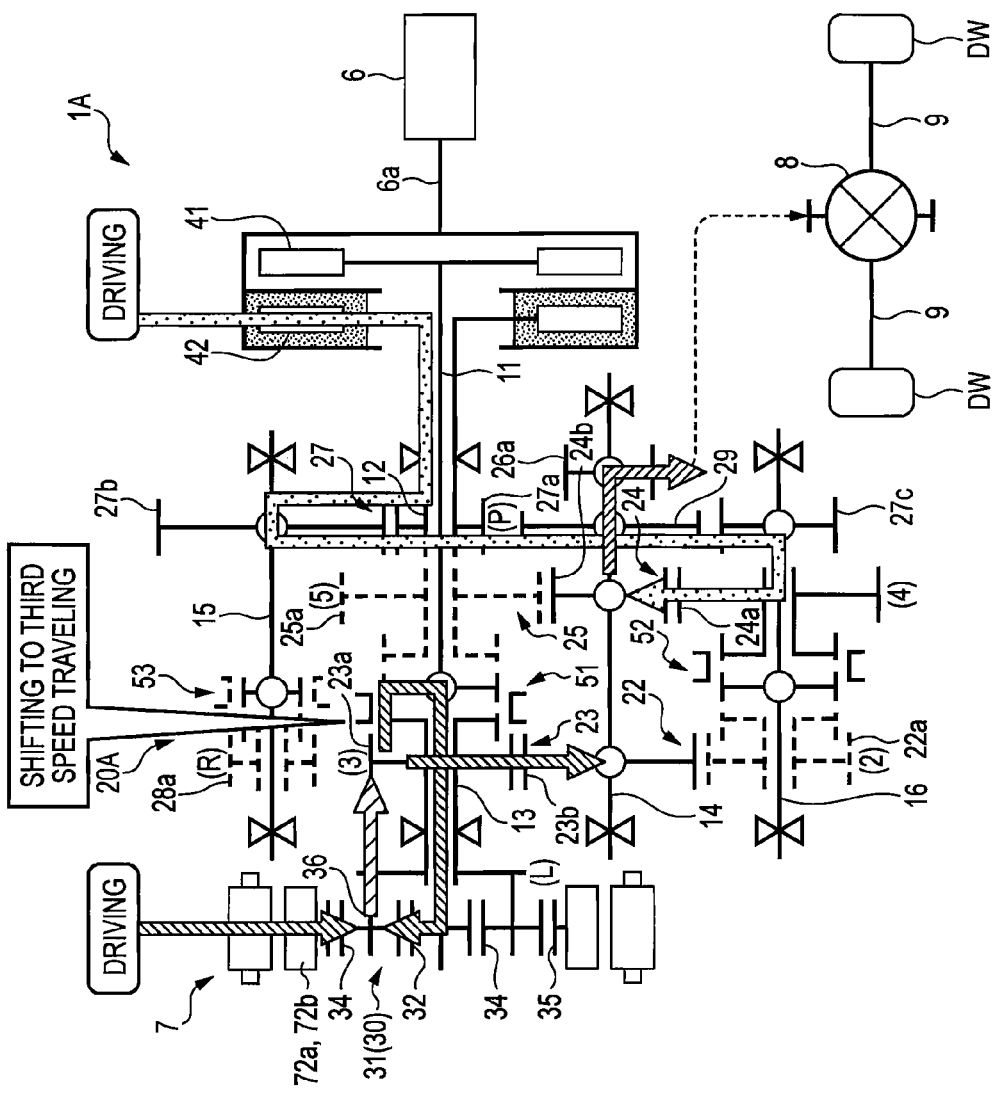
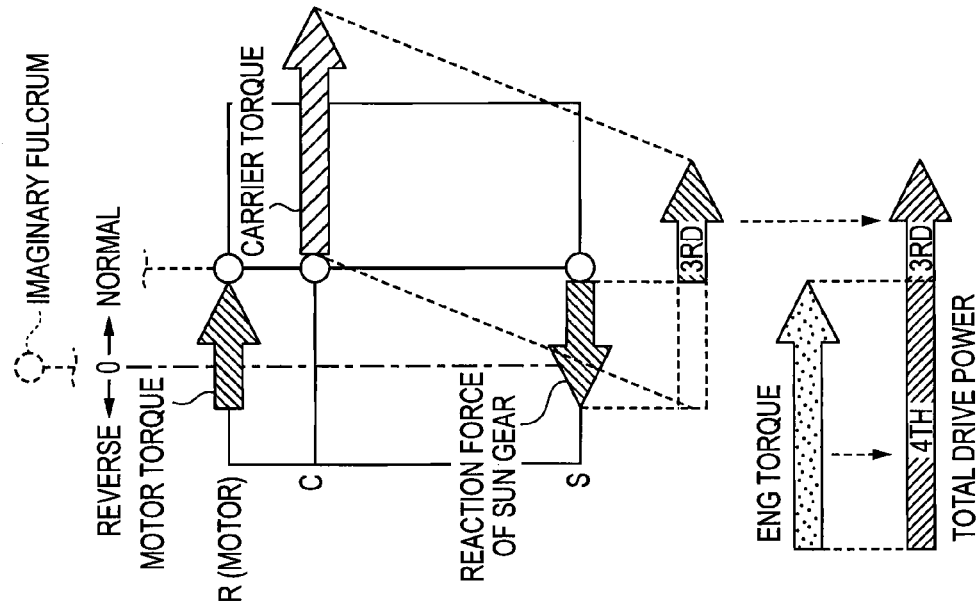

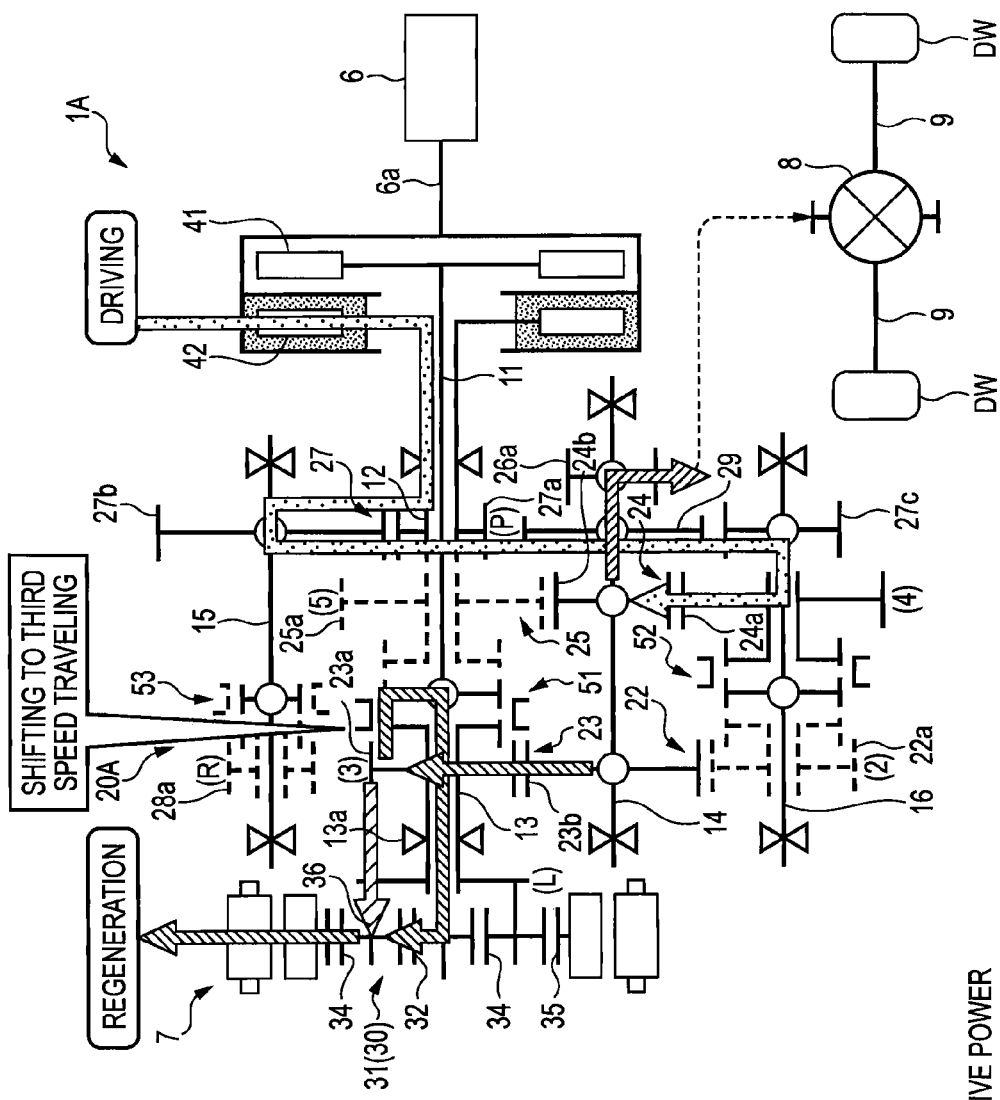
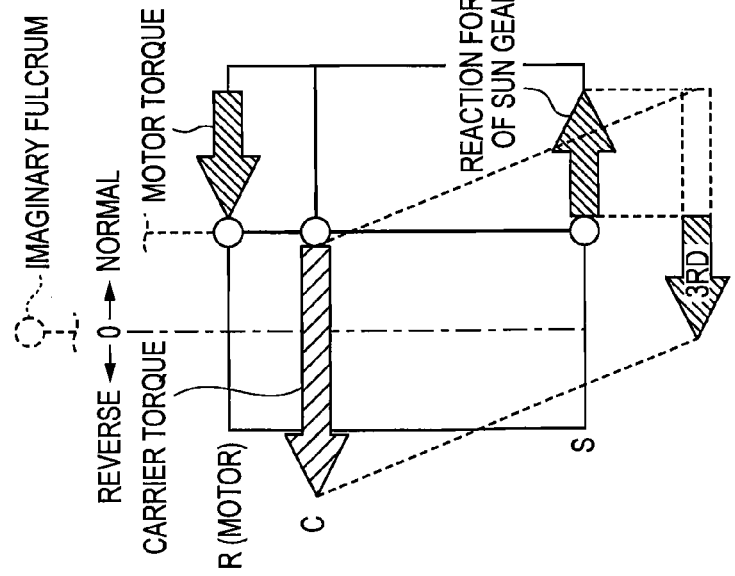
FIG. 29A
FIG. 29B
<SECOND MODE OF 4TH TRAVELING, CHARGING>

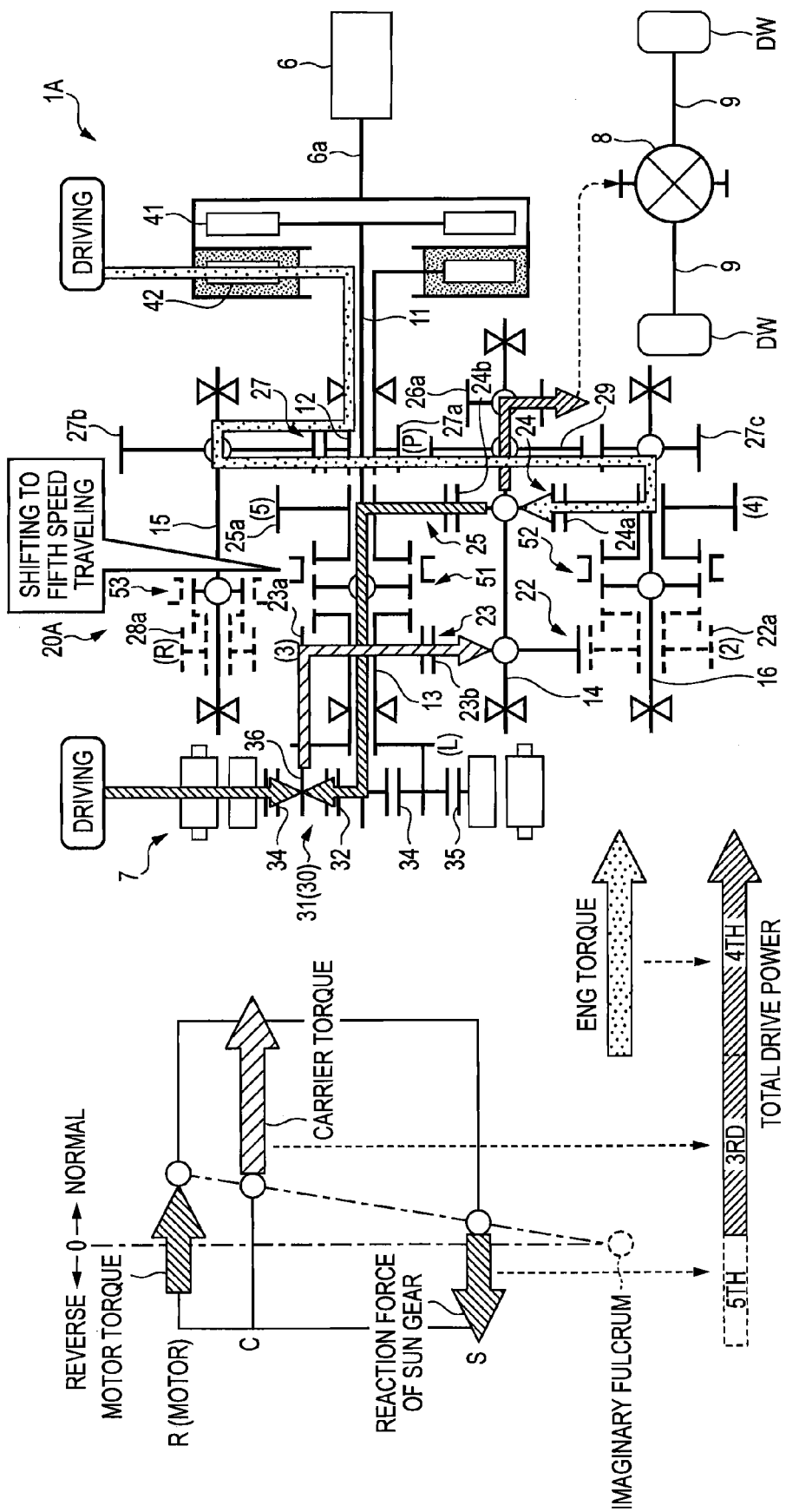

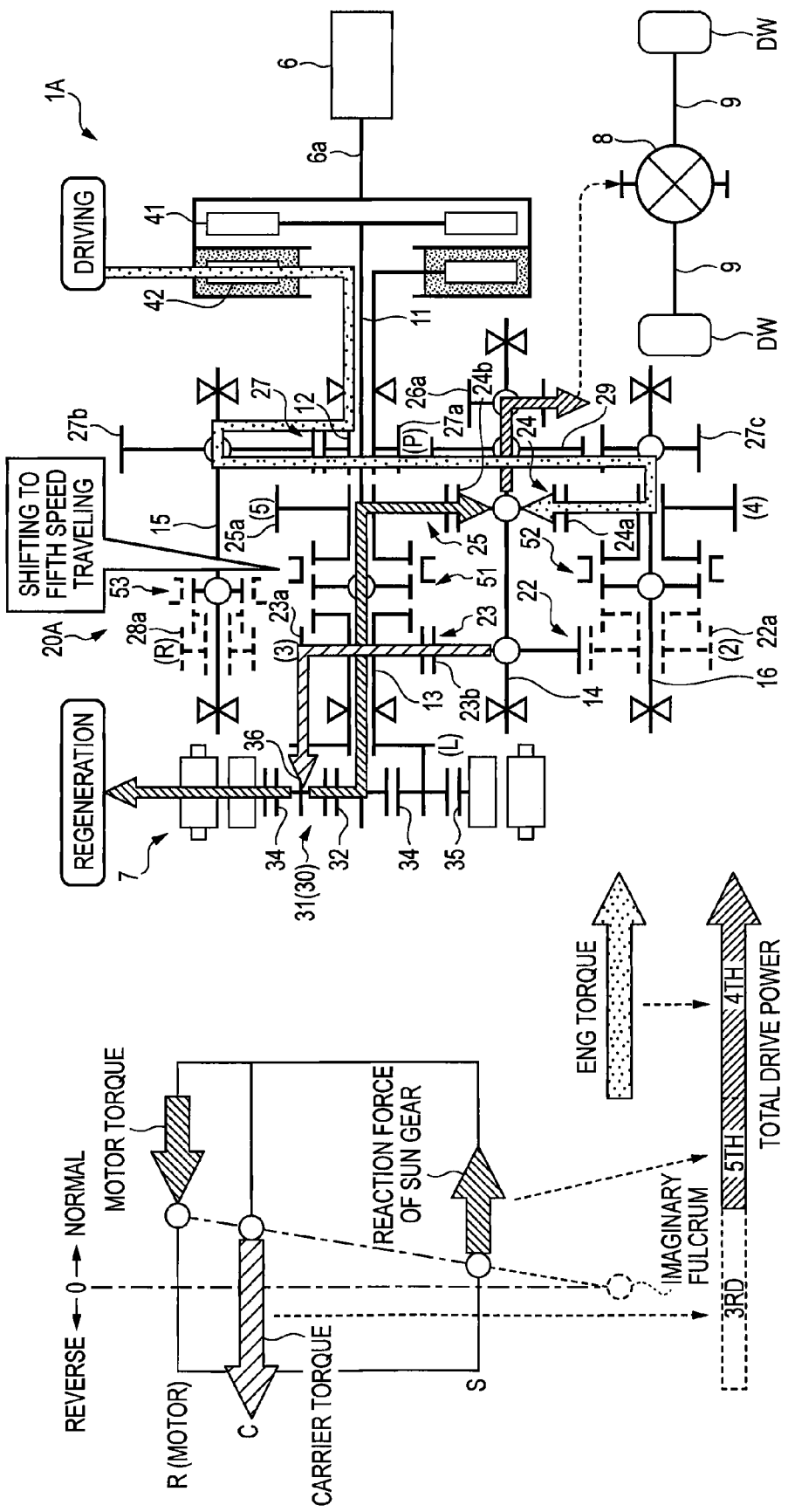

<FIRST MODE OF 5TH TRAVELING, ASSISTING>

<FIRST MODE OF 5TH TRAVELING, CHARGING>

<SECOND MODE OF MOTOR TRAVELING, ASSISTING>

<FIRST MODE OF REVERSE TRAVELING, ASSISTING>

FIG. 37

| VEHICLE STATE | | CLUTCH | | SPEED CHANGE SHIFTER | | MOTOR | | | ENGINE |
|---|---|---|---|---|---|---|---|---|---|
| FUNCTION | MODE | 1ST | 2ND | 1ST | 2ND | ROTATIONAL DIRECTION | TORQUE APPLICATION DIRECTION | STATE | |
| TORQUE COMBINATION DRIVING | LOW | ● | | - | - | REVERSE | NORMAL | CHARGING | DRIVING |
| | | ● | | - | - | NORMAL | NORMAL | DRIVING | DRIVING |
| | LOW Pre2 | ● | | - | 2 | REVERSE | NORMAL | CHARGING | DRIVING |
| | | ● | | - | 2 | NORMAL | NORMAL | DRIVING | DRIVING |
| NORMAL DRIVING | 2ND | | ● | - | 2 | X | X | X | O |
| | | ● | ● | - | 2 | NORMAL | NORMAL | DRIVING | O |
| | | ● | ● | - | 2 | NORMAL | REVERSE | CHARGING | O |
| | 2ND Pre3 | | ● | 3 | 2 | NORMAL | NORMAL | DRIVING | O |
| | | | ● | 3 | 2 | NORMAL | REVERSE | CHARGING | O |
| | 3RD Post2 | ● | | 3 | 2 | NORMAL | NORMAL | DRIVING | O |
| | | ● | | 3 | 2 | NORMAL | REVERSE | CHARGING | O |
| | 3RD | ● | | 3 | - | NORMAL | NORMAL | DRIVING | O |
| | | ● | | 3 | - | NORMAL | REVERSE | CHARGING | O |
| | 3RD Pre4 | ● | | 3 | 4 | NORMAL | NORMAL | DRIVING | O |
| | | ● | | 3 | 4 | NORMAL | REVERSE | CHARGING | O |
| | 4TH Post3 | | ● | 3 | 4 | NORMAL | NORMAL | DRIVING | O |
| | | | ● | 3 | 4 | NORMAL | REVERSE | CHARGING | O |
| | 4TH | | ● | - | 4 | X | X | X | O |
| | | ● | ● | - | 4 | NORMAL | NORMAL | DRIVING | O |
| | | ● | ● | - | 4 | NORMAL | REVERSE | CHARGING | O |
| | 4TH Pre5 | | ● | 5 | 4 | NORMAL | NORMAL | DRIVING | O |
| | | | ● | 5 | 4 | NORMAL | REVERSE | CHARGING | O |
| | 5TH Post4 | ● | | 5 | 4 | NORMAL | NORMAL | DRIVING | O |
| | | ● | | 5 | 4 | NORMAL | REVERSE | CHARGING | O |
| | 5TH | ● | | 5 | - | NORMAL | NORMAL | DRIVING | O |
| | | ● | | 5 | - | NORMAL | REVERSE | CHARGING | O |

| VEHICLE STATE | | CLUTCH | | SPEED CHANGE SHIFTER | | MOTOR | | | ENGINE |
|---|---|---|---|---|---|---|---|---|---|
| FUNCTION | MODE | 1ST | 2ND | 1ST | 2ND | ROTATIONAL DIRECTION | TORQUE APPLICATION DIRECTION | STATE | |
| MOTOR TRAVELING | (3RD) | | | 3 | - | NORMAL | NORMAL | DRIVING | |
| | | | | 3 | - | NORMAL | REVERSE | REGENERATION | |
| | (5TH) | | | 5 | - | NORMAL | NORMAL | DRIVING | |
| | | | | 5 | - | NORMAL | REVERSE | REGENERATION | |
| ENGINE START IN MOTOR | (3RD) | | ● | 3 | - | NORMAL | NORMAL | DRIVING | START |
| | | ● | ● | 3 | 2 | NORMAL | NORMAL | DRIVING | START |
| | | ● | ● | 3 | 4 | NORMAL | NORMAL | DRIVING | START |
| | (5TH) | | ● | 5 | - | NORMAL | NORMAL | DRIVING | START |
| | | ● | ● | 5 | 2 | NORMAL | NORMAL | DRIVING | START |
| | | ● | ● | 5 | 4 | NORMAL | NORMAL | DRIVING | START |
| PARKING | ENGINE START | ● | | - | - | REVERSE | REVERSE | DRIVING | START |
| | GENERATION | ● | | - | - | REVERSE | NORMAL | CHARGING | 0 |

<MOTOR NON-DRIVING TRAVELING (TORQUE COMBINATION DRIVING, MOTOR STOP)>

POWER OUTPUT APPARATUS

CROSS-REFERENCE TO RELATED APPLICATIONS

This application is based on and claims priority under 35 U.S.C. §119 from Japanese Patent Application Nos. 2008-296011 filed on Nov. 19, 2008, 2009-048074 filed on Mar. 2, 2009 and 2009-245770 filed on Oct. 26, 2009.

BACKGROUND OF THE INVENTION

1. Technical Field

The present invention relates to a power output apparatus, and particularly, to a power output apparatus of a hybrid vehicle.

2. Related Art

Conventionally, for example, a power output apparatus of a hybrid vehicle including an engine, a motor, and a planetary gear mechanism composed of a sun gear, a ring gear, a plurality of planetary gears which engages with these sun gear and ring gear, and a carrier which supports the plurality of planetary gears is known (for example, refer to Patent Document 1).

As shown in FIG. 44, a power output apparatus 100 described in the above Patent Document 1 connects a first motor 104 serving as a generator to a sun gear 102 of a planetary gear mechanism 101, connects an engine 106 to a carrier 105, and connects a driving shaft 108 to a ring gear 107. Thereby, the torque of the engine 106 is divided into the torque of the ring gear 107 and the torque of the sun gear 102 by the planetary gear mechanism 101, and the divided torque divided into the torque of the ring gear 107 is transmitted to the driving shaft 108. In addition, in the power output apparatus 100 described in the above Patent Document 1, since the torque of the engine 106 is divided and transmitted to the driving shaft 108, a second motor 109 which compensates for the torque to the driving shaft 108 is connected to the ring gear 107.

[Patent Document 1] JP-A-2007-290677

However, the power output apparatus 100 described in the above Patent Document 1 adopts a power dividing method in which the engine 106 is connected to the carrier 105. Therefore, when the engine torque is necessarily divided and the same torque as the engine torque is transmitted to the driving shaft 108, there is a problem in that it is necessary to compensate for the motor torque from the second motor 109, whereby structure becomes complicated and expensive, and loading to a vehicle becomes difficult.

SUMMARY OF THE INVENTION

The invention has been contrived in view of the above situation, and the object thereof is to provide a power output apparatus which can transmit a combined torque of an engine torque and a motor torque to a driving shaft.

In order to achieve the above object, according to a first aspect of the invention, there is provided a power output apparatus (for example, the power output apparatuses 1 to 1D of the embodiments to be described later) including:

an internal combustion engine (for example, the engine 6 of the embodiments to be described later), an electric motor (for example, the motor 7 of the embodiments to be described later), and a transmission (for example, the transmissions 20 to 20D of the embodiments to be described later) having two transmission shafts (for example, the first main shaft 11 and the second intermediate shaft 16 of the embodiments to be described later) connected to the internal combustion engine, wherein the transmission includes a power combination mechanism (for example, the power combination mechanism 30 and the planetary gear mechanism 31 of the embodiments to be described later) adapted to be able to rotate first to third elements (for example, the sun gear 32, the carrier 36, and the ring gear 35 of the embodiments to be described later) differentially from each other, the first element is connected to any one transmission shaft (for example, the first main shaft 11 and the second intermediate shaft 16 of the embodiments to be described later) of the two transmission shafts, the second element is connected to a driving shaft, the third element is connected to the electric motor, the second element combines the power transmitted from the first element and the power transmitted from the third element, and transmits the combined power to the driving shaft (for example, the driving shafts 9 and 9 of the embodiments to be described later), and the other transmission shaft (for example, the second intermediate shaft 16 and the first main shaft 11 of the embodiments to be described later) of the two transmission shafts transmits power to the driving shaft without going via the power combination mechanism.

According to a second aspect of the invention, there is provided the power output apparatus as set forth in the first aspect, wherein the two transmission shafts include a first transmission shaft (for example, the first main shaft 11 and the second intermediate shaft 16 of the embodiments to be described later) connected to the internal combustion engine via a first connecting/disconnecting section (for example, the first clutch 41 and the second clutch 42 of the embodiments to be described later), and a second transmission shaft (for example, the second intermediate shaft 16 and the first main shaft 11 of the embodiments to be described later) connected to the internal combustion engine via a second connecting/disconnecting section (for example, the second clutch 42 and the first clutch 41 of the embodiments to be described later), and the first transmission shaft is connected to the first element.

According to a third aspect of the invention, there is provided the power output apparatus as set forth in the second aspect, wherein the first transmission shaft is provided with speed change stages composed of odd-numbered stages, and the second transmission shaft is provided with speed change stages composed of even-numbered stages.

According to a forth aspect of the invention, there is provided the power output apparatus as set forth in the second aspect, wherein the first transmission shaft is provided with speed change stages composed of even-numbered stages, and the second transmission shaft is provided with speed change stages composed of odd-numbered stages.

According to a fifth aspect of the invention, there is provided the power output apparatus as set forth in any one of the second to forth aspects, wherein the transmission includes a counter shaft (for example, the counter shaft 14 of the embodiments to be described later) arranged parallel to the first and second transmission shafts, the first transmission shaft includes a driving gear (for example, the driving gear 23a for third speed and the driving gear 22a for second speed of the embodiments to be described later) which rotates integrally with the second element and is rotatable relative to the first transmission shaft, and a shifter (for example, the first speed change shifter 51 and the second speed change shifter 52 of the embodiments to be described later) which connects or disconnects the first transmission shaft and the driving gear, the counter shaft includes a driven gear (for example, the first common driven gear 23b of the embodiments to be described later) which engages with the driving gear, and a final gear (for example, the final gear 26a of the embodiments to be described later) connected to the driving shaft, the driving gear and the driven gear constitute a speed change gear pair (for example, the gear pair 23 for third speed and the gear pair 22 for second speed of the embodiments to be described later), and the gear ratio of the power combination mechanism and the speed change gear pair is set so that the combined power of the internal combustion engine and the electric motor to be transmitted to the driving shaft becomes equivalent to a first speed by connecting the first connecting/disconnecting section, driving the internal combustion engine, and driving or regenerating the electric motor in a state where the shifter has disconnected the first transmission shaft and the driving gear.

According to a sixth aspect of the invention, there is provided the power output apparatus as set forth in any one of the second to forth aspects, wherein the transmission includes a counter shaft (for example, the counter shaft 14 of the embodiments to be described later) arranged parallel to the first and second transmission shafts, the first transmission shaft includes a driving gear for third speed (for example, the driving gear 23a for third speed of the embodiments to be described later) which rotates integrally with the second element, and is rotatable relative to the first transmission shaft, and a first speed change shifter (for example, the first speed change shifter 51 of the embodiments to be described later) which connects or disconnects the first transmission shaft and the driving gear for third speed, the second transmission shaft includes a driving gear for second speed (for example, the driving gear 22a for second speed of the embodiments to be described later) which is rotatable relative to the second transmission shaft, and a second speed change shifter (for example, the second speed change shifter 52 of the embodiments to be described later) which connects or disconnects the second transmission shaft and the driving gear for second speed, the counter shaft includes a first common driven gear (for example, the first common driven gear 23b of the embodiments to be described later) which engages with the driving gear for third speed and the driving gear for second speed, and a final gear (for example, the final gear 26a of the embodiments to be described later) connected to the driving shaft, the driving gear for third speed and the first common driven gear constitute a gear pair for third speed (for example, the gear pair 23 for third speed of the embodiments to be described later), and the driving gear for second speed and the first common driven gear constitute a gear pair for second speed (for example, the gear pair 22 for second speed of the embodiments to be described later), and the gear ratio of the power combination mechanism and the gear pair for third speed is set so that the combined power of the internal combustion engine and the electric motor to be transmitted to the driving shaft becomes equivalent to a first speed by connecting the first connecting/disconnecting section, driving the internal combustion engine, and driving or regenerating the electric motor in a state where the first speed change shifter has disconnected the first transmission shaft and the driving gear for third speed.

According to a seventh aspect of the invention, there is provided the power output apparatus as set forth in the sixth aspect, wherein first speed traveling is performed by connecting the first connecting/disconnecting section in a state where the first speed change shifter disconnects the first transmission shaft and the driving gear for third speed, regenerating the electric motor in a state where the electric motor is rotating in the reverse direction, and driving the electric motor to rotate the electric motor in the normal direction in a state where the number of revolutions of the second element is equal to or more than a predetermined number of revolutions.

According to an eighth aspect of the invention, there is provided the power output apparatus as set forth in the sixth aspect, wherein power is not transmitted to the driving shaft from the second element by connecting the first connecting/disconnecting section to idle the electric motor during the idling of the internal combustion engine.

According to a ninth aspect of the invention, there is provided the power output apparatus as set forth in the sixth aspect, wherein the power of the electric motor is transmitted to the internal combustion engine via the first element from the third element to start the internal combustion engine, by connecting the first connecting/disconnecting section and locking the second element to drive the electric motor in the reverse direction.

According to a tenth aspect of the invention, there is provided the power output apparatus as set forth in the sixth aspect, wherein the power of the internal combustion engine is transmitted to the electric motor via the third element from the first element, and is regenerated in the electric motor, by connecting the first connecting/disconnecting section and locking the second element to drive the internal combustion engine.

According to an eleventh aspect of the invention, there is provided the power output apparatus as set forth in the seventh aspect, further including:

a required torque setting section (for example, the ECU 5 of the embodiments to be described later) which sets a required torque to be transmitted to the driving shaft, wherein according to the required torque, the first connecting/disconnecting section is connected to transmit the torque of the internal combustion engine to the second element from the first element, and the electric motor is driven or regenerated to transmit the torque of the electric motor to the second element from the third element, so that a combined torque of the internal combustion engine and the electric motor is transmitted to the driving shaft via the second element.

According to a twelfth aspect of the invention, there is provided the power output apparatus as set forth in the eleventh aspect, wherein the torque of the electric motor is controlled with respect to the required torque from the required torque setting section so that the torque of the internal combustion engine is within a range of a highest number of revolutions from an engine stall region.

According to a thirteenth aspect of the invention, there is provided the power output apparatus as set forth in the twelfth aspect, wherein with respect to the required torque from the required torque setting section, the internal combustion engine is driven in a proper driving region of the internal combustion engine, the torque of the internal combustion engine supplied to the second element from the first element, and the required torque are compared with each other to drive or regenerate the electric motor, the electric motor is driven at a rated output or a maximum number of revolutions when the electric motor exceeds the rated output or the maximum number of revolutions, and the torque of the electric motor supplied to the second element from the third element and the required torque are compared with each other to control the torque of the internal combustion engine.

According to a fourteenth aspect of the invention, there is provided the power output apparatus as set forth in the sixth aspect, wherein second speed traveling is performed by connecting the second transmission shaft and the driving gear for second speed by the second speed change shifter, and connecting the second connecting/disconnecting section to transmit the power of the internal combustion engine to the driving shaft via the gear pair for second speed from the second transmission shaft.

According to a fifteenth aspect of the invention, there is provided the power output apparatus as set forth in the fourteenth aspect, wherein in the second speed traveling, traveling is performed while assisting or regeneration is made by the electric motor by further connecting the first connecting/disconnecting section to drive or regenerate the electric motor.

According to a sixteenth aspect of the invention, there is provided the power output apparatus as set forth in the fourteenth aspect, wherein in the second speed traveling, traveling is performed while assisting or regeneration is made by the electric motor by connecting the first transmission shaft and the driving gear for third speed by the first speed change shifter to lock the power combination mechanism, and driving or regenerating the electric motor.

According to a seventeenth aspect of the invention, there is provided the power output apparatus as set forth in the sixth aspect, wherein third speed traveling is performed by connecting the first transmission shaft and the driving gear for third speed by the first speed change shifter to lock the power combination mechanism, and connecting the first connecting/disconnecting section to transmit the power of the internal combustion engine to the driving shaft via the gear pair for third speed from the first transmission shaft.

According to an eighteenth aspect of the invention, there is provided the power output apparatus as set forth in the seventeenth aspect, wherein in the third speed traveling, traveling is performed while assisting or regeneration is made by the electric motor by driving or regenerating the electric motor.

According to a nineteenth aspect of the invention, there is provided the power output apparatus as set forth in the sixth aspect, wherein EV traveling is performed by disconnecting the first connecting/disconnecting section and the second connecting/disconnecting section, connecting the first transmission shaft and the driving gear for third speed by the first speed change shifter to lock the power combination mechanism, and driving the electric motor to transmit the power of the electric motor to the driving shaft via the gear pair for third speed from the power combination mechanism.

According to a twentieth aspect of the invention, there is provided the power output apparatus as set forth in the nineteenth aspect, wherein in the EV travelling, travelling is performed by connecting the first connecting/disconnecting section to start the internal combustion engine by a start torque transmitted to the internal combustion engine via the first transmission shaft from the power combination mechanism, and transmitting the torque, which is obtained by deducting the start torque from the torque of the electric motor transmitted from the power combination mechanism, to the driving shaft via the gear pair for third speed.

According to a twenty-first aspect of the invention, there is provided the power output apparatus as set forth in the nineteenth aspect, wherein in the EV travelling, travelling is performed by connecting the second connecting/disconnecting section to start the internal combustion engine by a start torque transmitted to the internal combustion engine via the gear pair for second speed from the torque of the electric motor transmitted to the gear pair for third speed from the power combination mechanism, and transmitting the torque, which is obtained by deducting the start torque from the torque of the electric motor transmitted from the power combination mechanism, to the driving shaft.

According to a twenty-second aspect of the invention, there is provided the power output apparatus as set forth in any one of the sixth to twenty-first aspects, wherein the first transmission shaft further includes a driving gear for fifth speed (for example, the driving gear 25$a$ for fifth speed of the embodiments to be described later) which is rotatable relative to the first transmission shaft, the second transmission shaft further includes a driving gear for fourth speed (for example, the driving gear 24$a$ for fourth speed of the embodiments to be described later) which is rotatable relative to the second transmission shaft, the counter shaft includes a second common driven gear (for example, the second common driven gear 24$b$ of the embodiments to be described later) which engages with the driving gear for fifth speed and the driving gear for fourth speed, the first speed change shifter further connects or disconnects the first transmission shaft and the driving gear for fifth speed, the second speed change shifter further connects or disconnects the second transmission shaft and the driving gear for fourth speed, the driving gear for fifth speed and the second common driven gear constitute a gear pair for fifth speed (for example, the gear pair 25 for fifth speed of the embodiments to be described later), and the driving gear for fourth speed and the second common driven gear constitute a gear pair for fourth speed (for example, the gear pair 24 for fourth speed of the embodiments to be described later).

According to a twenty-third aspect of the invention, there is provided the power output apparatus as set forth in the twenty-second aspect, wherein second speed traveling is performed by connecting the second transmission shaft and the driving gear for second speed by the second speed change shifter, and connecting the second connecting/disconnecting section to transmit the power of the internal combustion engine to the driving shaft via the gear pair for second speed from the second transmission shaft, and in the second speed traveling, traveling is performed while assisting or regeneration is made by the electric motor by connecting the first transmission shaft and the driving gear for fifth speed by the first speed change shifter to drive or regenerate the electric motor.

According to a twenty-forth aspect of the invention, there is provided the power output apparatus as set forth in the twenty-second aspect, wherein fourth speed traveling is performed by connecting the second transmission shaft and the driving gear for fourth speed by the second speed change shifter, and connecting the second connecting/disconnecting section to transmit the power of the internal combustion engine to the driving shaft via the gear pair for fourth speed from the second transmission shaft.

According to a twenty-fifth aspect of the invention, there is provided the power output apparatus as set forth in the twenty-forth aspect, wherein in the fourth speed traveling, traveling is performed while assisting or regeneration is made by the electric motor by further connecting the first connecting/disconnecting section to drive or regenerate the electric motor.

According to a twenty-sixth aspect of the invention, there is provided the power output apparatus as set forth in the twenty-forth aspect, wherein in the fourth speed traveling, traveling is performed while assisting or regeneration is made by the electric motor by connecting the first transmission shaft and the driving gear for third speed by the first speed change shifter to lock the power combination mechanism, and driving or regenerating the electric motor.

According to a twenty-seventh aspect of the invention, there is provided the power output apparatus as set forth in the twenty-forth aspect, wherein in the fourth speed traveling, traveling is performed while assisting or regeneration is made by the electric motor by connecting the first transmission shaft and the driving gear for fifth speed by the first speed change shifter to drive or regenerate the electric motor.

According to a twenty-eighth aspect of the invention, there is provided the power output apparatus as set forth in the twenty-second aspect, wherein fifth speed traveling is performed by connecting the first transmission shaft and the driving gear for fifth speed by the first speed change shifter, and connecting the first connecting/disconnecting section to transmit the power of the internal combustion engine to the driving shaft via the gear pair for fifth speed from the first transmission shaft.

According to a twenty-ninth aspect of the invention, there is provided the power output apparatus as set forth in the twenty-eighth aspect, wherein in the fifth speed traveling, traveling is performed while assisting or regeneration is made by the electric motor by driving or regenerating the electric motor.

According to a thirtieth aspect of the invention, there is provided the power output apparatus as set forth in the twenty-eighth aspect, wherein EV traveling is performed by disconnecting the first connecting/disconnecting section and the second connecting/disconnecting section, connecting the first transmission shaft and the driving gear for fifth speed by the first speed change shifter to drive the electric motor.

According to a thirty-first aspect of the invention, there is provided the power output apparatus as set forth in any one of the twenty-second to thirtieth aspects, wherein the transmission includes an input shaft (for example, the second main shaft 12 of the embodiments to be described later) which is relatively rotatably arranged so as to cover the periphery of the first transmission shaft and is connected to the internal combustion engine via the second connecting/disconnecting section, and an intermediate shaft (for example, the first intermediate shaft 15 of the embodiments to be described later) arranged parallel to the first and second transmission shafts, the input shaft includes an idle driving gear (for example, the idle driving gear 27a of the embodiments to be described later), the intermediate shaft includes a first idle driven gear (for example, the first idle driven gear 27b of the embodiments to be described later) which engages with the idle driving gear, a driving gear for reverse (for example, the driving gear 28a for reverse of the embodiments to be described later) which engages with the first common driven gear and which is rotatable relative to the intermediate shaft, and a reverse shifter (for example, a reverse shifter 53 of the embodiments to be described later) which connects or disconnects the intermediate shaft and the driving gear for reverse, the second transmission shaft further includes a second idle driven gear (for example, the second idle driven gear 27c of the embodiments to be described later) which engages with the first idle driven gear, and the driving gear for reverse and the first common driven gear constitute a gear pair for reverse (for example, the gear pair 28 for reverse of the embodiments to be described later).

According to a thirty-second aspect of the invention, there is provided the power output apparatus as set forth in the thirty-first aspect, wherein reverse traveling is performed by connecting the intermediate shaft and the driving gear for reverse by the reverse shifter, connecting the second connecting/disconnecting section, and driving the internal combustion engine to transmit the power of the internal combustion engine to the driving shaft via the gear pair for reverse from the intermediate shaft.

According to a thirty-third aspect of the invention, there is provided the power output apparatus as set forth in the thirty-second aspect, wherein in the reverse traveling, reverse traveling is performed while assisting is made by the electric motor by connecting the first transmission shaft and the driving gear for fifth speed by the first speed change shifter to drive the electric motor in the reverse direction.

According to a thirty-fourth aspect of the invention, there is provided the power output apparatus as set forth in the thirty-first aspect, wherein the transmission includes an input shaft (for example, the second main shaft 12 of the embodiments to be described later) which is relatively rotatably arranged so as to cover the periphery of the first transmission shaft and is connected to the internal combustion engine via the second connecting/disconnecting section, and an intermediate shaft (for example, the first intermediate shaft 15 of the embodiments to be described later) and a reverse shaft (for example, reverse shaft 17 of the embodiments to be described later) which are arranged parallel to the first and second transmission shafts, the input shaft includes an idle driving gear (for example, the idle driving gear 27a of the embodiments to be described later), the intermediate shaft includes a first idle driven gear (for example, the first idle driven gear 27b of the embodiments to be described later) which engages with the idle driving gear, the second transmission shaft further includes a second idle driven gear (for example, the second idle driven gear 27c of the embodiments to be described later) which engages with the first idle driven gear, the first transmission shaft further includes a driven gear for reverse (for example, the driven gear 28b for reverse of the embodiments to be described later), the reverse shaft includes a third idle driven gear (for example, the third idle driven gear 27d of the embodiments to be described later) which engages with the first idle driven gear, a driving gear for reverse (for example, the driving gear 28a for reverse of the embodiments to be described later) which engages with the driven gear for reverse and is rotatable relative to the reverse shaft, and a reverse shifter (for example, the reverse shaft 53 of the embodiments to be described later) which connects or disconnects the reverse shaft and the driving gear for reverse, and the driving gear for reverse and the driven gear for reverse constitute the gear pair for reverse (for example, the gear pair 28 for reverse of the embodiments to be described later).

According to a thirty-fifth aspect of the invention, there is provided the power output apparatus as set forth in the thirty-forth aspect, wherein reverse traveling is performed by connecting the reverse shaft and the driving gear for reverse by the reverse shifter and connecting the second connecting/disconnecting section, and driving the internal combustion engine and driving the electric motor in the reverse direction to combine the power of the internal combustion engine and the power of the electric motor.

According to a thirty-sixth aspect of the invention, there is provided the power output apparatus as set forth in the ninth or tenth aspect, wherein the counter shaft includes a parking gear which constitutes a parking locking mechanism (for example, the parking gear 29 of the embodiments to be described later), and a locking torque is made to act on the second element from the parking gear.

According to a thirty-seventh aspect of the invention, there is provided the power output apparatus as set forth in the thirty-first aspect, wherein when the first connecting/disconnecting section is connected and the second element is locked to drive the internal combustion engine so as to perform regeneration by the electric motor, the intermediate shaft and the driving gear for reverse are connected and the second connecting/disconnecting section are connected while being slipped, by the reverse shifter, and the torque in the reverse direction is made to act on the first common driven gear from the driving gear for reverse to offset the torque in the normal direction generated to the second element.

According to a thirty-eighth aspect of the invention, there is provided the power output apparatus as set forth in the seventh aspect, wherein if the SOC of a battery has reached a regeneration limit when first speed traveling is performed while the internal combustion engine is driven and the electric motor is regenerated, traveling is performed by connecting the second transmission shaft and the driving gear for second speed by the second speed change shifter, and connecting the first connecting/disconnecting section and the second connecting/disconnecting section while being slipped.

According to a thirty-ninth aspect of the invention, there is provided the power output apparatus as set forth in the seventh aspect, wherein if the SOC of a battery has reached a regeneration limit when shifting to EV traveling is made during first speed traveling while the internal combustion engine is driven and the electric motor is regenerated, traveling is performed by further connecting the second transmission shaft and the driving gear for second speed by the second speed change shifter, and connecting the second connecting/disconnecting section while being slipped.

According to a fortieth aspect of the invention, there is provided the power output apparatus as set forth in the nineteenth or thirtieth aspect, wherein when the electric motor continues rotating at the same number of revolutions for a predetermined period of time during the EV traveling, the power of the electric motor is fluctuated, and a brake is actuated in cooperation.

According to a forty-first aspect of the invention, there is provided the power output apparatus as set forth in any one of the first to fortieth aspects, wherein at least one of the first connecting/disconnecting section and the second connecting/disconnecting section is a dry clutch.

According to a forty-second aspect of the invention, there is provided the power output apparatus as set forth in any one of the first to forty-first aspects, wherein the power combination mechanism is a planetary gear mechanism (for example, the planetary gear mechanism 31 of the embodiments to be described later) including a sun gear (for example, the sun gear 32 of the embodiments to be described later) and a ring gear (for example, the ring gear 35 of the embodiments to be described later) which are arranged on the same axis, a plurality of planetary gears which engage with the ring gear and the sun gear, and a carrier (for example, the carrier 36 of the embodiments to be described later) which rotatably supports the plurality of planetary gears, and the first element is the sun gear, the second element is the carrier, and the third element is the ring gear.

According to a forty-third aspect of the invention, there is provided the power output apparatus as set forth in any one of the first to forty-second aspects, wherein some or all of a rotor (for example, the rotor 72 of the embodiments to be described later) a stator (for example, the stator 71 of the embodiments to be described later), or winding portions (for example, coils 71c of the embodiments to be described later), which constitute the electric motor, are arranged so as to overlap the power combination mechanism in the axial direction.

According to a forty-fourth aspect of the invention, there is provided the power output apparatus as set forth in any one of the first to forty-third aspects, wherein the third element is connected to a locking mechanism (for example, the one-way clutch 61 of the embodiments to be described later) capable of locking the third element.

According to a forty-fifth aspect of the invention, there is provided the power output apparatus as set forth in the forty-forth aspect, wherein first speed traveling is performed by locking the third element by the locking mechanism to stop the rotation of the electric motor, and driving the internal combustion engine to transmit the power of the internal combustion engine to the driving shaft via the first and second elements.

According to a forty-sixth aspect of the invention, there is provided the power output apparatus as set forth in the forty-forth or forty-fifth aspect, wherein the locking mechanism is a brake, and the brake operates during locking control.

According to a forty-seventh aspect of the invention, there is provided the power output apparatus as set forth in the forty-forth or forty-fifth aspect, wherein the locking mechanism includes a one-way clutch (for example, the one-way clutch 61 of the embodiments to be described later) capable of switching a state where the third element is locked to stop the rotation of the electric motor, a state where only one-way rotation of the third element is permitted to permit only the rotation of the electric motor in a normal direction, and a state where the rotation of the third element in both directions is permitted to permit the rotation of the electric motor in both the normal and reverse directions, and the one-way clutch locks the third element during locking control to stop the rotation of the electric motor.

According to a forty-eighth aspect of the invention, there is provided the power output apparatus as set forth in any one of the forty-fifth to forty-seventh aspects, further including:

an electric storage device (for example, the battery 3 of the embodiments to be described later) which supplies electric power to the electric motor, wherein the locking mechanism locks the third element and stops the rotation of the electric motor, if the SOC of the electric storage device is equal to or less than a first predetermined value and the electric motor cannot be driven.

According to a forty-ninth aspect of the invention, there is provided the power output apparatus as set forth in any one of the forty-fifth to forty-seventh aspects, further including:

an electric storage device (for example, battery 3 of the embodiments to be described later) which supplies electric power to the electric motor, wherein the locking mechanism locks the third element and stops the rotation of the electric motor, if the SOC of the electric storage device is equal to or more than a second predetermined value and the electric motor cannot be regenerated.

According to a fiftieth aspect of the invention, there is provided the power output apparatus as set forth in the forty-eighth or forty-ninth aspect, further including:

a driving state prediction device which predicts a driving state, wherein the locking mechanism is operated on the basis of the information on the driving state prediction device according to the state of the SOC of the electric storage device.

According to a fifty-first aspect of the invention, there is provided the power output apparatus as set forth in any one of the forty-fifth to forty-seventh aspects, further including:

an electric storage device (for example, the battery 3 of the embodiments to be described later) which supplies electric power to the electric motor, and a temperature detecting device (for example, the temperature detecting device 84 of the embodiments to be described later) which detects the temperature of the electric storage device, and the locking mechanism locks the third element to stop the rotation of the electric motor, if the temperature of the electric storage device is equal to or less than a third predetermined value where output cannot be normally performed.

According to a fifty-second aspect of the invention, there is provided the power output apparatus as set forth in any one of the forty-forth to forty-seventh aspects, further including:

a control unit which controls the electric motor, and wiring lines which connect the electric motor with the electric storage device, wherein the locking mechanism locks the third element and stops the rotation of the electric motor, if there is a defect in at least one of the electric motor, the electric storage device, the control unit, and the wiring lines.

According to a fifty-third aspect of the invention, there is provided the power output apparatus as set forth in the fifty-second aspect, further including:

a notification section which notifies a driver of emergency traveling, if there is a defect in at least one of the electric motor, the electric storage device, the control unit, and the wiring lines.

Further, in order to achieve the above object, according to a fifty-fourth aspect, there is provided a power output apparatus (for example, the power output apparatuses 1 and 1A of the embodiments to be described later) including:

an internal combustion engine (for example, the engine 6 of the embodiments to be described later), an electric motor (for example, the motor 7 of the embodiments to be described later), and a transmission (for example, the transmission 20 of the embodiments to be described later) having two transmission shafts (for example, the first main shaft 11 and the second intermediate shaft 16 of the embodiments to be described later) connected to the internal combustion engine, wherein the transmission is a planetary gear mechanism (for example, the planetary gear mechanism 31 of the embodiments to be described later) including a sun gear (for example, the sun gear 32 of the embodiments to be described later) and a ring gear (for example, the ring gear 35 of the embodiments to be described later) which are arranged on the same axis, a plurality of planetary gears which engage with the ring gear and the sun gear, and a carrier (for example, the carrier 36 of the embodiments to be described later) which rotatably supports the plurality of planetary gears, the sun gear is connected to one transmission shaft (for example, the first main shaft 11 and the second intermediate shaft 16 of the embodiments to be described later) of the two transmission shafts, the carrier is connected to a driving shaft, the ring gear is connected to the electric motor, and the other transmission shaft (for example, the second intermediate shaft 16 and the first main shaft 11 of the embodiments to be described later) of the two transmission shafts transmits power to the driving shaft without going via the planetary gear mechanism.

According to the power output apparatus of the first and forty-forth aspects, the power of the internal combustion engine and the power of the electric motor can be combined, and the combined power can be transmitted to the driving shaft. Additionally, since the two transmission shafts are included, the degree of freedom in design can be made high as a hybrid vehicle.

According to the power output apparatus of the second aspect, since the two transmission shafts are connected to the internal combustion engine via the connecting/disconnecting mean, respectively, a speed change shock can be reduced by reconnecting each connecting/disconnecting section.

According to the power output apparatus of the third and forth aspects, since a twin clutch type transmission can be constructed by providing any one of the two transmission shafts with speed change stages composed of odd-numbered stages and providing the other of the two transmission shafts with speed change stages composed of even-numbered stages, and the first element of the power combination mechanism can be connected to one of the transmission shafts, the degree of freedom in design can be made high as a hybrid vehicle.

According to the power output apparatus of the fifth aspect, since the torque equivalent to first speed is output by regenerating the electric motor even if there is no residual capacity in the SOC of a battery, and combining the regenerative torque and the torque of the internal combustion engine, a vehicle can be started even if there is no residual capacity in the SOC of the battery.

According to the power output apparatus of the sixth and seventh aspects, since the torque equivalent to first speed is output by regenerating the electric motor even if there is no residual capacity in the SOC of a battery, and combining the regenerative torque and the driving torque of the internal combustion engine, a vehicle can be started even if there is no residual capacity in the SOC of the battery. Moreover, by utilizing the gear pair for third speed even during the first speed traveling, it is possible to achieve reduction in size and in weight of the power output apparatus without the need for providing the gear pair for first speed separately. Additionally, since the first common driven gear serves also as both the gear pair for third speed and the gear pair for second speed, further reduction in size and weight of the power output apparatus can be achieved by compressing the layout of the speed change gear pairs.

According to the power output apparatus of the seventh aspect, since the torque equivalent to first speed is output by regenerating the electric motor even if there is no residual capacity in the SOC of a battery, and combining the regenerative torque and the driving torque of the internal combustion engine, a vehicle can be started even if there is no residual capacity in the SOC of the battery. Additionally, if a vehicle has a speed equal to or more than a predetermined speed, since the electric motor rotates in the normal direction, the first speed traveling can be performed by positing the driving torque of the internal combustion engine as the driving torque of the electric motor.

According to the power output apparatus of the eighth aspect, slip can be absorbed by the power composition mechanism during the idling of the internal combustion engine. Thus, this makes it unnecessary to provide a slip mechanism on a clutch, and makes it possible to reduce the size of the clutch.

According to the power output apparatus of the ninth aspect, the internal combustion engine can be started using the electric motor for driving. This makes it possible for the electric motor for driving to serve also as a starter which starts the internal combustion engine.

According to the power output apparatus of the tenth aspect, the battery can be charged by regenerating and generating the electric motor during the stop of a vehicle.

According to the power output apparatus of the eleventh aspect, the combined torque of the torque of the internal combustion engine and the torque of the electric motor can be transmitted to the driving shaft according to the required torque.

According to the power output apparatus of the twelfth aspect, by adjusting the torque of the electric motor according to the torque of the internal combustion engine, the internal combustion engine can be driven within a range of a highest number of revolutions from an engine stall region, and an excessive load can be prevented from being applied to the internal combustion engine.

According to the power output apparatus of the thirteenth aspect, fuel consumption can be improved by the internal combustion engine being driven in a proper driving region, and an excessive load can be prevented from being applied to the electric motor by driving the electric motor within a range where the rated output and maximum number of revolutions of the electric motor are not exceeded.

According to the power output apparatus of the fourteenth to sixteenth and twenty-third aspects, the second speed traveling can be performed by the power of the internal combustion engine, and assisting or regeneration can be made by the electric motor according to a traveling situation during the second speed traveling.

According to the power output apparatus of the seventeenth and eighteenth aspects, the third speed traveling can be performed by the power of the internal combustion engine, and assisting or regeneration can be made by the electric motor according to a traveling situation during the third speed traveling.

According to the power output apparatus of the nineteenth and thirtieth aspects, the EV traveling can be performed by the electric motor.

According to the power output apparatus of the twentieth and twenty-first aspects, the internal combustion engine can be started in two kinds of modes while the motor traveling is performed.

According to the power output apparatus of the twenty-second aspect, since the second common driven gear serves also as both the gear pair for fourth speed and the gear pair for fifth speed, the layout of the speed change gear pairs can be compressed, and reduction in size and weight of the power output apparatus can be achieved. This makes it possible to arrange the power output apparatus within an engine chamber of, for example, an FF (front engine front drive) vehicle.

According to the power output apparatus of the twenty-forth to twenty-seventh aspects, the fourth speed traveling can be performed by the power of the internal combustion engine, and assisting or regeneration can be made by the electric motor according to a traveling situation during the fourth speed traveling.

According to the power output apparatus of the twenty-eighth and twenty-ninth aspects, the fifth speed traveling can be performed by the power of the internal combustion engine, and assisting or regeneration can be made by the electric motor according to a traveling situation during the fifth speed traveling.

According to the power output apparatus of the thirty-first aspect, reduction in size and weight of the power output apparatus can be achieved by providing the intermediate shaft with the driving gear for reverse which transmits the power of the internal combustion engine to the gear pair for second speed. Additionally, since the first common driven gear serves also as the gear pair for third speed, the gear pair for second speed, and the gear pair for reverse, further reduction in size and weight of the power output apparatus can be achieved by compressing the layout of the speed change gear pairs.

According to the power output apparatus of the thirty-second and thirty-third aspects, the reverse traveling can be performed by the power of the internal combustion engine, and assisting can be made by the electric motor according to a traveling situation during the reverse traveling.

According to the power output apparatus of the thirty-forth aspect, the axial length of the intermediate shaft and the reverse shaft can be shortened by providing the reverse shaft in addition to the intermediate shaft.

According to the power output apparatus of the thirty-fifth aspect, the reverse traveling can be performed by combining the power of the internal combustion engine and the electric motor.

According to the power output apparatus of the thirty-sixth and thirty-seventh aspects, the start of a vehicle can be prevented even if unintended drive power acts.

According to the power output apparatus of the thirty-eighth aspect, even in a case where the SOC of the battery has reached a regeneration limit during the first speed traveling by using a regenerative torque, the driving torque of the electric motor can be output and electric power can be consumed. Accordingly, even if the SOC of the battery has reached the regeneration limit, the vehicle can be started.

According to the power output apparatus of the thirty-ninth aspect, even in a case where the SOC has reached a regeneration limit during the first speed traveling, shifting to the EV traveling from the first speed traveling can be smoothly made.

According to the power output apparatus of the fortieth aspect, smooth motor traveling can be performed while preventing load reduction of a control device of the electric motor, and excessive generation of heat of the electric motor.

Additionally, according to the power output apparatus of the forty-first aspect, since the shock caused by a change in drive power resulting from an engine brake, etc. can be absorbed by the power combination mechanism, a dry clutch can be used. Additionally, by using the dry clutch, the time required for connection/disconnection of the clutch can be shortened, and a speed change shock can be suppressed.

According to the power output apparatus of the forty-second aspect, the power of the internal combustion engine and the power of the electric motor can be combined by a simple construction by using a planetary gear mechanism as the power combination mechanism.

According to the power output apparatus of the forty-third aspect, the size of the power output apparatus can be reduced.

According to the power output apparatus of the forty-forth aspect, by stopping the rotation of the third element by the locking mechanism, and raising the speed reduction ratio of the power combination mechanism when the electric motor cannot be driven, the start torque of the vehicle can be secured, and a vehicle can be started only by the power of the internal combustion engine. Additionally, a further trouble resulting from locking the third element to stop the rotation of the electric motor connected to the third element and forcibly rotating the electric motor in a state where there is a defect can be suppressed.

According to the power output apparatus of the forty-fifth aspect, a sufficient speed reduction ratio is obtained irrespective of the state of the electric motor, the electric storage device, etc., and a large torque can be obtained only by the internal combustion engine.

According to the power output apparatus of the forty-sixth aspect, a mechanism which stops the rotation of the electric motor can be realized by a simple construction.

According to the power output apparatus of the forty-seventh aspect, compared with a case where the locking mechanism is composed of a brake, setting to a state where only the rotation in the normal direction of the electric motor is permitted can be made, and when an attempt to stop the rotation of the electric motor in the reverse direction is made, the electric motor can be mechanically stopped by a one-way clutch.

According to the power output apparatus of the forty-eighth aspect, if the SOC of the electric storage device is equal to or less than a first predetermined value, and the electric motor cannot be driven, the start torque of a vehicle can be secured, and the vehicle can be started only by the power of the internal combustion engine. Additionally, even if the SOC of the electric storage device is equal to or less than a first predetermined value during traveling, and a large driving torque is required according to the traveling state of the vehicle, a large driving torque can be obtained.

According to the power output apparatus of forty-ninth aspect, if the SOC of the electric storage device is equal to a more than a second predetermined value during traveling, and the electric motor should be regenerated according to the traveling state of a vehicle but the electric motor cannot be regenerated, the co-rotation of the electric motor can be prevented.

According to the power output apparatus of the fiftieth aspect, the driving range of the electric motor can be widened by recognizing the time of operation or release of the locking mechanism in advance on the basis of the information on the driving state prediction device.

According to the power output apparatus of the fifty-first aspect, if the temperature of the electric storage device is equal to or less than a third predetermined value at which normal output cannot be generated, the start torque of a vehicle can be secured, and the vehicle can be started only by the power of the internal combustion engine.

According to the power output apparatus of the fifty-second aspect, when the electric motor cannot operate normally due to a trouble of the electric motor, the electric storage device, and the control unit, or disconnection of wiring lines, the start torque of a vehicle can be secured, and the vehicle can be started only by the power of the internal combustion engine.

According to the power output apparatus of the fifty-third aspect, if there is a defect in at least one of the electric motor, the electric storage device, the control unit, and the wiring lines, the emergency traveling can be performed in a short time by notifying a driver of this defect and guiding the driver to a service center.

BRIEF DESCRIPTION OF THE DRAWINGS

FIG. 3A is a velocity diagram, and FIG. 3B is a view showing a situation where the torque of the power output apparatus is transmitted.

FIGS. 4A and 4B are views during acceleration in the Low mode, FIG. 4A is a velocity diagram, and FIG. 4B is a view showing a situation where the torque of the power output apparatus is transmitted.

FIG. 5A is a velocity diagram when the number of revolutions of a motor is fixed, and FIG. 5B is a velocity diagram when the number of revolutions of an engine is fixed.

FIGS. 8A and 8B are views during assisting in a first mode of 2nd traveling, FIG. 8A is a velocity diagram, and FIG. 8B is a view showing a situation where the torque of the power output apparatus is transmitted.

FIGS. 9A and 9B are views during charging in the first mode of 2nd traveling, FIG. 9A is a velocity diagram, and FIG. 9B is a view showing a situation where the torque of the power output apparatus is transmitted.

FIG. 10A is a velocity diagram, and FIG. 10B is a view showing a situation where the torque of the power output apparatus is transmitted.

FIGS. 11A and 11B are views during charging in the second mode of 2nd traveling, FIG. 11A is a velocity diagram, and FIG. 11B is a view showing a situation where the torque of the power output apparatus is transmitted.

FIG. 12A is a view showing a situation where the torque of the power output apparatus is transmitted in a 2nd Pre3 mode, and FIG. 12B is a view showing a situation where the torque of the power output apparatus is transmitted in a 3rd Post2 mode.

FIG. 13A is a velocity diagram, and FIG. 13B is a view showing a situation where the torque of the power output apparatus is transmitted.

FIG. 14A is a velocity diagram, and FIG. 14B is a view showing a situation where the torque of the power output apparatus is transmitted.

FIG. 15A is a velocity diagram, and FIG. 15B is a view showing a situation where the torque of the power output apparatus is transmitted.

FIG. 16A is a velocity diagram, and FIG. 16B is a view showing a situation where the torque of the power output apparatus is transmitted.

FIG. 17A is a velocity diagram, and FIG. 17B is a view showing a situation where the torque of the power output apparatus is transmitted.

FIGS. 18A and 18B are views during engine start during stop, FIG. 18A is a velocity diagram, and FIG. 18B is a view showing a situation where the torque of the power output apparatus is transmitted.

FIGS. 19A and 19B are views during charging during stop, FIG. 19A is a velocity diagram, and FIG. 19B is a view showing a situation where the torque of the power output apparatus is transmitted.

FIG. 20 is a view in a case where the vehicle state of the power output apparatus of the first embodiment and the states of a clutch, a speed-change shifter, a motor, and an engine are collected.

FIG. 23A is a velocity diagram, and FIG. 23B is a view showing a situation where the torque of the power output apparatus is transmitted.

FIGS. 24A and 24B are views during charging in the third mode of 2nd traveling, FIG. 24A is a velocity diagram, and FIG. 24B is a view showing a situation where the torque of the power output apparatus is transmitted.

FIG. 25A is a view showing a situation where the torque of the power output apparatus is transmitted in a 3rd Pre4 mode, and FIG. 25B is a view showing a situation where the torque of the power output apparatus is transmitted in a 4th Post3 mode.

FIG. 26A is a velocity diagram, and FIG. 26B is a view showing a situation where the torque of the power output apparatus is transmitted.

FIG. 27A is a velocity diagram, and FIG. 27B is a view showing a situation where the torque of the power output apparatus is transmitted.

FIGS. 28A and 28B are views during assisting in a second mode of 4th traveling, FIG. 28A is a velocity diagram, and FIG. 28B is a view showing a situation where the torque of the power output apparatus is transmitted.

FIGS. 29A and 29B are views during charging in the second mode of 4th traveling, FIG. 29A is a velocity diagram, and FIG. 29B is a view showing a situation where the torque of the power output apparatus is transmitted.

FIGS. 30A and 30B are views during assisting in a third mode of 4th traveling, FIG. 30A is a velocity diagram, and FIG. 30B is a view showing a situation where the torque of the power output apparatus is transmitted.

FIGS. 31A and 31B are views during charging in the third mode of 4th traveling, FIG. 31A is a velocity diagram, and FIG. 31B is a view showing a situation where the torque of the power output apparatus is transmitted.

FIG. 33A is a velocity diagram, and FIG. 33B is a view showing a situation where the torque of the power output apparatus is transmitted.

FIG. 34A is a velocity diagram, and FIG. 34B is a view showing a situation where the torque of the power output apparatus is transmitted.

FIG. 35A is a velocity diagram, and FIG. 35B is a view showing a situation where the torque of the power output apparatus is transmitted.

FIG. 36A is a velocity diagram, and FIG. 36B is a view showing a situation where the torque of the power output apparatus is transmitted.

FIG. 37 is a view in a case where the vehicle state of the power output apparatus of the second embodiment and the states of a clutch, a speed-change shifter, a motor, and an engine are collected.

FIG. 42A is a velocity diagram, and FIG. 42B is a view showing a situation where the torque of the power output apparatus is transmitted.

DETAILED DESCRIPTION OF THE PREFERRED EMBODIMENTS

Respective embodiments of the invention will be specifically described with reference to the drawings.

First Embodiment

Figure 1:
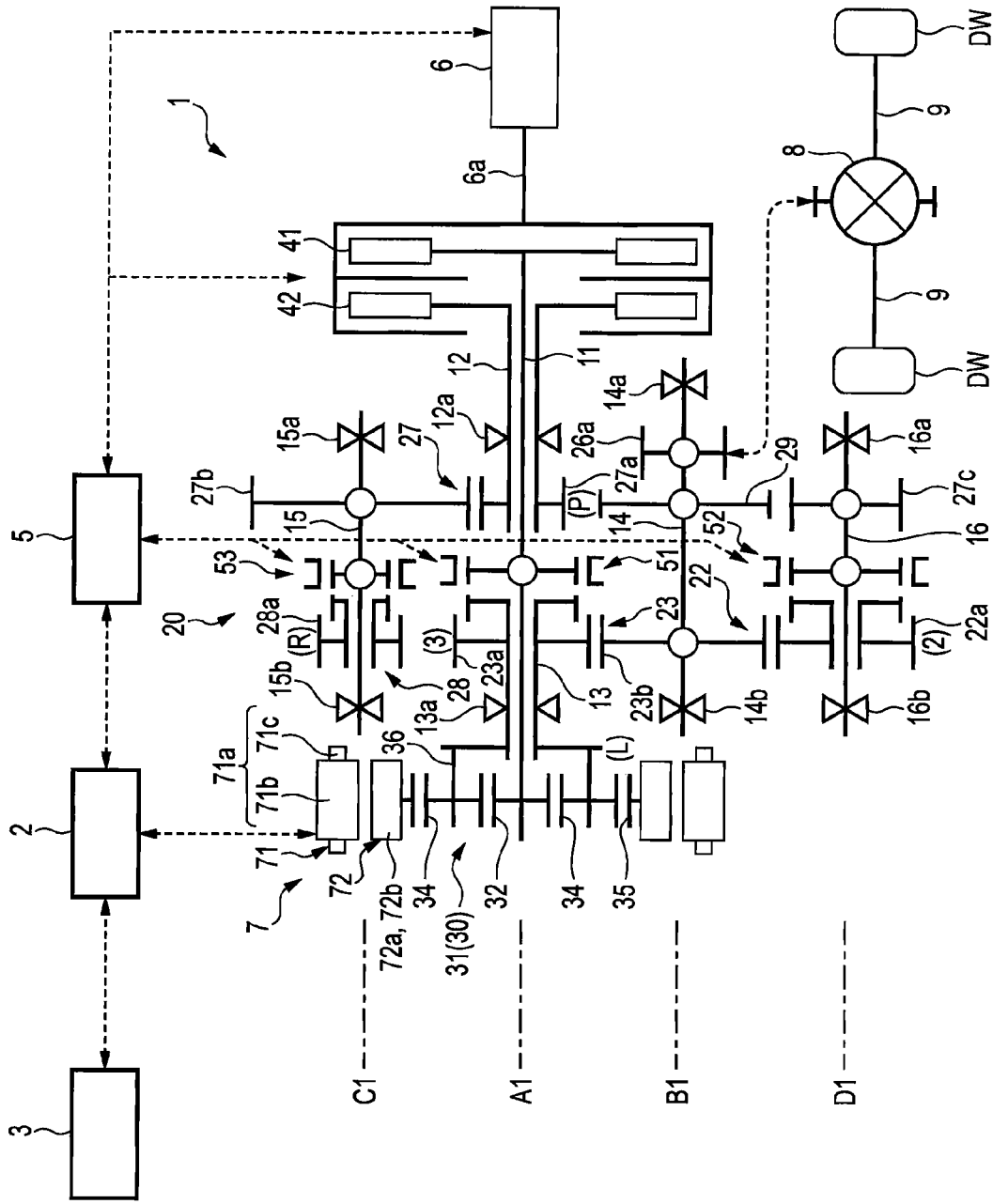
FIG. 1 is a view schematically showing a power output apparatus according to a first embodiment of the invention, and is a view seen in the direction of an arrow at a line I-I of FIG. 2.
Figure 2:
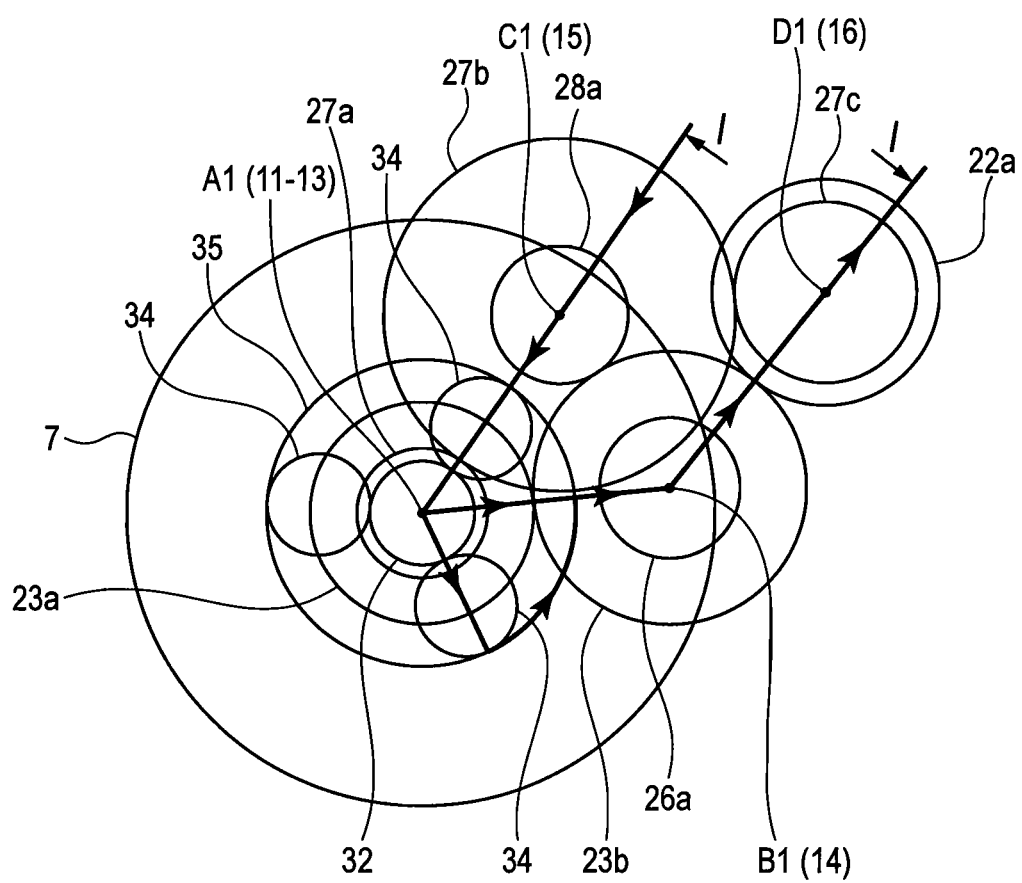
FIG. 2 is an explanatory view showing the relationship of a transmission mechanism of the power output apparatus of FIG. 1.

FIG. 1 schematically shows a power output apparatus 1 according to a first embodiment of the invention. The power output apparatus 1 drives driving wheels DW and DW via driving shafts 9 and 9 of a vehicle (not shown), and includes an internal combustion engine (hereinafter referred to as an "engine") 6 that is a driving source, an electric motor (hereinafter referred to as a "motor") 7, a transmission 20 for transmitting power to the driving wheels DW and DW attached to the driving shafts 9 and 9, a power combination mechanism 30, and a differential gear mechanism 8. In addition, in the following description, power is obtained by multiplying torque by number of revolutions, i.e., "power (output)=torque×number of revolutions."

The engine 6 is, for example, a gasoline engine, and a crankshaft 6a of the engine 6 is provided with a first clutch (a first connecting/disconnecting section) and a second clutch 42 (a second connecting/disconnecting section).

The motor 7 has a stator 71 that is a three-phase brushless DC motor, and composed of 3n armatures 71a, and a rotor 72 arranged so as to face the stator 71. The armatures 71a are composed of an iron core 71b and coils 71c wound around the iron core 71b, are fixed to a casing which is not shown, and are arranged substantially at equal intervals in a peripheral direction about a rotary shaft. The 3n coils 71c constitute three-phase coils of n sets of U phase, V phase, and W phase.

The rotor 72 has n permanent magnets 72a substantially arranged at equal intervals about the rotary shaft, and the polarities of two adjacent permanent magnets 72a are different from each other. A fixing portion 72b which fixes each permanent magnet 72a has a ring shape made of a soft magnetic material (for example, iron), and is attached to the outer peripheral side of a ring gear 35 of the power combination mechanism 30 which will be described later. This construction allows the rotor 72 to rotate integrally with the ring gear 35.

The power combination mechanism 30 is composed of a single pinion type planetary gear mechanism 31. Specifically, the power combination mechanism has a sun gear 32 (a first element or a third element), the ring gear 35 (the third element or the first element) arranged on the same axis as that of the sun gear 32 and arranged so as to surround the periphery of the sun gear 32, a planetary gear 34 which engages with the sun gear 32 and the ring gear 35, and a carrier 36 (a second element) which supports the planetary gear 34 so that rotation and revolution can be made. In this way, the sun gear 32, the ring gear 35, and the carrier 36 are adapted so that they can make differential rotation.

In the planetary gear mechanism 31, the sun gear 32 and the ring gear 35 receive reaction forces in directions opposite to each other. Thus, when the engine 6 becomes a driving side, a reaction force acts so that the motor 7 rotates towards the side opposite to the rotational direction of the engine 6, and when the motor 7 becomes a driving side, a reaction force act so that the engine 6 rotates towards the side opposite to the rotational direction of the motor 7. Additionally, when both the engine 6 and the motor 7 are driven, the power transmitted from the ring gear 35 and the power transmitted from the sun gear 32 are combined via the carrier 36.

The transmission 20 is a so-referred to a twin clutch type transmission including at least two or more transmission mechanisms, and two transmission shafts connected to the engine 6 via the aforementioned first clutch 41 and the second clutch 42, respectively. In addition, the power output apparatus 1 of this embodiment is a two-speed transmission including two transmission mechanisms of a speed change gear pair 22 for second speed, and a speed change gear pair 23 for third speed whose speed reduction ratio is smaller than the speed change gear pair 22 for second speed.

More specifically, the transmission 20 includes a first main shaft 11 (a first transmission shaft), a second main shaft 12, and a connecting shaft 13 which are arranged on the same axis (a rotational axis A1) as the crankshaft 6a of the engine 6, a counter shaft 14 which is rotatable about a rotational axis B1 arranged parallel to the rotational axis A1, a first intermediate shaft 15 (an intermediate shaft) which is rotatable about a rotational axis C1 arranged parallel to the rotational axis A1, and a second intermediate shaft 16 (a second transmission shaft) which is rotatable about a rotational axis D1 arranged parallel to the rotational axis A1.

The first clutch 41 is provided at the first main shaft 11 on the side of the engine 6, and the sun gear 32 of the planetary gear mechanism 31 is attached to the first main shaft 11 on the side opposite to the engine 6 so that the transmission of power to the sun gear 32 from the crankshaft 6a can be connected or disconnected by the first clutch 41.

The second main shaft 12 is shorter than the first main shaft 11 and is formed in a hollow shape, is relatively rotatably arranged so as to cover the periphery of the first main shaft 11 on the side of the engine 6, and is supported by a bearing 12a fixed to a casing which is not shown. Additionally, the second clutch 42 is provided at the second main shaft 12 on the side of the engine 6, and an idle driving gear 27a is attached to the second main shaft on the side opposite to the engine 6 so that the transmission of power to the idle driving gear 27a from the crankshaft 6a can be connected and disconnected by the second clutch 42.

The connecting shaft 13 is shorter than the first main shaft 11 and is formed in a hollow shape, is relatively rotatably arranged so as to cover the periphery of the first main shaft 11 on the side opposite to the engine 6, and is supported by a bearing 13a fixed to the casing which is not shown. Additionally, a driving gear 23a for third speed is attached to the connecting shaft 13 on the side of the engine 6, and the carrier 36 of the planetary gear mechanism 31 is attached to the connecting shaft on the side opposite to the engine 6 across the bearing 13a. Accordingly, the carrier 36 and the driving gear 23a for third speed which are attached to the connecting shaft 13 are adapted to rotate integrally by the revolution of the planetary gear 34.

Moreover, the first main shaft 11 is provided with a first speed change shifter 51 which connects or disconnects the first main shaft 11 and the driving gear 23a for third speed attached to the connecting shaft 13. Thus, when the first speed change shifter 51 is brought into an engaged state in a connecting position for third speed, the first main shaft 11 and the driving gear 23a for third speed are connected together and rotate integrally, and when the first speed change shifter 51 is in a neutral position, the first main shaft 11 and the driving gear 23a for third speed are released, and rotate relative to each other. In addition, when the first main shaft 11 and the driving gear 23a for third speed rotate integrally, the sun gear 32 attached to the first main shaft 11 and the carrier 36 connected to the driving gear 23a for third speed by the connecting shaft 13 rotate integrally, the ring gear 35 also rotates integrally, and the planetary gear mechanism 31 is locked and integrated.

The counter shaft 14 has both ends rotatably supported by bearings 14a and 14b fixed to the casing (not shown), and a first common driven gear 23b which engages with the driving gear 23a for third speed attached to the connecting shaft 13, a parking gear 29 which constitutes a parking locking mechanism (not shown), and a final gear 26a which engages with the differential gear mechanism 8 are attached to the counter shaft 14. The final gear 26a is connected to the differential gear mechanism 8, and the differential gear mechanism 8 is connected to the driving wheels DW and DW via the driving shafts 9 and 9. Accordingly, the power transmitted to the first common driven gear 23b is output to the driving shafts 9 and 9 from the final gear 26a, and the counter shaft 14 is constituted as an output shaft in the power output apparatus 1. In addition, the first common driven gear 23b constitutes the gear pair 23 for third speed along with the driving gear 23a for third speed.

The first intermediate shaft 15 has both ends rotatably supported by bearings 15a and 15b fixed to the casing (not shown), and a first idle driven gear 27b which engages with the idle driving gear 27a attached to the second main shaft 12 is attached to the first intermediate shaft 15. Additionally, the first intermediate shaft 15 is provided with a driving gear 28a for reverse which is rotatable relative to the first intermediate shaft 15, and the driving gear 28a for reverse engages with the first common driven gear 23b attached to the counter shaft 14, and constitutes a gear pair 28 for reverse along with the first common driven gear 23b. Moreover, the first intermediate shaft 15 is provided with a reverse shifter 53 which connects or disconnects the first intermediate shaft 15 and the driving gear 28a for reverse. Thus, when the reverse shifter 53 is brought into an engaged state in a connecting position for reverse, the first idle driven gear 27b and the driving gear 28a for reverse which are attached to the first intermediate shaft 15 rotate integrally, and when the reverse shifter 53 is in the neutral position, the first idle driven gear 27b and the driving gear 28a for reverse rotate relative to each other.

The second intermediate shaft 16 has both ends rotatably supported by bearings 16a and 16b fixed to the casing (not shown), and a second idle driven gear 27c which engages with the first idle driving gear 27b attached to the first intermediate shaft 15 is attached to the second intermediate shaft 16. In addition, the second idle driven gear 27c constitutes an idle gear train 27 along with the aforementioned idle driving gear 27a and first idle driven gear 27b. Additionally, the second intermediate shaft 16 is provided with a driving gear 22a for second speed which is rotatable relative to the second intermediate shaft 16, and the driving gear 22a for second speed engages with the first common driven gear 23b provided at the counter shaft 14, and constitutes the gear pair 22 for second speed along with the first common driven gear 23b. Moreover, the second intermediate shaft 16 is provided with a second speed change shifter 52 which connects or disconnects the second intermediate shaft 16 and the driving gear 22a for second speed. Thus, when the second speed change shifter 52 is brought into an engaged state in a connecting position for second speed, the second idle driven gear 27c and the driving gear 22a for second speed which are attached to the second intermediate shaft 16 rotate integrally, and when the second speed change shifter 52 is in the neutral position, the second idle driven gear 27c and the driving gear 22a for second speed rotate relative to each other.

Accordingly, the transmission 20 is adapted such that the driving gear 23a for third speed that is an odd-numbered speed change stage is provided around the first main shaft 11 that is one transmission shaft of the two transmission shafts, the driving gear 22a for second speed that is an even-numbered speed change stage is provided at the second intermediate shaft 16 that is the other transmission shaft of the two transmission shafts, and the sun gear 32 of the planetary gear mechanism 31 which constitutes the power combination mechanism 30 is attached to the first main shaft 11.

The power output apparatus 1 constructed in this way is annularly formed so that the transmission 20 is arranged between the engine 6 and the motor 7 along the rotational axis A1, and the motor 7 surrounds the outside of the power combination mechanism 30. More specifically, some or all of the rotor 72, the stator 71, or the coils 71c (winding portions) wound around the stator 71, which constitute the motor 7, are arranged so as to overlap the planetary gear mechanism 31 in the axial direction.

In addition, the first speed change shifter 51, the second speed change shifter 52, and the reverse shifter 53, are able to use, for example, an engagement clutch, such as a dog clutch. In this embodiment, a clutch mechanism which has a synchronization mechanism (synchronizer mechanism) which synchronizes shafts to be connected to each other or synchronizes a shaft to be connected to the number of revolutions of a gear is used.

By the above construction, the crankshaft 6a of the engine 6 is connected to the driving wheels DW and DW via the first main shaft 11, the gear pair 23 for third speed (the driving gear 23a for third speed and the first common driven gear 23b), the counter shaft 14, the final gear 26a, the differential gear mechanism 8, and the driving shafts 9 and 9 by connecting the first clutch 41 and bringing the first speed change shifter 51 into an engaged state in a connecting position for third speed. Hereinafter, a series of paths of the above first main shaft 11 to the driving shafts 9 and 9 is suitably referred to as a "first transmission path."

The crankshaft 6a of the engine 6 is connected to the driving wheels DW and DW via the second main shaft 12, the idle gear train 27 (the idle driving gear 27a, the first idle driven gear 27b, and the second idle driven gear 27c), the second intermediate shaft 16, the gear pair 22 for second speed (the driving gear 22a for second speed and the first common driven gear 23b), the counter shaft 14, the final gear 26a, the differential gear mechanism 8, and the driving shafts 9 and 9 by connecting the second clutch 42 and bringing the second speed change shifter 52 into an engaged state in the connecting position for second speed. Hereinafter, a series of paths of the above second main shaft 12 to the driving shafts 9 and 9 is suitably referred to as a "second transmission path."

The carrier 36 of the power combination mechanism 30 is connected to the driving wheels DW and DW via the connecting shaft 13, the gear pair 23 for third speed (the driving gear 23a for third speed and the first common driven gear 23b), the counter shaft 14, the final gear 26a, the differential gear mechanism 8, and the driving shafts 9 and 9. Hereinafter, a series of paths of the above carrier 36 to the driving shafts 9 and 9 is suitably referred to as a "third transmission path."

In the power output apparatus 1, an engine torque in a normal direction transmitted from the sun gear 32 rotates the ring gear 36 in a reverse direction due to the characteristics of the planetary gear mechanism 31, as shown by dotted lines of FIG. 4A, by connecting the first clutch 41. By applying a regenerative torque in the direction in which the number of revolutions of the ring gear 36 is reduced, i.e., in the normal direction, to the motor 7 connected to the ring gear 36, regeneration (power generation) can be made by the motor 7, and a battery 3 which will be described later can be charged. Additionally, if the carrier 36 rotates at a predetermined number of revolutions or higher, namely, if a vehicle speed becomes a predetermined speed or higher, as shown by a solid line of FIG. 4A, the motor 7 shifts to the rotation in the normal direction from the rotation in the reverse direction (refer to FIG. 4). Also, by applying driving torque in the direction in which the number of revolutions of the ring gear 36 is increased, i.e., in the normal direction, to the motor 7 connected to the ring gear 36, driving torque (hereinafter referred to as motor torque) can be output from the motor 7. At this time, a combined torque obtained by adding the engine torque and the regenerative torque or the motor torque is transmitted to the driving shafts 9 and 9 via the third transmission path from the carrier 36, and the gear ratio of the power combination mechanism 30 and the gear pair 23 for third speed is set so that the combined torque becomes a torque corresponding to a start gear, i.e., a first speed. That is, the power output apparatus 1 of this embodiment is adapted to be able to start a vehicle even if there is no residual capacity (hereinafter referred to as SOC) of the battery 3 which will be described later.

Referring back to FIG. 1, the power output apparatus 1 of this embodiment is adapted such that the motor 7 is connected to the battery 3 via a power control unit (hereinafter referred to as PDU) 2 which controls the operation of the motor, and the supply of electric power from the battery 3 and the regeneration of energy to the battery 3 are performed via the PDU 2. That is, the motor 7 is driven by the electric power supplied via the PDU 2 from the battery 3, and is able to perform regenerative power generation by the rotation of the driving wheels DW and DW and the power of the engine 6 during deceleration traveling, thereby charging the battery 3 (energy recovery). Moreover, the PDU 2 is connected to an electrical control unit (hereinafter referred to as an ECU) 5. The ECU 5 is a control device for carrying out various kinds of control of the whole vehicle. An acceleration request, a braking request, the number of revolutions of the engine, the number of revolutions of the motor, a motor temperature, the number of revolutions of the first and second main shaft 11 and 12, the number of revolutions of the counter shaft 14 or the like, a vehicle speed, a shift position, the SOC, etc. are input to the ECU 5, while a signal which controls the engine 6, a signal which controls the motor 7, a signal indicating a power generation state, a charging state, a discharging state, etc. in the battery 3, signals which control the first and second speed change shifters 51 and 52 and the reverse shifter 53, etc. are output from the ECU 5. In addition, an electric storage device, such as a capacitor, may be used instead of the battery 3. A fuel cell system (not shown) other than electric storage device may be provided. This fuel cell system is a system which makes hydrogen and oxygen react with each other to obtain an electromotive force, and is able to supply generated electric power to the motor or charge the electric storage device.

The power output apparatus 1 constructed in this way, as shown in FIG. 20 has functions of torque combination driving, normal traveling, motor traveling, engine start during motor traveling, etc. In addition, the torque combination driving means a state where only the first clutch 41 is connected, and any gear is not in an engaged state (including a state where the second clutch 42 is disconnected even if the second speed change shifter 52 or the like is in an engaged state). In this state, as described above, the combined torque of the engine 6 and the motor 7 is transmitted to the driving shafts 9 and 9 as a series of equivalent torque via the third transmission path. Hereinafter, the state where only the first clutch 41 is connected and a gear is not engaged is referred to as a Low mode. This Low mode is usually selected when a vehicle is started or when a large torque is required. Additionally, except for a case where a particular definition is made in the following description, it is assumed that the first and second clutches 41 and 42 are disconnected, and the first and second 51 and 52 and the reverse shifter 53 are in the neutral position. Hereinafter, this state is referred to as an initial state.

Figure 3B:
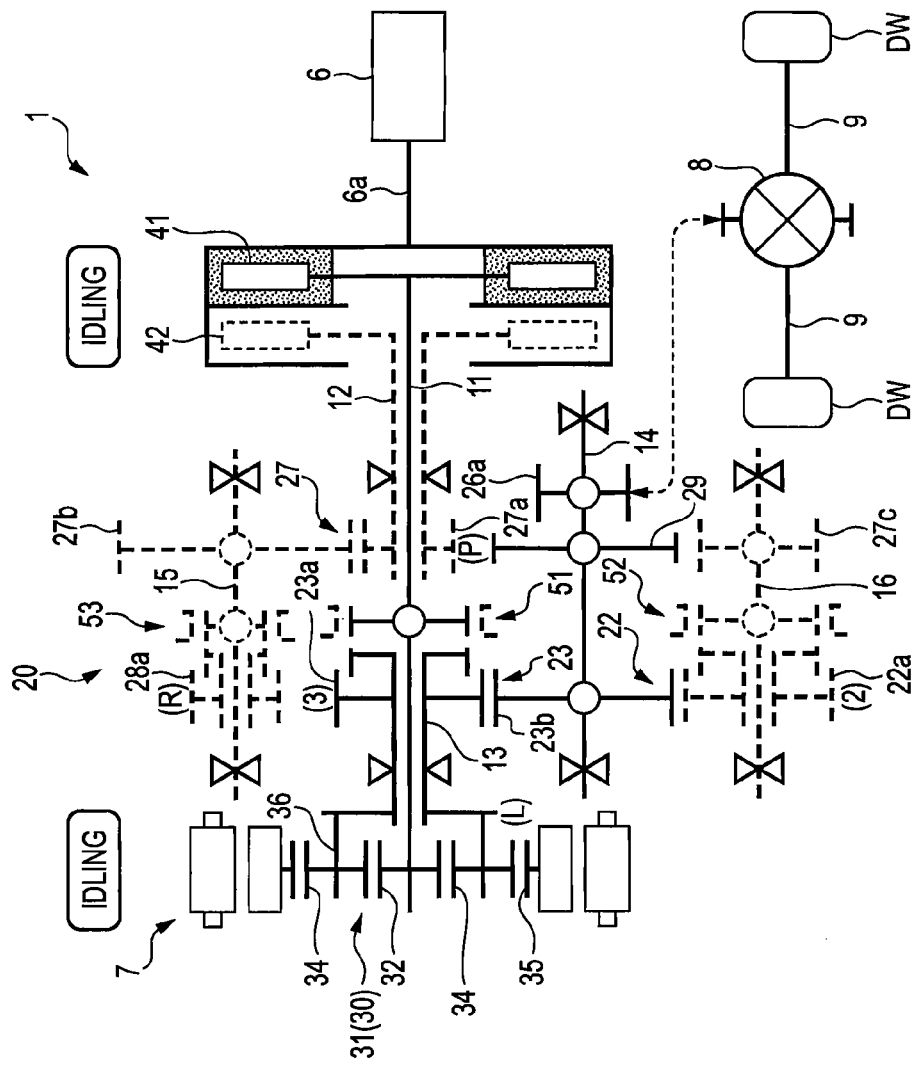
FIGS. 3A and 3B are views during a stop in a Low mode.

First, a state in which a vehicle is being stopped in the Low mode will be described. In addition, at this time, it is assumed that the engine 6 will be started, and the engine start by the motor 7 will be described later. FIG. 3B shows a state where the engine 6 is idled with the first clutch connected. At this time, the torque of the engine 6 is transmitted to the sun gear 32 from the first main shaft 11. However, since the torque of the engine 6 is small, the torque of the sun gear 32 allows the planetary gear 34 to rotate without revolving, and is transmitted to the ring gear 35. Since the ring gear 35 rotates in the direction opposite to the rotational direction of the sun gear 32, the ring gear rotates in the reverse direction here, and the motor 7 is regenerated. Accordingly, as shown in the velocity diagram of FIG. 3A, as for the sun gear 32 and the ring gear 35, the sun gear 32 rotates in the normal direction about the carrier 36 whose revolution has stopped, and the ring gear 35 rotates in the reverse direction about the carrier. This makes it possible to absorb slip by the planetary gear mechanism 31 serving as the power combination mechanism 30 during the idling of the engine 6.

Figure 3A:
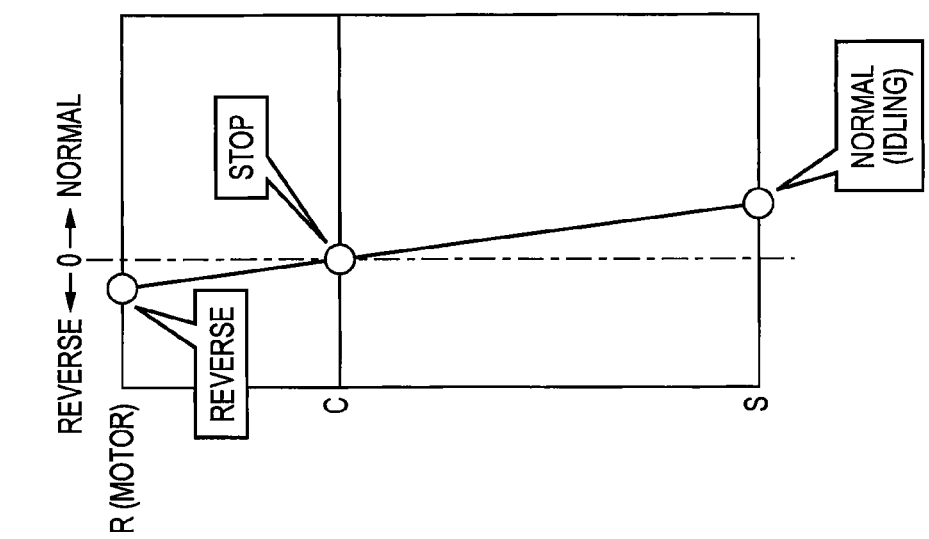

In addition, in the velocity diagram of FIG. 3A, the stop position of the motor 7 is defined as 0, the right is defined as the normal direction, the left is defined as the reverse direction, and the sun gear 32 is represented by "S," the carrier 36 is represented by "C," and the ring gear 35 is represented by "R." This also the same in the velocity diagram which will be described later. Additionally, in the drawing (for example, FIG. 4B) showing a transmission situation of a torque which will be described later, a hatched thick arrow represents the flow of a torque, and the hatching in the arrow corresponds to the hatching of an arrow representing the torque of each velocity diagram (for example, FIG. 4A). Additionally, the normal direction of the motor 7 means a direction in which a torque in the direction of forward movement is transmitted to the driving wheels DW and DW via the driving shafts 9 and 9, and the reverse direction means a direction in which a torque in the direction of backward movement is transmitted to the driving wheels DW and DW via the driving shafts 9 and 9.

Figure 5A:
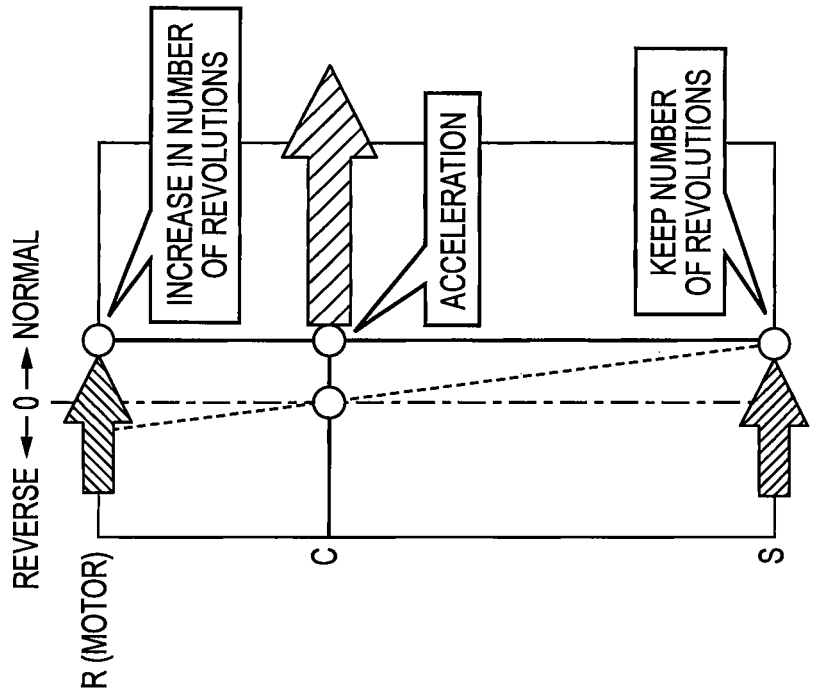
FIGS. 5A and 5B are views showing an acceleration pattern in the Low mode.
Figure 5B:
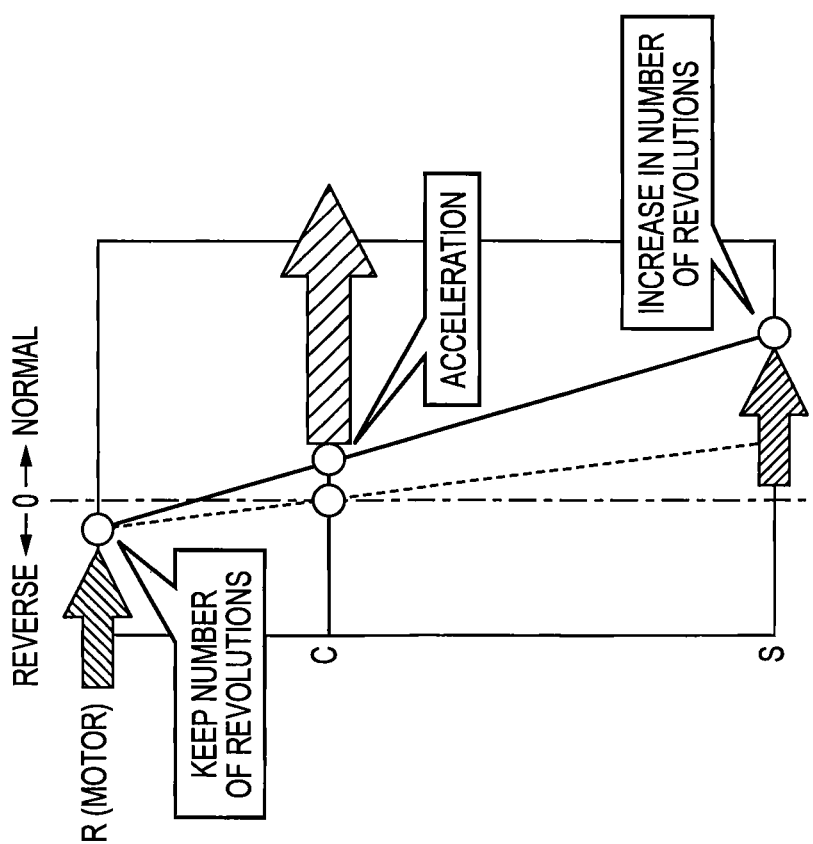

Next, an acceleration state in the Low mode will be described. An acceleration pattern is performed by (i) raising both the number of revolutions of the motor 7 and the engine 6 as shown in FIG. 4A, (ii) raising the number of revolutions of the engine 6 without changing the number of revolutions of the motor 7 as shown in FIG. 5A, or (iii) by raising the number of revolutions of the motor 7 without changing the number of revolutions of the engine 6 as shown in FIG. 5B. In addition, the drive power of a vehicle is determined by a combined power of the power of the engine 6 and the power of the motor 7 in case of (i), the drive power of the vehicle is determined by the power of the engine 6 in case of (ii), and the drive power of the vehicle is determined by the power of the motor 7 (iii).

A case where the acceleration state of (ii) is selected is, for example, a case where the residual capacity of the electric storage device is small. For example, when the residual capacity is small for example when the electric storage device is on a slope, a drive power equivalent to the first speed can be transmitted to the driving shafts 9 and 9 while the engine torque is increased to maintain and regenerate the number of revolutions of the motor 7 as in FIG. 5A. Accordingly, even when there is no residual capacity in the SOC of the battery 3, start or low speed traveling can be performed while the motor 7 is regenerated to charge the battery 3.

On the other hand, a case where the acceleration state of (iii) is selected is, for example, a case where the SOC of the battery 3 is large, or the like. Since the battery cannot be charged any more when the SOC of the battery 3 is large, the SOC of the battery 3 can be reduced by driving the motor 7 to efficiently utilize regeneration energy. In addition, if the number of revolutions of the engine 6 is too high compared with that of the motor 7, over-revolution is caused, and if the number of revolutions of the motor 7 is too high compared with the engine 6, since an engine stall is caused, it is necessary to control the balance between the engine 6 and the motor 7.

If the control during vehicle acceleration in the Low mode is described taking the case of (i) as an example, as shown in FIG. 4A, the engine torque in the normal direction transmitted from the sun gear 32 and the motor torque in the normal direction transmitted from the ring gear 35 are combined in the carrier 36 by increasing the engine torque and the motor torque, and a carrier torque in the normal direction obtained by combining the engine torque and the motor torque acts on the carrier 36. This enables the carrier 36 to revolve around the sun gear 32, and as shown in FIG. 4B, and makes it possible to transmit the carrier torque to the driving wheels DW and DW via the third transmission path as a total drive power, thereby accelerating a vehicle.

Figure 6:
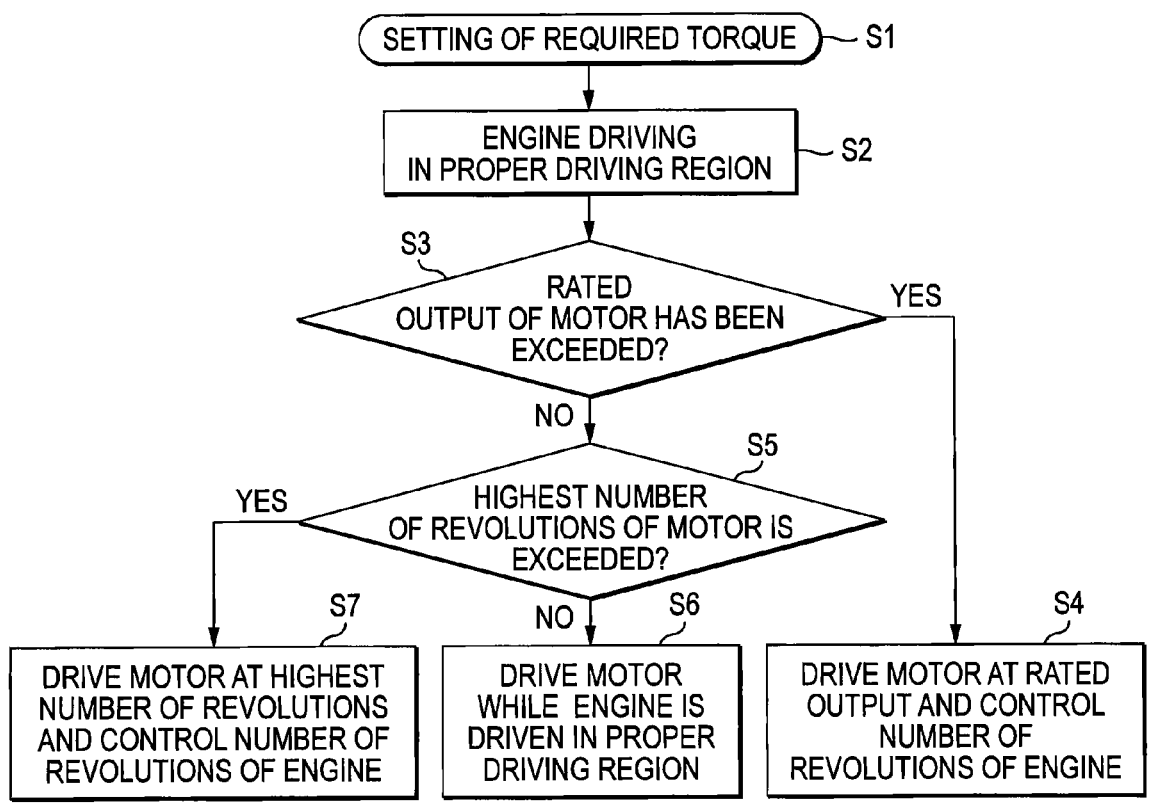
FIG. 6 is a flow chart showing the flow of control during acceleration in the Low mode.

Here, the flow of control of the engine and the motor in FIGS. 4A and 4B will be described with reference to FIG. 6.

The ECU 5 serving as a required power setting section first sets the required power to be transmitted to the driving shafts 9 and 9 (S1). Subsequently, the ECU 5 drives the engine 6 in a proper driving region of the engine 6 (S2), determines whether or not the rated output of the motor 7 is exceeded (S3), and if the rated output of the motor 7 is exceeded, driving the motor 7 at its rated output (S4) and controls the number of revolutions of the engine 6. On the other hand, if the rated output of the motor 7 is not exceeded, the ECU determines whether or not the maximum number of revolutions of the motor 7 is exceeded (S5). As a result, if the maximum number of revolutions of the motor 7 is not exceeded, the ECU drives the motor 7 while the engine 6 is driven in a proper driving region 7 (S6), and if the maximum number of revolutions of the motor 7 is exceeded, the ECU drives the motor 7 at its maximum number of revolutions, and controls the number of revolutions of the engine 6 (S7). In addition, the proper driving region of the engine 6 means a region where the efficiency of the engine 6 does not become noticeably bad.

In this way, by driving the engine 6 within a range of a highest number of revolutions from a region where the engine does not stall, preferably, driving the engine 6 in a proper driving region where the engine is efficient, by comparing a required power with a combined power combined by the power combination mechanism 30 to control the power of the motor 7, and by driving the motor 7 in a range where the rated output and the maximum number of revolutions of the motor are not exceeded, occurrence of a defect in the engine 6 and the motor 7 can be suppressed.

Next, the control of the power output apparatus 1 which shifts up to second speed traveling from the Low traveling will be described.

Figure 7A:
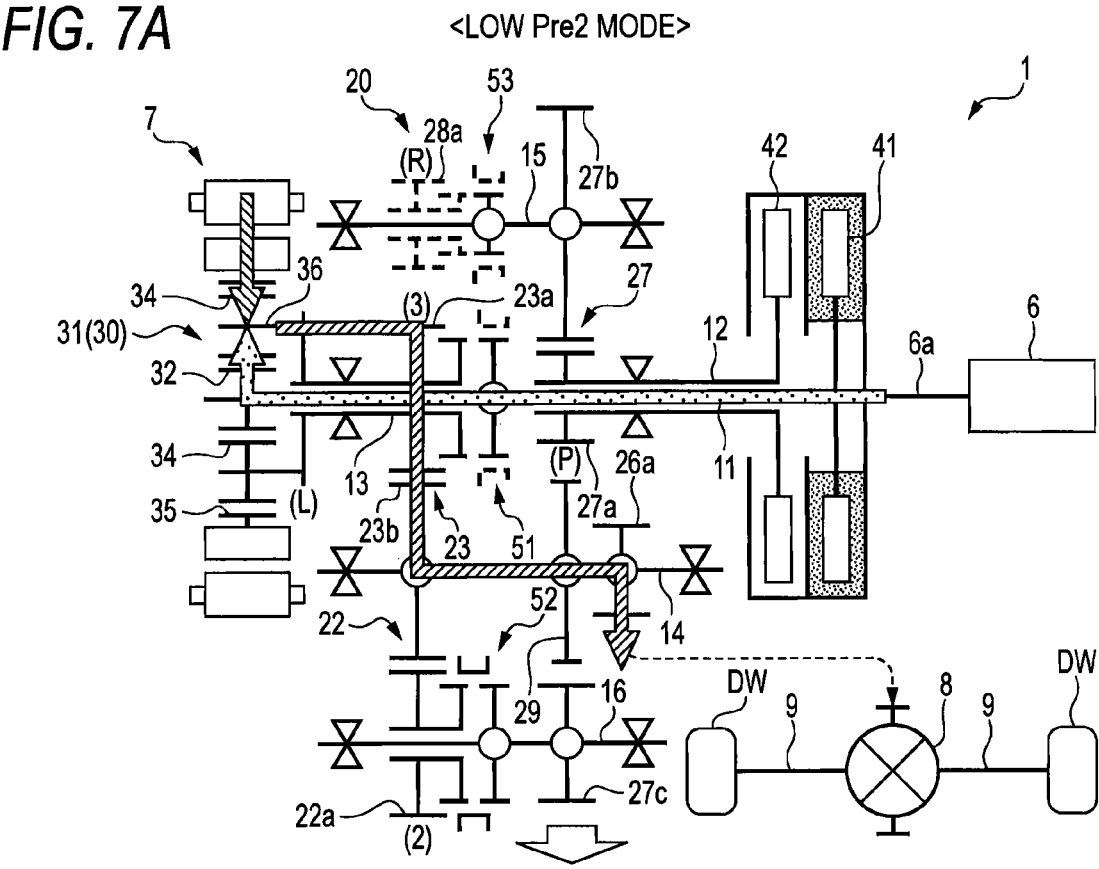
FIG. 7A is a view showing a situation where the torque of the power output apparatus is transmitted in a Low Pre2 mode.
Figure 7B:
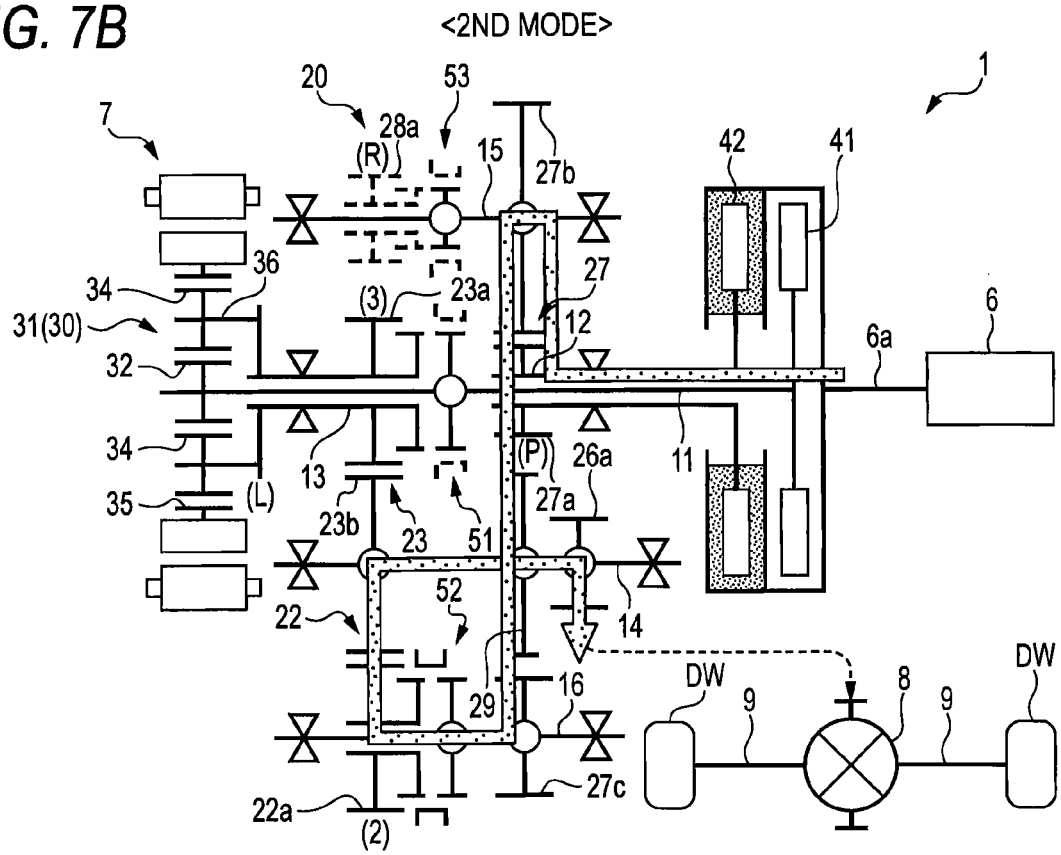
FIG. 7B is a view showing a situation where the torque of the power output apparatus is transmitted in a 2nd mode.

From the acceleration state in the Low mode of FIG. 4B where only the first clutch 41 is connected, as shown in FIG. 7A, the second speed change shifter 52 is brought into an engaged state in the connecting position for second speed, and the second intermediate shaft 16 and the driving gear 22a for second speed are connected together. Hereinafter, a state where the second speed change shifter 52 is brought into an engaged state in the connecting position for second speed in the Low mode is referred to as a Low Pre2 mode. Subsequently, by reconnecting the first and second clutches 41 and 42, i.e., by disconnecting the first clutch 41 and connecting the second clutch 42, as shown in FIG. 7B, the power of the engine 6 is transmitted to the driving shafts 9 and 9 via the second transmission path, thereby realizing the second speed traveling. Hereinafter, a state of FIG. 7B where the second speed change shifter 52 is brought into an engaged state in the connecting position for second speed, and the second clutch 42 is connected is referred to as a 2nd mode.

Figures 8A, 8B:
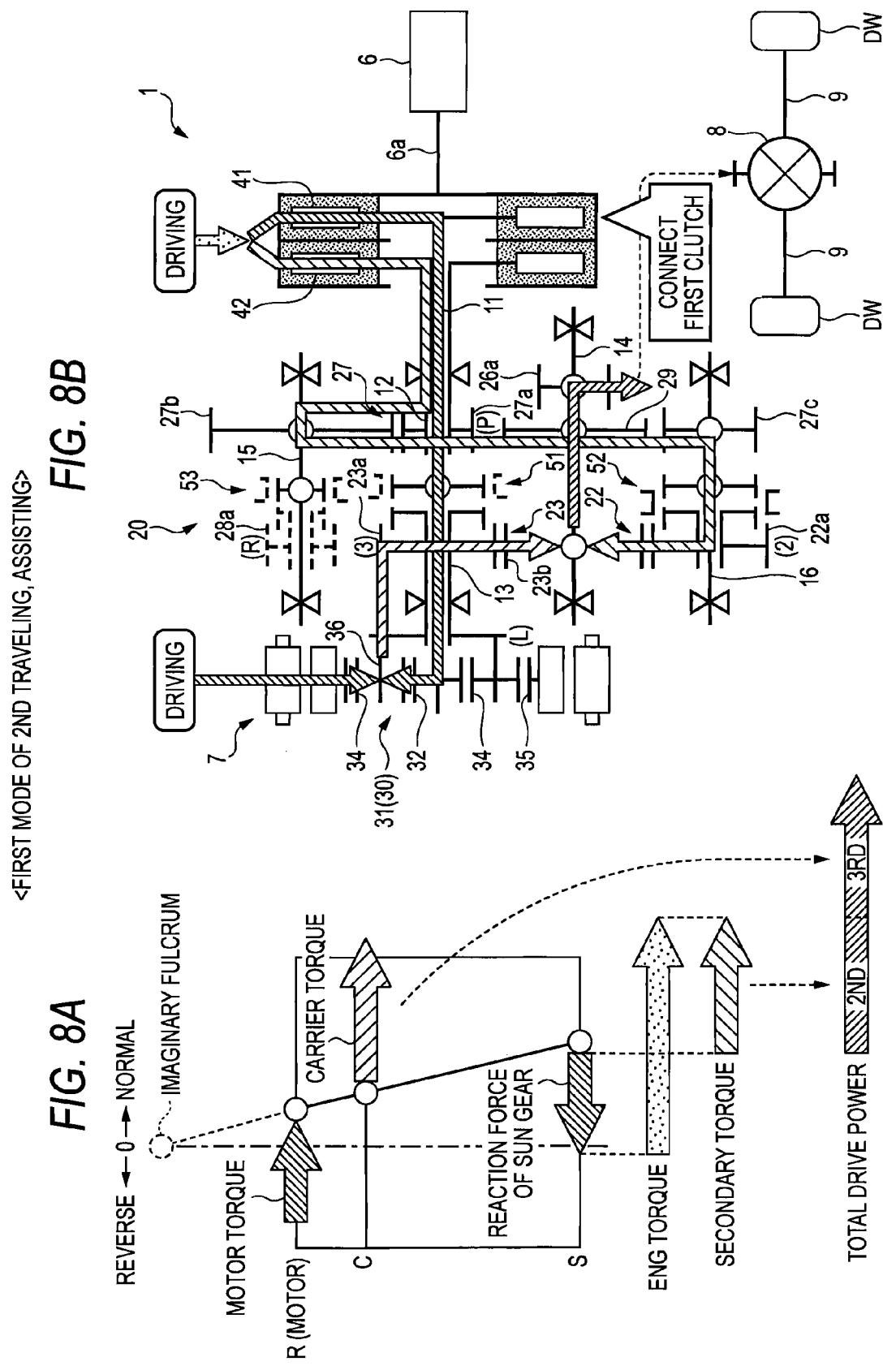

Subsequently, a case where assisting or charging by the motor 7 is performed according to two modes (a first mode of 2nd traveling and a second mode of 2nd traveling) during traveling in the 2nd mode will be described. The first mode of 2nd traveling, as shown in FIG. 8B, is realized by connecting the first clutch 41 from a state where the second clutch 42 of FIG. 7B is connected. This means that a certain ratio is forcibly created in the engine 6 and the motor 7 by utilizing the fact that the number of revolutions of the sun gear 32 connected to the engine 6 via the first main shaft 11 by connecting the first clutch 41 necessarily becomes higher than the number of revolutions of the carrier 36 which rotates by the engagement between the driving gear 23a for third speed and the first common driven gear 23b in the second speed traveling where traveling is made via the gear pair 22 for second speed by connecting the first clutch 41. If the number of revolutions of the carrier 36 is lower than the number of revolutions of the sun gear 32 from the characteristics of the planetary gear mechanism 31 which constitutes the power combination mechanism 30, an imaginary fulcrum P of the planetary gear mechanism 31 is located in an upper part in FIG. 8A, and the number of revolutions of the ring gear 35 necessarily becomes lower than the number of revolutions of the carrier 36.

When assisting is made by the motor 7 in this mode, as shown in FIGS. 8A and 8B, the combined torque of the motor torque transmitted from the ring gear 35 and the torque in the normal direction transmitted from the sun gear 32 is transmitted to the carrier 36 as the carrier torque by making the motor torque in the normal direction act from the motor 7, and this carrier torque is transmitted to the first common driven gear 23b as a 3rd torque from the driving gear 23a for third speed by the engagement between the driving gear 23a for third speed and the first common driven gear 23b. Additionally, since a reaction force in a direction opposite to the motor torque, here in the reverse direction acts on the sun gear 32 by the engagement with the planetary gear 34 and is transmitted to the first main shaft 11, a secondary torque obtained by deducting the reaction force in the sun gear 32 from the engine torque is transmitted from the second main shaft 12 to the gear train 22 for second speed as a 2nd torque via the idle gear train 27. Also, the torque obtained by adding the 3rd torque and the 2nd torque in the counter shaft 14, here the first common driven gear 23b is transmitted to the driving wheels DW and DW via the final gear 26a, the differential gear mechanism 8, and the driving shafts 9 and 9 as the total drive power. As a result, engine traveling can be assisted by the motor 7.

In addition, although assist traveling in the first mode of 2nd traveling can be selected as the assist traveling of the second speed traveling, the assist traveling is selected even when the SOC of the battery 3 has reached a regeneration limit during extremely low speed traveling in the Low mode shown in FIG. 4, i.e., in a state in which the motor 7 rotates in the reverse direction and the carrier 36 is rotating slightly in the normal direction. At this time, control is made so that a proper torque is transmitted to the driving wheels DW and DW via the driving shafts 9 and 9 in a so-called half clutch state where the first and second clutches 41 and 42 are connected while being slipped. At this time, as shown in FIG. 8A, since the motor 7 outputs the motor torque so that the number of revolutions is increased in the normal direction, electric power can be consumed, and SOC which cannot be reduced in the extremely low speed traveling in the Low mode can be lowered.

Moreover, if the SOC reaches a regeneration limit when shifting to motor traveling (which will be described later)

from the extremely-low speed traveling in the Low mode is realized, since a regenerative torque cannot be output, the motor 7 cannot be shifted in the normal direction from the reverse direction. However, by bringing the second clutch into the half clutch state in the first mode of 2nd traveling from the Low mode, thereby performing shifting to the assist traveling, the loss of the regenerative torque when the motor 7 is shifted in the normal direction from the reverse direction can be prevented, and shifting to the motor traveling can be smoothly made.

When charging is made by the motor 7 in the first mode of 2nd traveling, as shown in FIGS. 9A and 9B, the motor torque in a direction opposite to the rotational direction, i.e., in the reverse direction, acts on the ring gear 35 by regenerating the motor 7 this time. Since this allows the reaction force in the normal direction to act on the sun gear 32 via the planetary gear 34 and be transmitted to the first main shaft 11, the secondary torque obtained by adding the engine torque and the reaction force of the sun gear 32 is transmitted to the gear pair 22 for second speed via the idle gear train 27 from the second main shaft 12 as the 2nd torque. Additionally, by the engagement between the driving gear 23*a* for third speed and the first common driven gear 23*b*, in the first common driven gear 23*b*, the carrier torque in the reverse direction acts and is transmitted to the carrier 36 as the 3rd torque. Accordingly, the torque obtained by deducting the 3rd torque from the 2nd torque in the counter shaft 14, here the first common driven gear 23*b* is transmitted to the driving wheels DW and DW via the final gear 26*a*, the differential gear mechanism 8, and the driving shafts 9 and 9 as the total drive power. As a result, charging can be made by the motor 7 while a vehicle is driven.

Subsequently, a case where assisting or charging by the motor 7 is performed in the second mode of 2nd traveling will be described.

Figures 10A, 10B:
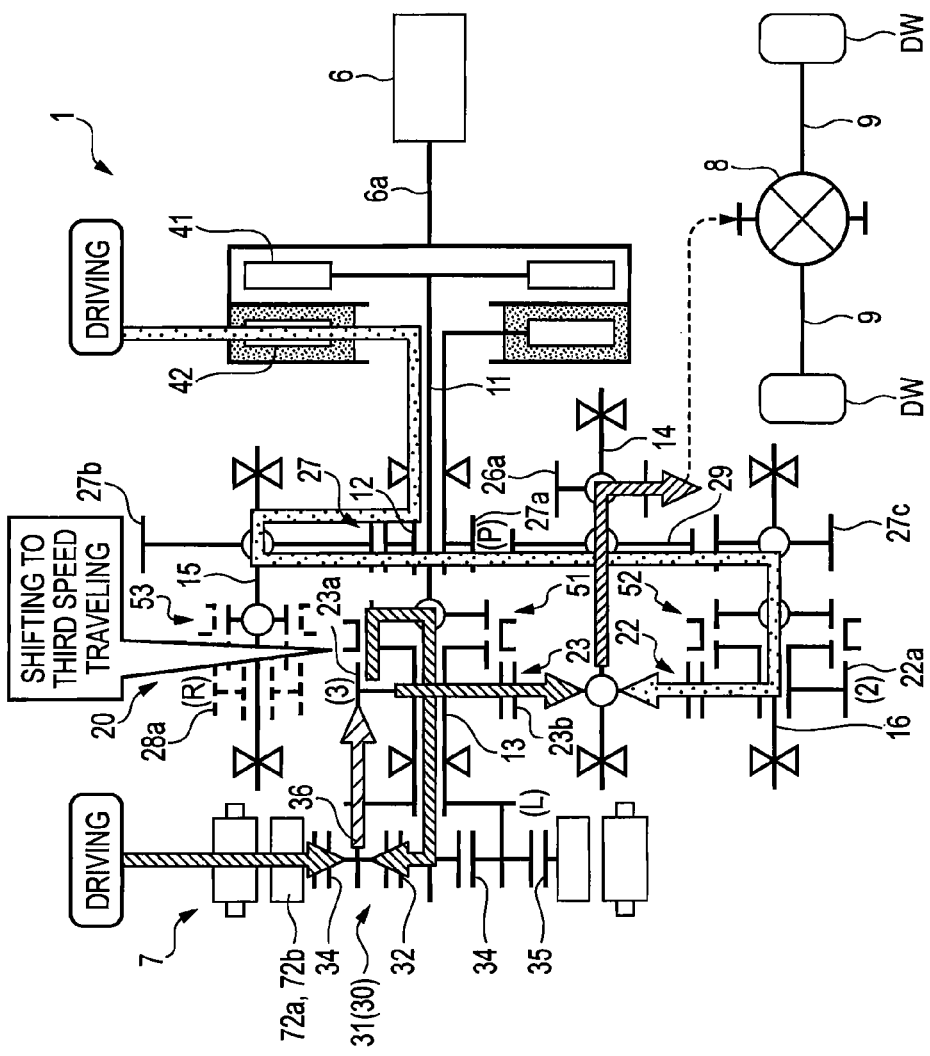
FIGS. 10A and 10B are views during assisting in a second mode of 2nd traveling.

The second mode of 2nd traveling, as shown in FIG. 10B, is realized by bringing the first speed change shifter 51 into an engaged state in the connecting position for third speed from a state where the second clutch 42 of FIG. 7B is connected. Hereinafter, a state where the first speed change shifter 51 has been pre-shifted to the connecting position for third speed from the state of the 2nd mode of FIG. 7B is also referred to as a 2nd Pre3 mode. By bringing the first speed change shifter 51 into an engaged state in the connecting position for third speed, the first main shaft 11 and the driving gear 23*a* for third speed are connected together and rotate integrally, and the sun gear 32 connected to the first main shaft 11 and the carrier 36 connected to the driving gear 23*a* for third speed via the connecting shaft 13 inevitably rotate integrally.

As the sun gear 32 and the carrier 36 rotate integrally, the ring gear 35 also rotates integrally and the planetary gear mechanism 31 is locked. Accordingly, moving the first speed change shifter 51 in the connecting position for third speed, and bringing the shifter into an engaged state means a state where the number of revolutions of the engine 6 and the number of revolutions of the motor 7 are forcibly made to coincide with each other, i.e., a state where the ratio is 1. In this case, if the number of revolutions of the sun gear 32 and the number of revolutions of the carrier 36 are equal to each other from the characteristics of the planetary gear mechanism 31 which constitutes the power combination mechanism 30, the imaginary fulcrum P of the planetary gear mechanism 31 is located in an infinitely separated position in FIG. 10A.

When assisting is made by the motor 7 in this mode, as shown in FIGS. 10A and 10B, the combined torque of the motor torque in the normal direction transmitted from the ring gear 35 and the torque in the normal direction transmitted from the sun gear 32 is transmitted to the carrier 36 as the carrier torque by making the motor torque in the normal direction act from the motor 7. Additionally, a reaction force in a direction opposite to the motor torque, here in the reverse direction acts on the sun gear 32 by the engagement with the planetary gear 34, and the reaction force of the sun gear 32 is extracted from the carrier torque by the connection between the first main shaft 11 and the driving gear 23*a* for third speed by the first speed change shifter 51. Also, a 3rd torque obtained by extracting the reaction force of the sun gear 32 from the carrier torque by the engagement between the driving gear 23*a* for third speed and the first common driven gear 23*b* is transmitted to the first common driven gear 23*b*. Additionally, the engine torque is transmitted to the gear pair 22 for second speed via the idle gear train 27 from the second main shaft 12 as the 2nd torque. Also, the torque obtained by adding the 3rd torque and the 2nd torque in the counter shaft 14, here the first common driven gear 23*b* is transmitted to the driving wheels DW and DW via the final gear 26*a*, the differential gear mechanism 8, and the driving shafts 9 and 9 as the total drive power. As a result, engine traveling can be assisted by the motor 7. In addition, here, the 3rd torque is equal to the motor torque, and by locking the planetary gear mechanism 31, the motor torque is transmitted to the counter shaft 14 as it is, and the engine torque and the motor torque are transmitted to the driving shafts 9 and 9 as they are.

When charging is made by the motor 7 in this mode, as shown in FIGS. 11A and 11B, the motor torque in a direction opposite to the rotational direction, i.e., in the reverse direction, acts on the ring gear 35 by regenerating the motor 7 this time. Additionally, a reaction force in a direction opposite to the motor torque, here in the reverse direction acts on the sun gear 32 by the engagement with the planetary gear 34, and the reaction force of the sun gear 32 is extracted from the carrier torque by the connection between the first main shaft 11 and the driving gear 23*a* for third speed by the first speed change shifter 51. Also, the torque obtained by deducting the reaction force of the sun gear 32 from the carrier torque by the engagement with the driving gear 23*a* for third speed and the first common driven gear 23*b* is transmitted to the carrier 36 from the gear pair 23 for third speed as the 3rd torque. Additionally, the engine torque is transmitted to the gear pair 22 for second speed via the idle gear train 27 from the second main shaft 12 as the 2nd torque. Accordingly, the torque obtained by deducting the 3rd torque from the 2nd torque in the counter shaft 14, here the first common driven gear 23*b* is transmitted to the driving wheels DW and DW via the final gear 26*a*, the differential gear mechanism 8, and the driving shafts 9 and 9 as the total drive power. As a result, charging can be made by the motor 7 while a vehicle is driven.

Next, the control of shifting up to third speed traveling from the second speed traveling will be described.

During traveling in the 2nd mode shown in FIG. 7B, as shown in FIG. 12A, the first speed change shifter 51 is brought into an engaged state in the connecting position for third speed, and the first main shaft 11 and the driving gear 23*a* for third speed are connected together (a 2nd Pre3 mode). Subsequently, by reconnecting the first and second clutches 41 and 42, i.e., by disconnecting the second clutch 42 and connecting the first clutch 41, as shown in FIG. 12B, the torque of the engine 6 is transmitted to the driving wheels DW and DW via the first transmission path, thereby realizing the third speed traveling. A state of FIG. 12B where the second speed change shifter 52 is brought into an engaged state in the connecting position for second speed in the third speed traveling is hereinafter referred to as a 3rd Post2 mode.

In addition, if the second speed change shifter 52 is brought into an engaged state in the connecting position for second speed, it is preferable to move the second speed change shifter 52 to the neutral position in order to co-rotate the second intermediate shaft 16, the first intermediate shaft 15, and the second main shaft 12. The 3rd mode is realized by moving the second speed change shifter 52 to the neutral position from the 3rd Post2 mode.

Next, a case where assisting or charging by the motor 7 is made during the third speed traveling will be described. Hereinafter, a state (3rd mode) where the second speed change shifter 52 has been moved to the neutral position will first be described. In addition, a mode shown below is referred to as a first mode of 3rd traveling for convenience.

In this state, a state where the number of revolutions of the engine 6 and the number of revolutions of the motor 7 are forcibly made to coincide with each other by integrally rotating the planetary gear mechanism 31, i.e., a state where the ratio is 1 is already created by bringing the first speed change shifter 51 into an engaged state in the connecting position for third speed.

Figures 13A, 13B:
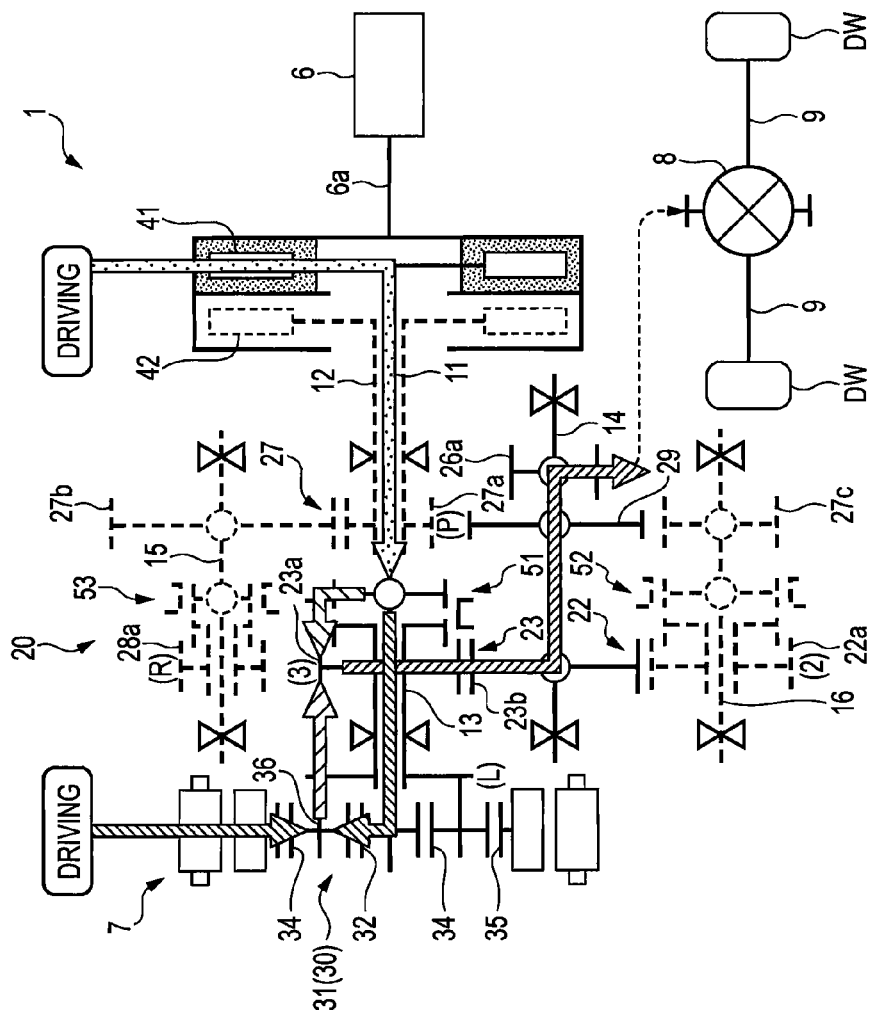
FIGS. 13A and 13B are views during assisting in a first mode of 3rd traveling.

When assisting is made by the motor 7 in this mode, as shown in FIGS. 13A and 13B, the combined torque of the motor torque in the normal direction transmitted from the ring gear 35 and the torque in the normal direction transmitted from the sun gear 32 act on the carrier 36 as the carrier torque by making the motor torque in the normal direction act from the motor 7. Additionally, the reaction force in a direction opposite to the motor torque, here in the reverse direction is transmitted to the sun gear 32 by the engagement with the planetary gear 34, and is transmitted to the first main shaft 11. Accordingly, the torque obtained by deducting the reaction force of the sun gear 32 from the engine torque is transmitted to the first main shaft 11, and is transmitted to the gear pair 23 for third speed from the first main shaft 11 as a 3rdDog torque by the connection between the first main shaft 11 and the driving gear 23a for third speed caused by the first speed change shifter 51. Then, the 3rdDog torque and the carrier torque are added in the driving gear 23a for third speed, and the added torque is transmitted to the driving wheels DW and DW via the first common driven gear 23b, a final gear 26a, the differential gear mechanism 8, and the driving shafts 9 and 9 as the total drive power. As a result, engine traveling can be assisted by the motor 7.

Figures 14A, 14B:
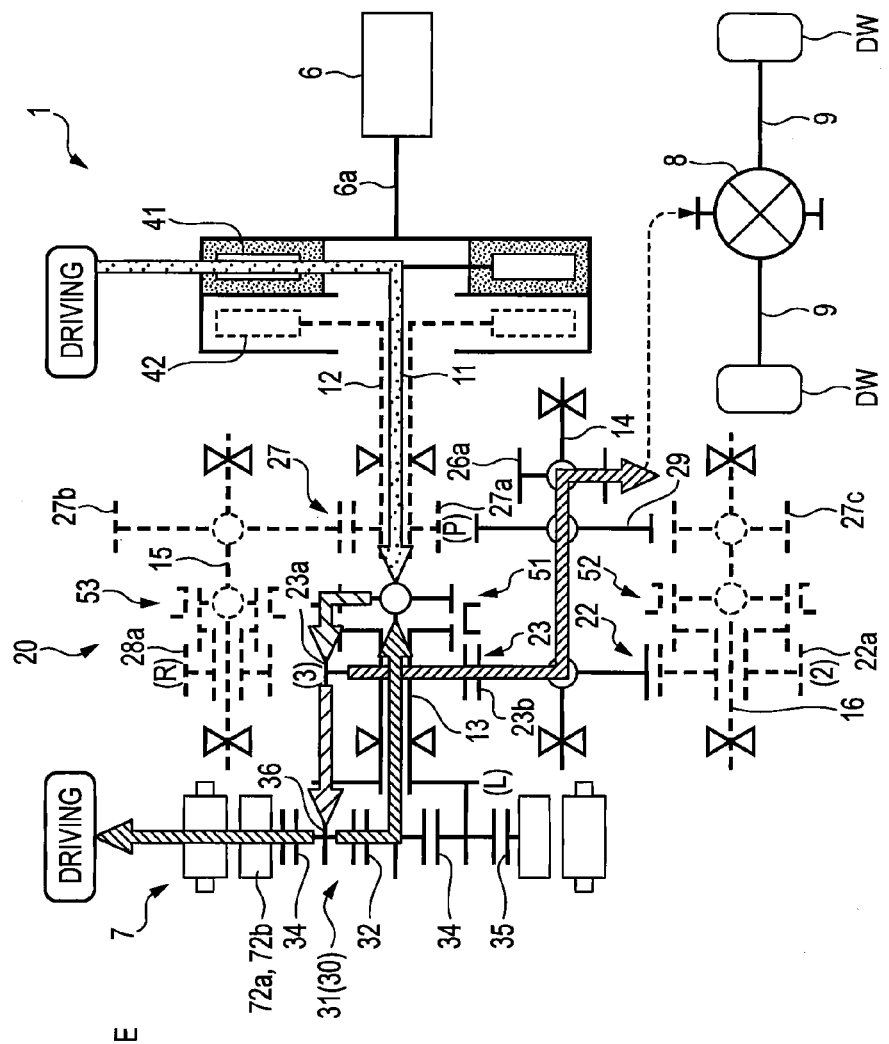
FIGS. 14A and 14B are views during charging in the first mode of 3rd traveling.

When charging is made by the motor 7 in this mode, as shown in FIGS. 14A and 14B, the motor torque in a direction opposite to the rotational direction, i.e., in the reverse direction, acts on the ring gear 35 by regenerating the motor 7 this time. Additionally, the reaction force in a direction opposite to the motor torque, here in the normal direction acts on the sun gear 32 by the engagement with the planetary gear 34, and is transmitted to the first main shaft 11. Accordingly, the torque obtained by adding the engine torque and the reaction force of the sun gear 32 is transmitted to the first main shaft 11, and is transmitted to the driving pair 23a for third speed from the first main shaft 11 as the 3rdDog torque by the connection between the first main shaft 11 and the driving gear 23a for third speed caused by the first speed change shifter 51. Additionally, in the driving gear 23a for third speed, the carrier torque in the reverse direction is extracted from the 3rdDog torque. Accordingly, the torque obtained by deducting the carrier torque from the 3rdDog torque is transmitted to the driving wheels DW and DW via the first common driven gear 23b, the final gear 26a, the differential gear mechanism 8, and the driving shafts 9 and 9 as the total drive power. As a result, charging can be made by the motor 7 while a vehicle is driven.

Next, motor traveling (EV traveling) in the power output apparatus 1 will be described.

In addition, a mode shown below is referred to as a first mode of motor traveling (EV traveling) for convenience.

Figures 15A, 15B:
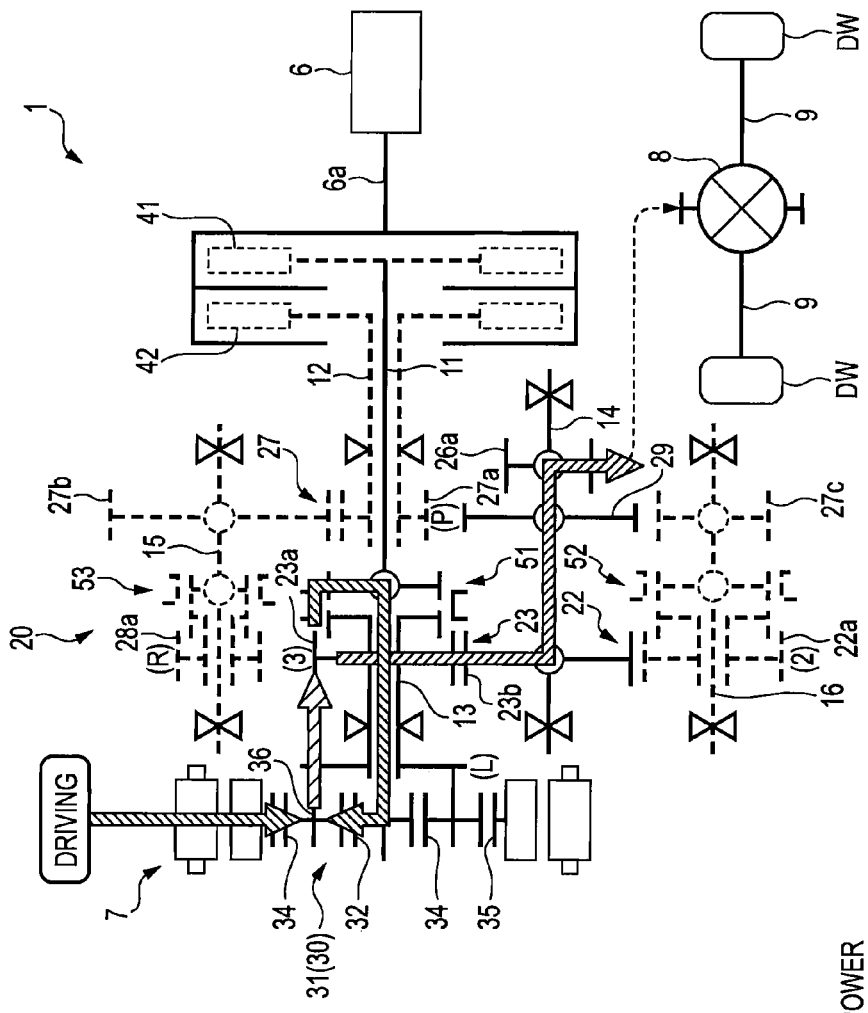
FIGS. 15A and 15B are views in a first mode of motor traveling.

As shown in FIG. 15B, the first mode of motor traveling is realized by bringing the first speed change shifter 51 into an engaged state in the connecting position for third speed, and disconnecting the first and second clutches 41 and 42. The transmission of power with the engine 6 is cut off by disconnecting the first and second clutches 41 and 42. Additionally, by moving the first speed change shifter 51 to the connecting position for third speed and bringing the shifter into an engaged state, as described above, the planetary gear mechanism 31 is locked, and a state where the number of revolutions of the engine 6 and the number of revolutions of the motor 7 are forcibly made to coincide with each other, i.e., a state where the ratio is 1 is created.

By making the motor torque in the normal direction act on the motor 7 in this state, the power of the motor 7 is transmitted to the driving shafts 9 and 9 via the gear pair 23 for third speed from the planetary gear mechanism 31. More specifically, the combined torque of the motor torque in the normal direction transmitted from ring gear 35 and the torque in the normal direction from the sun gear 32 is transmitted to the carrier 36 as the carrier torque. Additionally, a reaction force in a direction opposite to the motor torque, here in the reverse direction acts on the sun gear 32 by the engagement with the planetary gear 34, and the reaction force of the sun gear 32 is extracted from the carrier torque by the connection between the first main shaft 11 and the driving gear 23a for third speed by the first speed change shifter 51. Also, the torque obtained by extracting the reaction force of the sun gear 32 from the carrier torque by the engagement between the driving gear 23a for third speed and the first common driven gear 23b is transmitted to the driving wheels DW and DW via the final gear 26a, the differential gear mechanism 8, and the driving shafts 9 and 9 as the total drive power. As a result, a vehicle can travel only by the torque of the motor 7.

If a state where the motor 7 continues rotating at the same number of revolutions during this motor traveling lasts, the load of the PDU 2 which controls the operation of the motor 7 becomes large, and a situation where the motor 7 generates heat, and proper drive power cannot be output is assumed. Accordingly, for example, if a state where the motor 7 continues rotating at the same number of revolutions, such as a case where a vehicle travels on a certain uphill, lasts for a predetermined period of time, it is preferable that control is made so that the motor torque fluctuates, i.e., so that balance stop is not caused. At this time, a braking system which is not shown is made to cooperate, and an occupant's discomfort is suppressed by a braking force by a brake against an excessive motor torque. This makes it possible to perform smooth motor traveling while reducing the load of the PDU 2, and preventing excessive heat generation of the motor 7.

Next, engine start during the motor traveling in the power output apparatus 1 will be described.

As a case where a vehicle starts the engine 6 during the motor traveling, a case where the start of the engine 6 is performed according to two modes (hereinafter referred to as a first start mode of motor traveling and a second start mode of motor traveling) will be described.

Figure 16B:
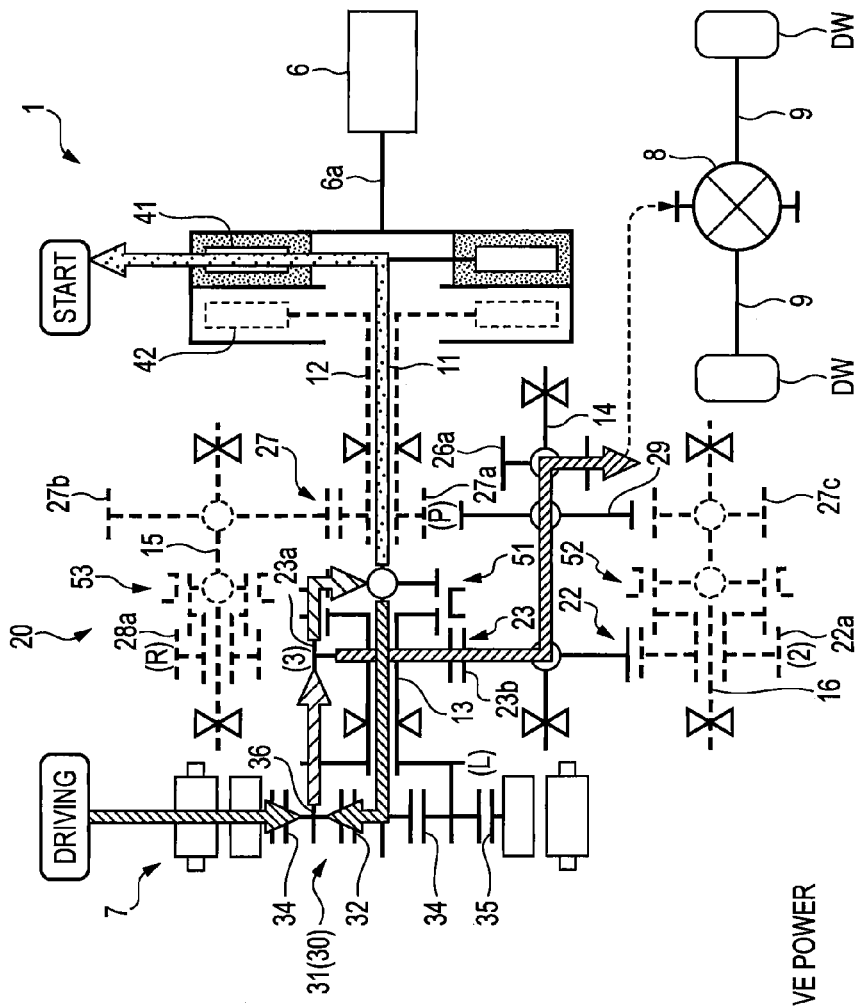
FIGS. 16A and 16B are views in a first start mode of motor traveling.

The first start mode of motor traveling, as shown in FIG. 16B, is realized by connecting the first clutch 41 during the motor traveling shown in FIG. 15B. The reaction force in the reverse direction of the sun gear 32 is extracted from the carrier torque in the normal direction by the connection between the first main shaft 11 and the driving gear 23a for third speed caused by the first speed change shifter 51, and the start torque in the reverse direction is extracted by the connection of the first clutch 41. Accordingly, the torque obtained by deducting the 3rdDog torque obtained by adding the reaction force of the sun gear 32 and the start torque from the carrier torque is transmitted to the first common driven gear 23b, and is transmitted to the driving wheels DW and DW via the final gear 26a, the differential gear mechanism 8, and the driving shafts 9 and 9 as the total drive power. Additionally, by the start torque transmitted to the first main shaft 11, the first main shaft 11 is able to co-rotate the crankshaft 6a of the engine 6 to generate cranking, and ignite the engine 6. This makes it possible to start the engine 6 during motor traveling. After the start of the engine 6, the Low mode is realized by returning the first speed change shifter 51 to the neutral position.

Figure 17B:
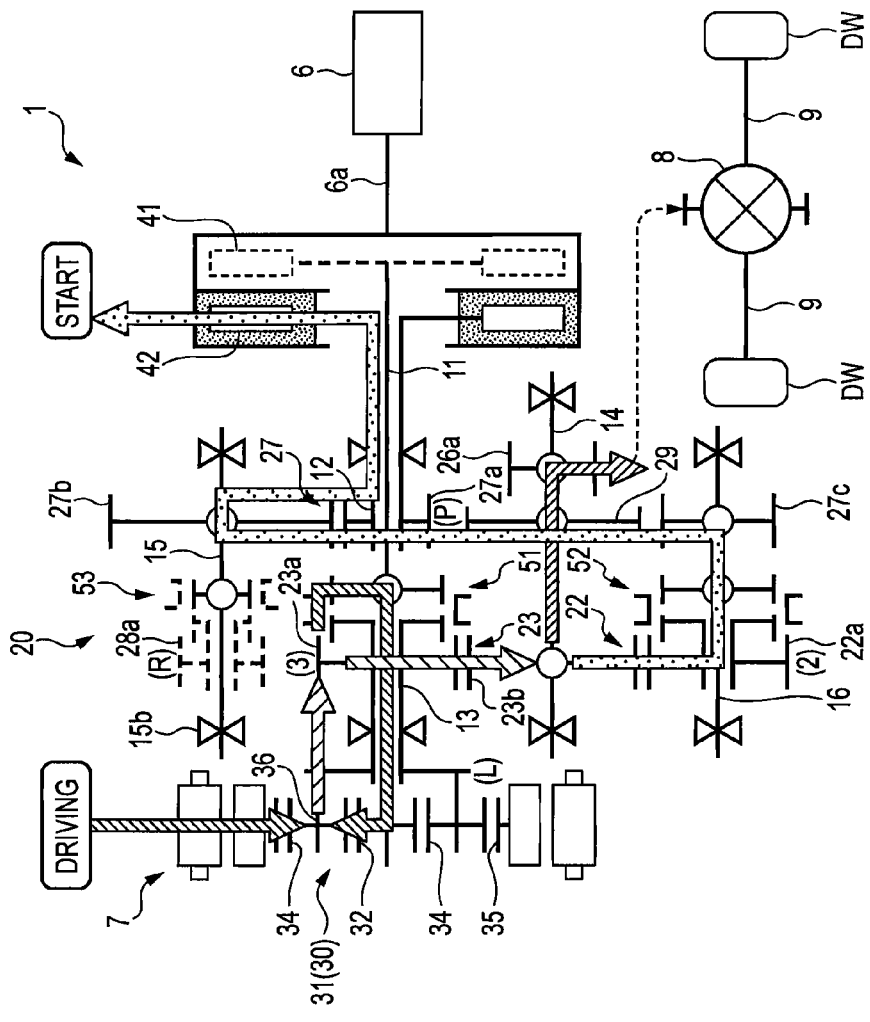
FIGS. 17A and 17B are views in a second start mode of motor traveling.

The second start mode of motor traveling, as shown in FIG. 17B, is realized by bringing the second speed change shifter 52 into the connecting position for second speed during the motor traveling shown in FIG. 15B, and connecting the second clutch 42. The torque obtained by extracting the reaction force in the reverse direction of the sun gear 32 from the carrier torque in the normal direction by the connection between the first main shaft 11 and the driving gear 23a for third speed caused by the first speed change shifter 51 is transmitted to the first common driven gear 23b as the 3rd torque. Additionally, the start torque in the reverse direction acts on the driving gear 22a for second speed by the engagement between the first common driven gear 23b and the driving gear 22a for second speed. Accordingly, the torque obtained by deducting the start torque from the 3rd torque obtained by deducting the reaction force of the sun gear 32 from the carrier torque is transmitted to the driving wheels DW and DW via the final gear 26a, the differential gear mechanism 8, and the driving shafts 9 and 9 as the total drive power. Additionally, by the start torque transmitted to the gear pair 22 for second speed, the idle gear train 27, and the second main shaft 12 from the first common driven gear 23b, the second main shaft 12 is able to co-rotate the crankshaft 6a of the engine 6 to generate cranking, and ignite the engine 6. This makes it possible to start the engine 6 during motor traveling. After the start of the engine 6, the Low mode is realized by returning the second speed change shifter 52 to the neutral position and reconnecting the first and second clutches 41 and 42, i.e., by disconnecting the second clutch 42 and connecting the first clutch 41.

Next, engine start during stop of a vehicle, so called parking will be described.

When a shift position is located in parking, the parking locking mechanism operates, and a locking torque acts on the carrier 36 from the parking gear 29, and the rotation of the carrier 36 stops. When the engine 6 is started during parking, for example, the first clutch 41 is connected to connect the engine 6 and the motor 7 via the first main shaft 11 and the power combination mechanism 30, and as shown in FIG. 18A, the motor torque in the reverse direction is made to act on the motor 7, rotating the motor in the reverse direction. Thereby, the number of revolutions of the sun gear 32 and the number of revolutions of the carrier 36 is located on a diagonal line about the carrier 36 from the characteristics of the planetary gear mechanism 31 which constitutes the power combination mechanism 30, and the sun gear 32 rotates in the normal direction under the reaction force in the normal direction from the planetary gear 34. As shown in FIG. 18B, the reaction force which acts on the sun gear 32 is transmitted to the first main shaft 11 from the sun gear 32. According to the reaction force of the sun gear 32, the first main shaft 11 is able to co-rotate the crankshaft 6a of the engine 6 to generate cranking, and ignite the engine 6. Additionally, when the shift position is positions other than parking, for example, even if the shift position is the neutral position, start of a vehicle can be prevented even if unintended drive power is generated during engine start by making the locking torque act on the carrier 36 by the parking gear 29. Other than the locking by the parking gear 29, the locking torque may be made to act on the carrier 36 by a vehicle traveling stabilizer (hereinafter referred to as VSA) or the like which is not shown.

Next, charging during the stop of a vehicle, so-called during parking will be described.

By increasing the torque of the engine 6, while the locking torque is made to act on the carrier 36 from the parking gear 29 after the engine 6 is started from the state of the FIG. 18B where the engine is started during parking, as shown in FIG. 19B, the engine torque is transmitted to the motor 7 via the ring gear 35 from the sun gear 32. At this time, the motor 7 can be regenerated to charge the battery 3.

Additionally, when the shift position is positions other than parking, for example, even if the shift position is the neutral or reverse position, the torque in the reverse direction may be made to act on the first common driven gear 23b from the driving gear 28a for reverse, thereby offsetting the torque in the normal direction generated in the carrier 36 by bringing the reverse shifter 53 into an engaged state in the connecting position for reverse and bringing the second clutch 42 into a so-called half clutch state where the second clutch is connected while slipping instead of making the locking torque act on the carrier 36 using the parking gear 29. In this way, by making the locking torque act on the carrier 36 by the parking gear 29 or the driving gear 28a for reverse, start of a vehicle can be prevented even if unintended drive power is generated during idle charging.

Next, the reverse traveling in the power output apparatus 1 will be described.

A case where the torque of the engine 6 is used for reverse of a vehicle is realized by bringing the reverse shifter 53 into an engaged state in the connecting position for reverse and connecting the second clutch 42. This makes it possible to transmit the torque of the engine 6 to the driving wheels DW and DW via the second main shaft 12, the idle driving gear 27a, the first idle driven gear 27b, the gear pair 28 for reverse (the driving gear 28a for reverse and the first common driven gear 23b), the final gear 26a, the differential gear mechanism 8, and the driving shafts 9 and 9, thereby carrying out the reverse traveling.

Additionally, a case where reverse is made by the motor traveling is realized by bringing the first speed change shifter 51 in an engaged state in the connecting position for third speed, and driving the motor 7 in the reverse direction in a state where the first and second clutches 41 and 42 are disconnected. This makes it possible to transmit the motor torque in the reverse direction to the driving wheels DW and DW via the first common driven gear 23b, the final gear 26a, the differential gear mechanism 8, and the driving shafts 9 and 9, thereby carrying out the reverse traveling.

Second Embodiment

Next, a power output apparatus 1A according to a second embodiment of the invention will be described with reference to FIGS. 21 to 37. In addition, the power output apparatus 1A of the second embodiment has the same construction as the power output apparatus 1 of the first embodiment except that the transmission 20A includes a gear pair 24 for fourth speed whose speed reduction ratio is smaller than that of the speed change gear pair 23 for a third speed, and a gear pair 25 for fifth speed whose speed reduction ratio is smaller than that of the gear pair 24 for fourth speed. For this reason, the same portions as or portions equivalent to those of the power output apparatus 1 of the first embodiment are denoted by the same or equivalent reference numerals, and the description thereof is simplified or omitted.

Figure 21:
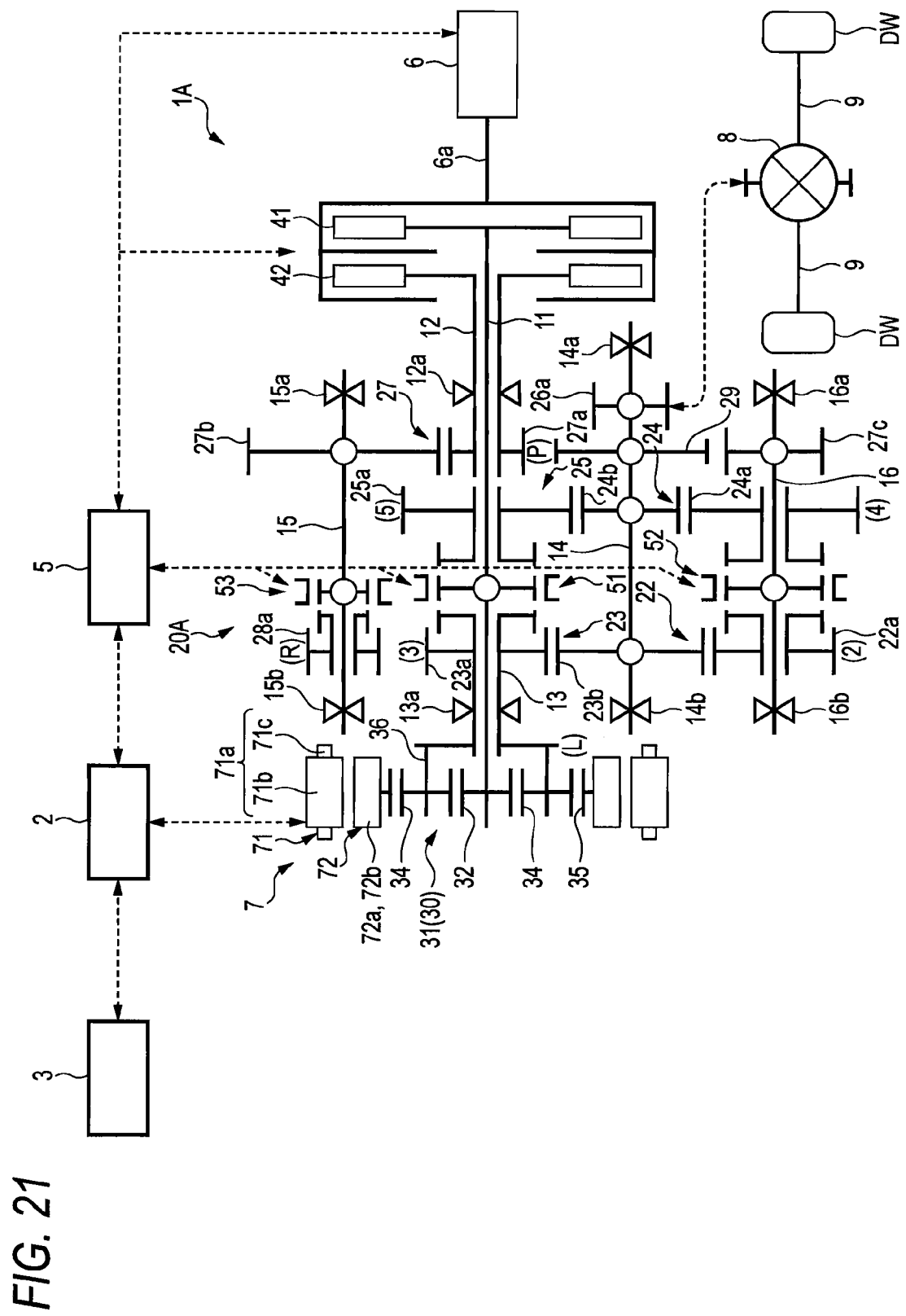
FIG. 21 is a view schematically showing a power output apparatus according to a second embodiment of the invention, and is a view seen in the direction of an arrow at a line XXI-XXI of FIG. 22.
Figure 22:
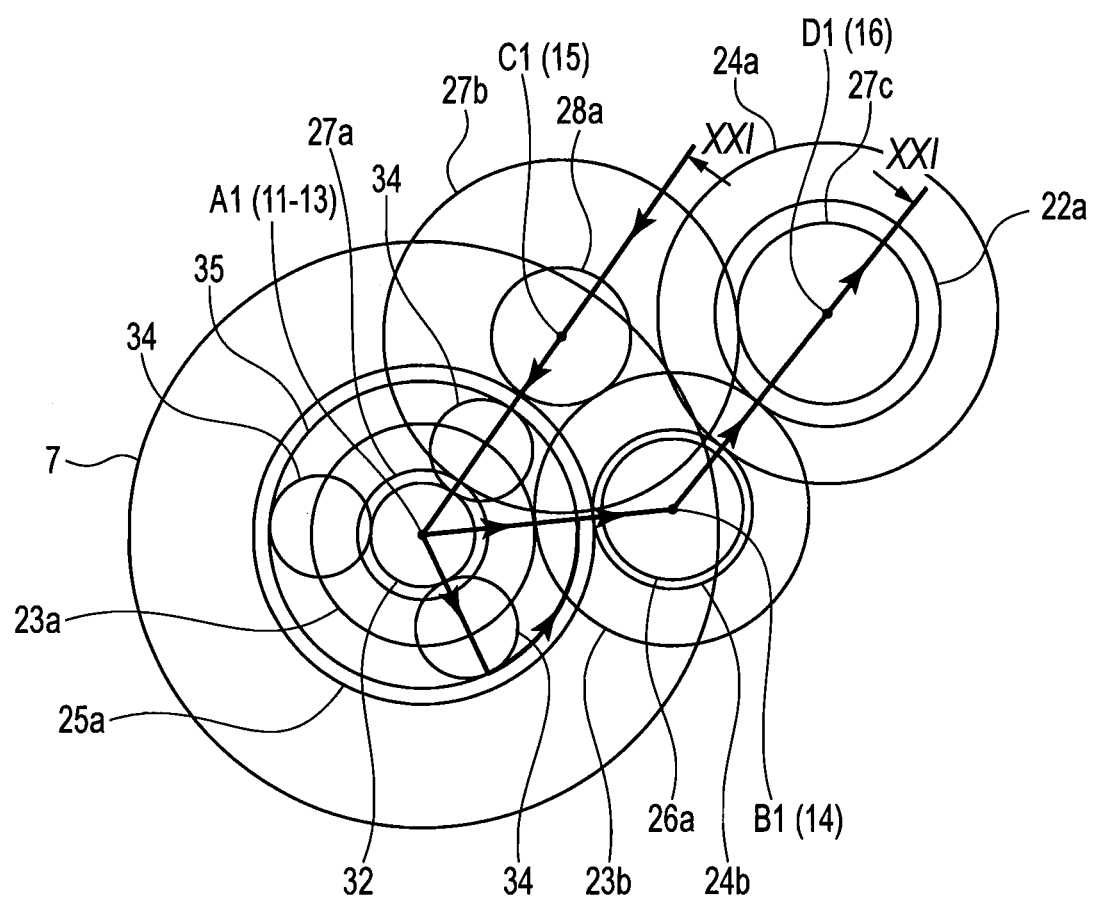
FIG. 22 is an explanatory view showing the relationship of a transmission mechanism of the power output apparatus of FIG. 22.

FIG. 21 schematically shows the power output apparatus 1A according to the second embodiment of the invention.

In a transmission 20A in the power output apparatus 1A of the second embodiment, a driving gear 24a for fourth speed which is rotatable relative to the second intermediate shaft 16 is provided between the driving gear 22a for second speed and the second idle driven gear 27c in the second intermediate shaft 16. Additionally, the second speed change shifter 52 which is provided at the second intermediate shaft 16 to connect or disconnect the second intermediate shaft 16 and the driving gear 22a for second speed is also adapted so as to connect or disconnect the second intermediate shaft 16 and the driving gear 24a for fourth speed, and is adapted to be movable among the connecting position for second speed, the neutral position, and a connecting position for fourth speed. Accordingly, when the second speed change shifter 52 is in an engaged state in the connecting position for second speed, the second idle driven gear 27c and the driving gear 22a for second speed which are attached to the second intermediate shaft 16 rotate integrally, when the second speed change shifter 52 is in an engaged state in the connecting position for fourth speed, the second idle driven gear 27c and the driving gear 24a for fourth speed which are attached to the second intermediate shaft 16 rotate integrally, and when the second speed change shifter 52 is in the neutral position, the second idle driven gear 27c rotates relative to the driving gear 22a for second speed and the driving gear 24a for fourth speed.

Additionally, a driving gear 25a for fifth speed which is rotatable relative to the first main shaft 11 is provided between the driving gear 23a for third speed attached to the connecting shaft 13 and the idle driving gear 27a attached to the second main shaft 12, in the first main shaft 11. Additionally, the first speed change shifter 51 which is provided at the first main shaft 11 to connect or disconnect the first main shaft 11 and the driving gear 23a for third speed is also adapted so as to connect or disconnect the first main shaft 11 and the driving gear 25a for fifth speed, and is adapted to be movable among the connecting position for third speed, the neutral position, and a connecting position for fifth speed. Accordingly, when the first speed change shifter 51 is in an engaged state in the connecting position for third speed, the first main shaft 11 and the driving gear 23a for third speed rotate integrally, when the first speed change shifter 51 is in an engaged state in the connecting position for fifth speed, the first main shaft 11 and the driving gear 25a for fifth speed rotate integrally, and when the first speed change shifter 51 is in the neutral position, the first main shaft 11 rotates relative to the driving gear 23a for third speed and the driving gear 25a for fifth speed.

Additionally, a second common driven gear 24b is attached to the counter shaft 14 between the first common driven gear 23b and the final gear 26a, and the second common driven gear 24b is adapted so as to engage with the driving gear 24a for fourth speed provided in the second intermediate shaft 16, and the driving gear 25a for fifth speed provided in the first main shaft 11. The second common driven gear 24b constitutes the gear pair 24 for fourth speed along with the driving gear 24a for fourth speed, and constitutes the gear pair 25 for fifth speed along with the driving gear 25a for fifth speed.

Accordingly, the transmission 20A is adapted such that the driving gear 23a for third speed and the driving gear 25a for fifth speed that are odd-numbered speed change stages are provided around the first main shaft 11, that is one transmission shaft of the two transmission shafts, the driving gear 22a for second speed and the driving gear 24a for fourth speed that are even-numbered speed change stages are provided at the second intermediate shaft 16, that is the other transmission shaft of the two transmission shafts, and the sun gear 32 of the planetary gear mechanism 31 which constitutes the power combination mechanism 30 is attached to the first main shaft 11.

By the above construction, the crankshaft 6a of the engine 6 is connected to the driving wheels DW and DW via the second main shaft 12, the idle gear train 27 (the idle driving gear 27a, the first idle driven gear 27b, and the second idle driven gear 27c), the second intermediate shaft 16, the gear pair 24 for fourth speed (the driving gear 24a for fourth speed and the second common driven gear 24b), the counter shaft 14, the final gear 26a, the differential gear mechanism 8, and the driving shafts 9 and 9 by connecting the second clutch 42 and bringing the second speed change shifter 52 into an engaged state in the connecting position for fourth speed. Hereinafter, a series of elements of the above second main shaft 12 to the driving shafts 9 and 9 is suitably referred to as a "fourth transmission path."

Additionally, the crankshaft 6a of the engine 6 is connected to the driving wheels DW and DW via the first main shaft 11, the gear pair 25 for fifth speed (the driving gear 25a for fifth speed and the second common driven gear 24b), the counter shaft 14, the final gear 26a, the differential gear mechanism 8, and the driving shafts 9 and 9 by connecting the first clutch 41 and bringing the first speed change shifter 51 into an engaged state in the connecting position for fifth speed. Hereinafter, a series of elements of the above first main shaft 11 to the driving shafts 9 and 9 is suitably referred to as a "fifth transmission path." In this way, the power output apparatus 1A of this embodiment has the fourth transmission path and the fifth transmission path in addition to the first to third transmission paths of the power output apparatus 1 of the first embodiment.

Next, the control of the power output apparatus 1A constructed in this way will be described.

Since the torque combination driving (the Low mode and the Low Pre2 mode) in the power output apparatus 1A is performed by the same control as the power output apparatus 1 of the first embodiment, the description thereof is omitted. In addition, since the normal traveling, the motor traveling, the motor traveling engine start, and the reverse traveling are also performed by the same control as the power output apparatus 1 of the first embodiment, only the traveling mode which is allowed by including the gear pair 24 for fourth speed and the gear pair 25 for fifth speed will be described. In the power output apparatus 1A, in addition to the first mode of 2nd traveling, and the second mode of 2nd traveling, a separate third mode of 2nd traveling is included as the assisting and charging patterns by the motor 7 in the second speed traveling.

Figure 23B:
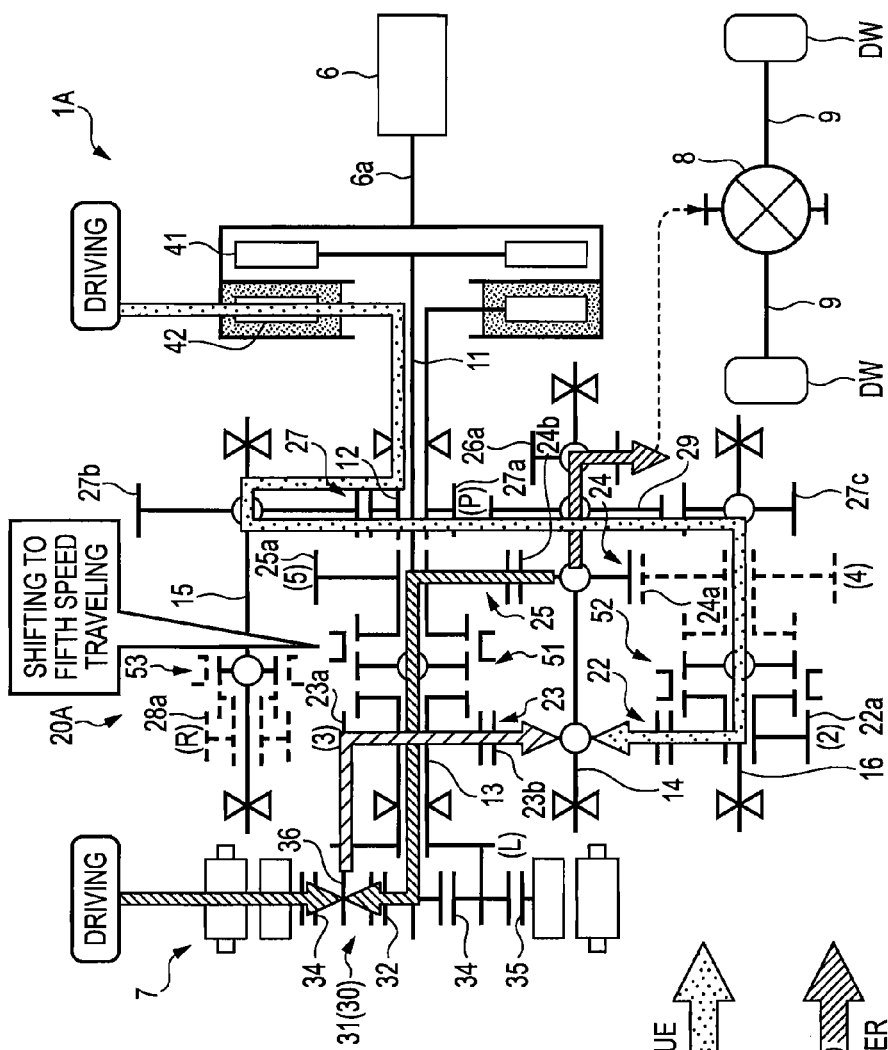
FIGS. 23A and 23B are views during assisting in a third mode of 2nd traveling.

The third mode of 2nd traveling, as shown in FIG. 23B, is realized by further moving the first speed change shifter 51 to the connecting position for fifth speed to bring the shifter into an engaged state, from the 2nd mode where the second clutch 42 is connected. This means that a certain ratio is forcibly created in the engine 6 and the motor 7 by utilizing the fact that the number of revolutions of the sun gear 32 connected to the counter shaft 14 via the gear pair 25 for fifth speed necessarily becomes lower than the number of revolutions of the carrier 36 connected to the counter shaft 14 via the gear pair 23 for third speed by moving the first speed change shifter 51 to the connecting position for fifth speed, thereby bringing the shifter into an engaged state. If the number of revolutions of the carrier 36 is higher than the number of revolutions of the sun gear 32 from the characteristics of the planetary gear mechanism 31 which constitutes the power combination mechanism 30, the imaginary fulcrum P of the planetary gear mechanism 31 is located in a lower part in FIG. 23A, and the number of revolutions of the ring gear 35 necessarily becomes higher than the number of revolutions of the carrier 36.

Figure 23A:
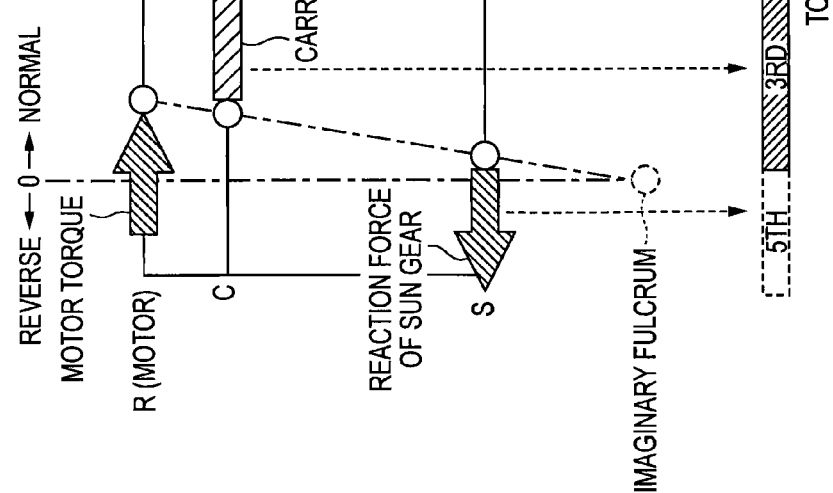

When assisting is made by the motor 7 in this mode, as shown in FIGS. 23A and 23B, the combined torque of the motor torque in the normal direction transmitted from the ring gear 35 and the torque in the normal direction transmitted from the sun gear 32 is transmitted to the carrier 36 as the carrier torque by making the motor torque in the normal direction act from the motor 7, and is transmitted to the gear pair 23 for third speed as the 3rd torque. Additionally, the engine torque is transmitted to the gear pair 22 for second speed via the idle gear train 27 from the second main shaft 12 as the 2nd torque. Additionally, a reaction force in a direction opposite to the motor torque, here in the reverse direction acts on the sun gear 32 by the engagement with the planetary gear 34 and is transmitted to the second common driven gear 24b by the engagement between the driving gear 25a for fifth speed and the second common driven gear 24b as a 5th torque. Accordingly, the torque obtained by deducting the 5th torque from the torque obtained by adding the 3rd torque and the 2nd torque in the counter shaft 14 is transmitted to the driving wheels DW and DW via the final gear 26a, the differential gear mechanism 8, and the driving shafts 9 and 9 as the total drive power. As a result, engine traveling can be assisted by the motor 7.

When charging is made by the motor 7 in this mode, as shown in FIGS. 24A and 24B, the motor torque in a direction opposite to the rotational direction, i.e., in the reverse direction, acts on the ring gear 35 by regenerating the motor 7 this time. Additionally, a reaction force in a direction opposite to the motor torque, herein the normal direction acts on the sun gear 32 by the engagement with the planetary gear 34 and is transmitted to the second common driven gear 24b by the engagement between the driving gear 25a for fifth speed and the second common driven gear 24b as the 5th torque. Additionally, the engine torque is transmitted to the gear pair 22 for second speed via the idle gear train 27 from the second main shaft 12 as the 2nd torque. Additionally, by the engagement between the driving gear 23a for third speed and the first common driven gear 23b, in the first common driven gear 23b, the carrier torque in the reverse direction is transmitted to the carrier 36 as the 3rd torque. Accordingly, the torque obtained by deducting the 3rd torque from the torque obtained by adding the 2nd torque and the 5th torque in the counter shaft 14 is transmitted to the driving wheels DW and DW via the final gear 26a, the differential gear mechanism 8, and the driving shafts 9 and 9 as the total drive power. As a result, charging can be made by the motor 7 while a vehicle is driven.

Next, the control of shifting up to fourth speed traveling from the third speed traveling will be described.

During traveling in the 3rd mode where the first clutch 41 is connected and the first speed change shifter 51 is brought into an engaged state in the connecting position for third speed, as shown in FIG. 25A, the second speed change shifter 52 is brought into an engaged state in the connecting position for fourth speed, and the second intermediate shaft 16 and the driving gear 24a for fourth speed are connected together. Hereinafter, a state where the second speed change shifter 52 has been pre-shifted to the connecting position for fourth speed from the state of the 3rd mode is referred to as a 3rd Pre4 mode. Subsequently, by reconnecting the first and second clutches 41 and 42, i.e., by disconnecting the first clutch 41 and connecting the second clutch 42, as shown in FIG. 25B, the torque of the engine 6 is transmitted to the driving wheels DW and DW via the fourth transmission path, thereby realizing the fourth speed traveling. Hereinafter, the state of FIG. 25B where the first speed change shifter 51 is brought into an engaged state in the connecting position for third speed in the fourth speed traveling is referred to as a 4th Post3 mode.

In addition, the 4th mode is realized by moving the first speed change shifter 51 to the neutral position from the 4th Post3 mode.

Next, a case where assisting or charging by the motor 7 is made during the fourth speed traveling will be described. Hereinafter, a state (4th mode) where the first speed change shifter 51 has been moved to the neutral position from the 4th Post3 mode will first be described.

A case where assisting or charging by the motor 7 is made according to three modes (a first mode of 4th traveling, a second mode of 4th traveling, and a third mode of 4th traveling) during traveling in the 4th mode will be described.

Figure 26B:
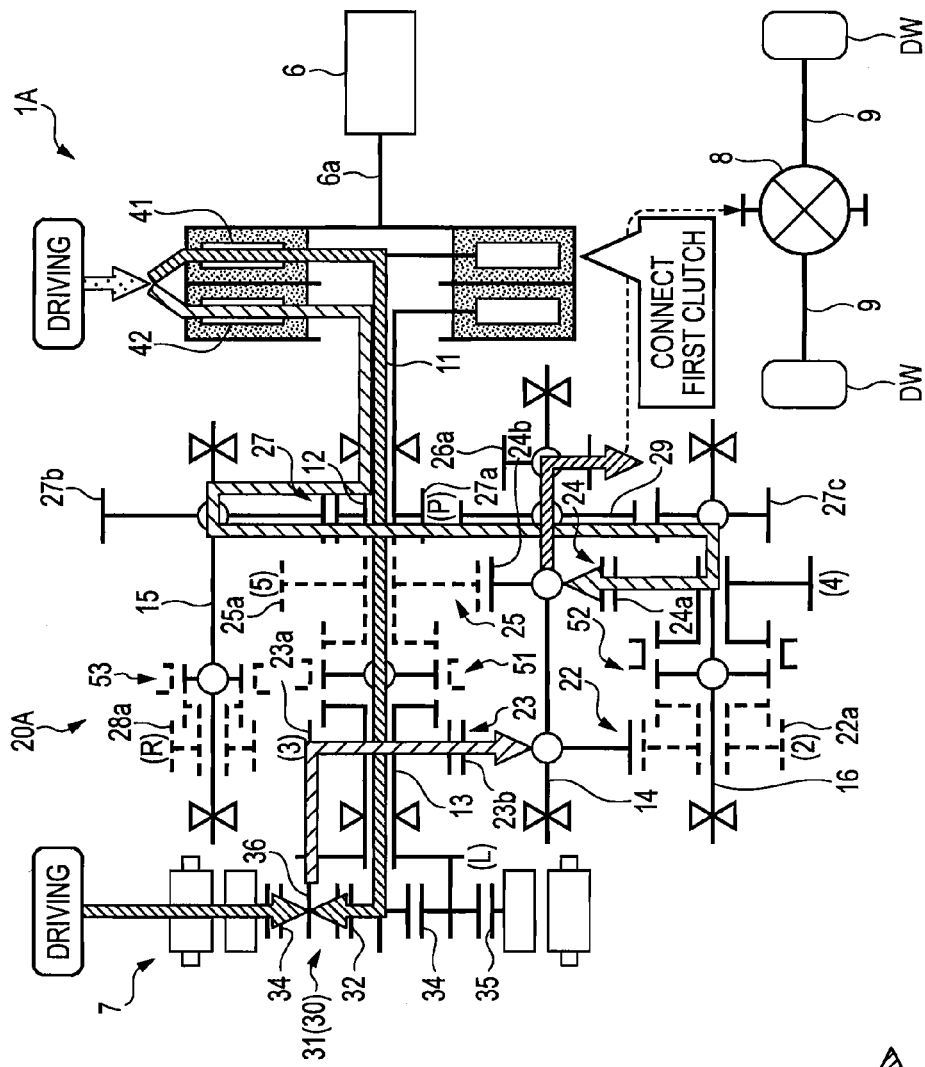
FIGS. 26A and 26B are views during assisting in a first mode of 4th traveling.

The first mode of 4th traveling, as shown in FIG. 26B, is realized by connecting the first clutch 41 from the 4th mode where the second clutch 42 is connected. This means that a certain ratio is forcibly created in the engine 6 and the motor 7 by utilizing the fact that the number of revolutions of the sun gear 32 connected to the engine 6 via the first main shaft 11 by connecting the first clutch 41 necessarily becomes lower than the number of revolutions of the carrier 36 which rotates by the engagement between the driving gear 23a for third speed and the first common driven gear 23b in the fourth speed traveling where traveling is made via the gear pair 24 for fourth speed by connecting the first clutch 41. If the number of revolutions of the carrier 36 is higher than the number of revolutions of the sun gear 32 from the characteristics of the planetary gear mechanism 31 which constitutes the power combination mechanism 30, the imaginary fulcrum P of the planetary gear mechanism 31 is located in a lower part in FIG. 26A, and the number of revolutions of the ring gear 35 necessarily becomes higher than the number of revolutions of the carrier 36.

Figure 26A:
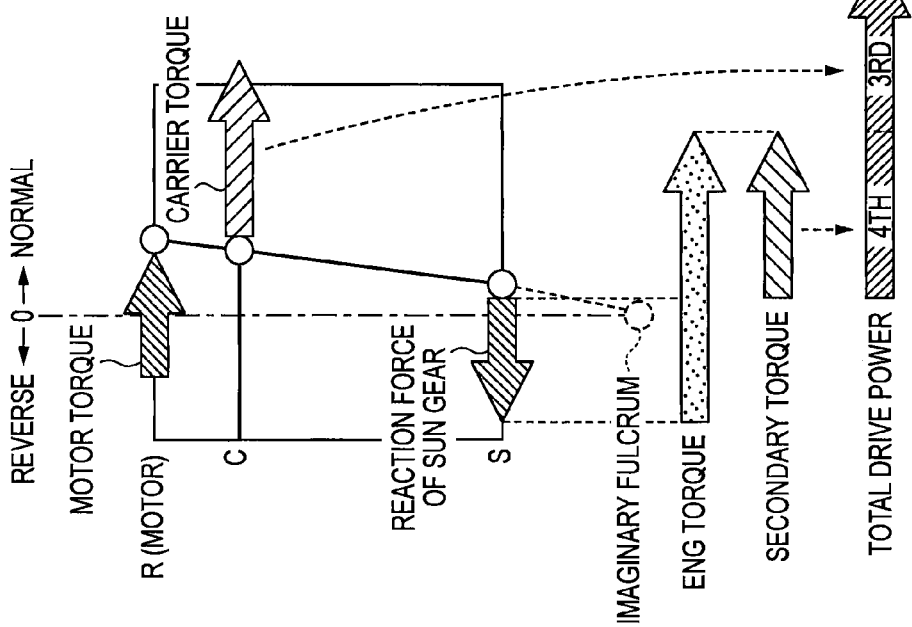

When assisting is made by the motor 7 in this mode, as shown in FIGS. 26A and 26B, the combined torque of the motor torque in the normal direction transmitted from the ring gear 35 and the torque in the normal direction transmitted from the sun gear 32 is transmitted to the carrier 36 as the carrier torque by making the motor torque in the normal direction act from the motor 7, and this carrier torque is transmitted to the first common driven gear 23b as the 3rd torque from the driving gear 23a for third speed by the engagement between the driving gear 23a for third speed and the first common driven gear 23b. Additionally, since a reaction force in a direction opposite to the motor torque, here in the reverse direction acts on the sun gear 32 by the engagement with the planetary gear 34 and is transmitted to the first main shaft 11, a secondary torque obtained by deducting the reaction force in the sun gear 32 from the engine torque is transmitted from the second main shaft 12 to the gear pair 24 for fourth speed via the idle gear train 27 as the 4th torque. Also, the torque obtained by adding the 4th torque and the 3rd torque in the counter shaft 14 is transmitted to the driving wheels DW and DW via the final gear 26a, the differential gear mechanism 8, and the driving shafts 9 and 9 as the total drive power. As a result, engine traveling can be assisted by the motor 7.

Figure 27B:
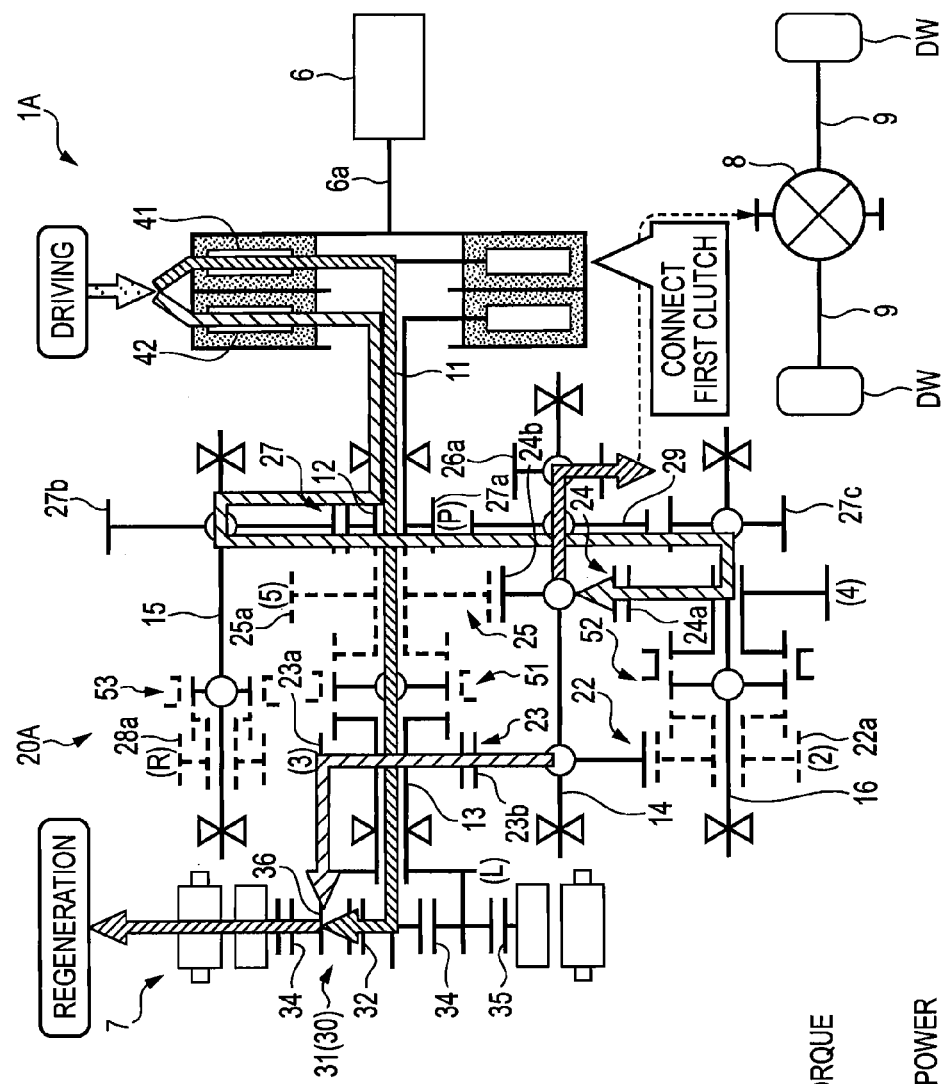
FIGS. 27A and 27B are views during charging in the first mode of 4th traveling.
Figure 27A:
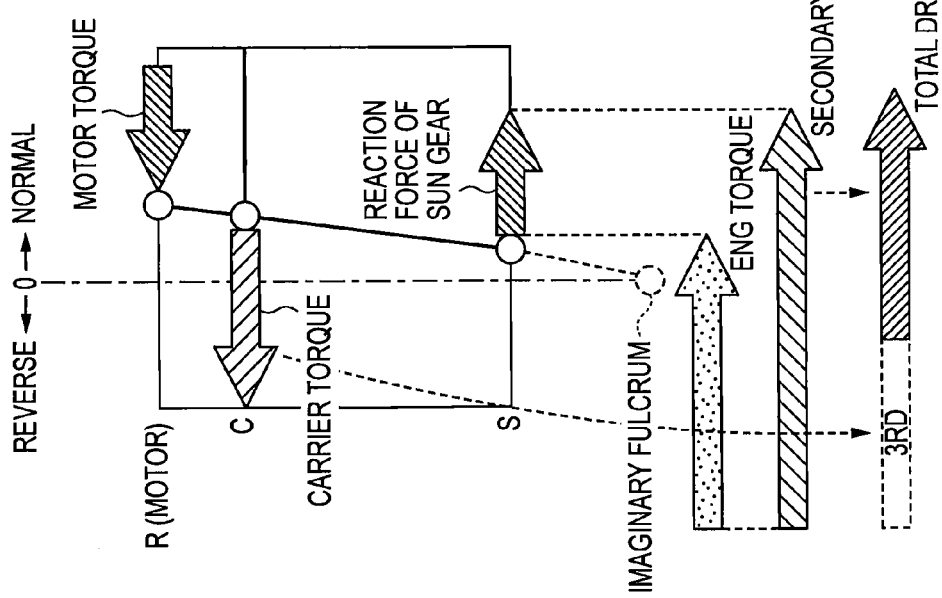

When charging is made by the motor 7 in this mode, as shown in FIGS. 27A and 27B, the motor torque in a direction opposite to the rotational direction, i.e., in the reverse direction, acts on the ring gear 35 by regenerating the motor 7 this time. Since this allows the reaction force in the normal direction to act on the sun gear 32 via the planetary gear 34 and be transmitted to the first main shaft 11, the secondary torque obtained by adding the engine torque and the reaction force of the sun gear 32 is transmitted to the gear pair 24 for fourth speed via the idle gear train 27 from the second main shaft 12. Additionally, by the engagement between the driving gear 23a for third speed and the first common driven gear 23b, in the first common driven gear 23b, the carrier torque in the reverse direction acts and is transmitted to the carrier 36 as the 3rd torque. Accordingly, the torque obtained by deducting the 3rd torque from the secondary torque in the counter shaft 14 is transmitted to the driving wheels DW and DW via the final gear 26a, the differential gear mechanism 8, and the driving shafts 9 and 9 as the total drive power. As a result, charging can be made by the motor 7 while a vehicle is driven.

Subsequently, a case where assisting or charging by the motor 7 is made in the second mode of 4th traveling will be described.

The second mode of 4th traveling, as shown in FIG. 28B, is realized by bringing the first speed change shifter 51 into an engaged state in the connecting position for third speed (4th Post3 mode) from the 4th mode where the second clutch 42 is connected. By moving the first speed change shifter 51 to the connecting position for third speed, and bringing the shifter into an engaged state, as described above, the planetary gear mechanism 31 is locked. In this case, if the number of revolutions of the sun gear 32 and the number of revolutions of the carrier 36 are equal to each other from the characteristics of the planetary gear mechanism 31 which constitutes the power combination mechanism 30, the imaginary fulcrum P of the planetary gear mechanism 31 is located in an infinitely separated position in FIG. 28A.

When assisting is made by the motor 7 in this mode, as shown in FIGS. 28A and 28B, the combined torque of the motor torque in the normal direction transmitted from the ring gear 35 and the torque in the normal direction transmitted from the sun gear 32 is transmitted to the carrier 36 as the carrier torque by making the motor torque in the normal direction act from the motor 7. Additionally, a reaction force in a direction opposite to the motor torque, here in the reverse direction acts on the sun gear 32 by the engagement with the planetary gear 34, and the reaction force of the sun gear 32 is extracted from the carrier torque by the connection between the first main shaft 11 and the driving gear 23a for third speed by the first speed change shifter 51. Also, a 3rd torque obtained by extracting the reaction force of the sun gear 32 from the carrier torque by the engagement between the driving gear 23a for third speed and the first common driven gear 23b is transmitted to the first common driven gear 23b. Additionally, the engine torque is transmitted to the gear pair 24 for fourth speed via the idle gear train 27 from the second main shaft 12 as the 4th torque. Also, the torque obtained by adding the 3rd torque and the 4th torque in the counter shaft 14 is transmitted to the driving wheels DW and DW via the final gear 26a, the differential gear mechanism 8, and the driving shafts 9 and 9 as the total drive power. As a result, engine traveling can be assisted by the motor 7.

When charging is made by the motor 7 in this mode, as shown in FIGS. 29A and 29B, the motor torque in a direction opposite to the rotational direction, i.e., in the reverse direction, acts on the ring gear 35 by regenerating the motor 7 this time. Additionally, a reaction force in a direction opposite to the motor torque, herein the normal direction acts on the sun gear 32 by the engagement with the planetary gear 34, and the reaction force of the sun gear 32 is extracted from the carrier torque by the connection between the first main shaft 11 and the driving gear 23a for third speed by the first speed change shifter 51. Also, the torque obtained by deducting the reaction force of the sun gear 32 from the carrier torque by the engagement with the driving gear 23a for third speed and the first common driven gear 23b is transmitted to the driving gear 23a for third speed as the 3rd torque. Additionally, the engine torque is transmitted to the gear pair 24 for fourth speed via the idle gear train 27 from the second main shaft 12 as the 4th torque. Accordingly, the torque obtained by deducting the 3rd torque from the 4th torque in the counter shaft 14 is transmitted to the driving wheels DW and DW via the final gear 26a, the differential gear mechanism 8, and the driving shafts 9 and 9 as the total drive power. As a result, charging can be made by the motor 7 while a vehicle is driven.

Subsequently, a case where assisting or charging by the motor 7 is made in the third mode of 4th traveling will be described.

The third mode of 4th traveling, as shown in FIG. 30B, is realized by further bringing the first speed change shifter 51 into an engaged state in the connecting position for fifth speed from the 4th mode where the second clutch 42 is connected. Hereinafter, a state where the first speed change shifter 51 has been pre-shifted to the connecting position for fifth speed from the state of the 4th mode is also referred to as a 4th Pre5 mode. This means that a certain ratio is forcibly created in the engine 6 and the motor 7 by utilizing the fact that the number of revolutions of the sun gear 32 necessarily becomes lower than the number of revolutions of the carrier 36 as described above by moving the first speed change shifter 51 to the connecting position for fifth speed, thereby bringing the shifter into an engaged state.

When assisting is made by the motor 7 in this mode, as shown in FIGS. 30A and 30B, the combined torque of the motor torque in the normal direction transmitted from the ring gear 35 and the torque in the normal direction transmitted from the sun gear 32 is transmitted to the carrier 36 as the carrier torque by making the motor torque in the normal direction act from the motor 7, and is transmitted to the gear pair 23 for third speed as the 3rd torque by the engagement between the driving gear 23a for third speed and the first common driven gear 23b. Additionally, the engine torque is transmitted to the gear pair 24 for fourth speed via the idle gear train 27 from the second main shaft 12 as the 4th torque. Additionally, a reaction force in a direction opposite to the motor torque, here in the reverse direction acts on the sun gear 32 by the engagement with the planetary gear 34 and is transmitted to the second common driven gear 24b by the engagement between the driving gear 25a for fifth speed and the second common driven gear 24b as the 5th torque. Accordingly, the torque obtained by deducting the 5th torque from the torque obtained by adding the 3rd torque and the 4th torque in the counter shaft 14 is transmitted to the driving wheels DW and DW via the final gear 26a, the differential gear mechanism 8, and the driving shafts 9 and 9 as the total drive power. As a result, engine traveling can be assisted by the motor 7.

When charging is made by the motor 7 in this mode, as shown in FIGS. 31A and 31B, the motor torque in a direction opposite to the rotational direction, i.e., in the reverse direction, acts on the ring gear 35 by regenerating the motor 7 this time. Additionally, a reaction force in a direction opposite to the motor torque, herein the normal direction acts on the sun gear 32 by the engagement with the planetary gear 34 and is transmitted to the second common driven gear 24b by the engagement between the driving gear 25a for fifth speed and the second common driven gear 24b as the 5th torque. Additionally, the engine torque is transmitted to the gear pair 24 for fourth speed via the idle gear train 27 from the second main shaft 12 as the 4th torque. Additionally, by the engagement between the driving gear 23a for third speed and the first common driven gear 23b, in the first common driven gear 23b, the carrier torque in the reverse direction is transmitted to the carrier 36 as the 3rd torque. Accordingly, the torque obtained by deducting the 3rd torque from the torque obtained by adding the 4th torque and the 5th torque in the counter shaft 14 is transmitted to the driving wheels DW and DW via the final gear 26a, the differential gear mechanism 8, and the driving shafts 9 and 9 as the total drive power. As a result, charging can be made by the motor 7 while a vehicle is driven.

Next, the control of shifting up to fifth speed traveling from the fourth speed traveling will be described.

Figure 32A:
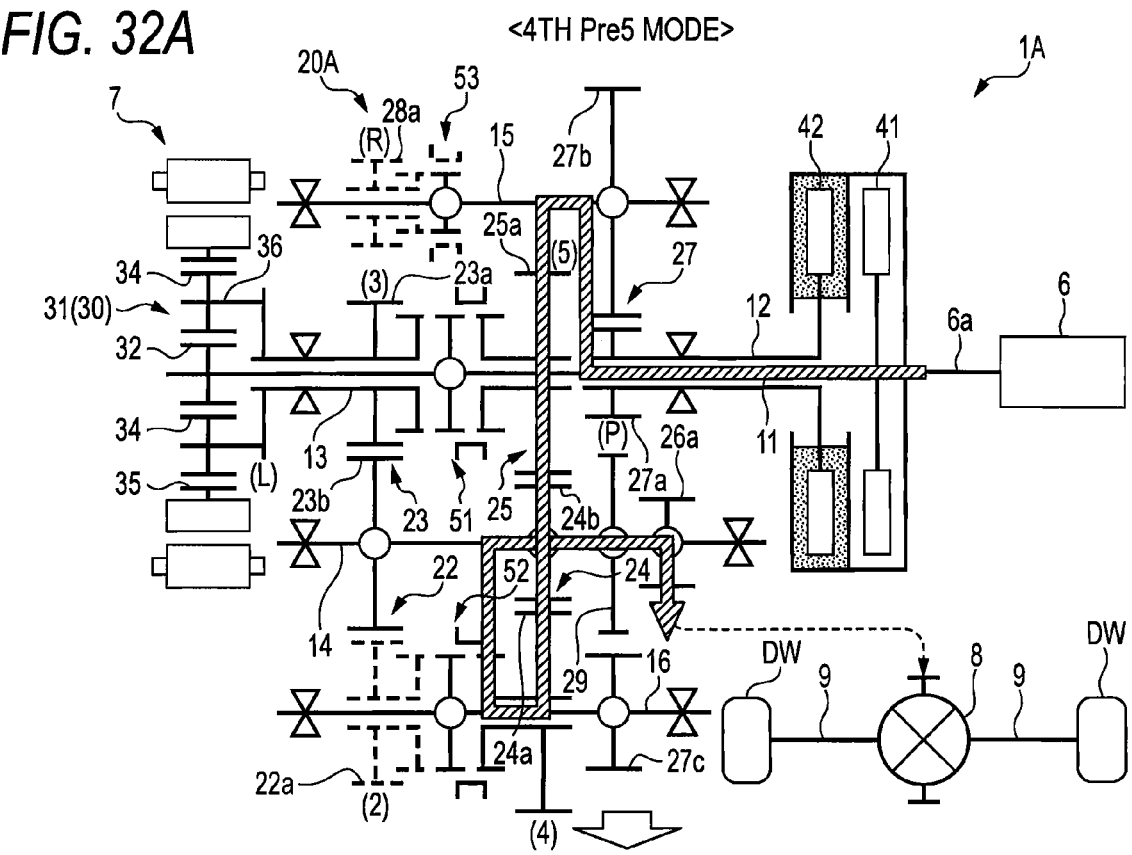
FIG. 32A is a view showing a situation where the torque of the power output apparatus is transmitted in a 4th Pre5 mode.
Figure 32B:
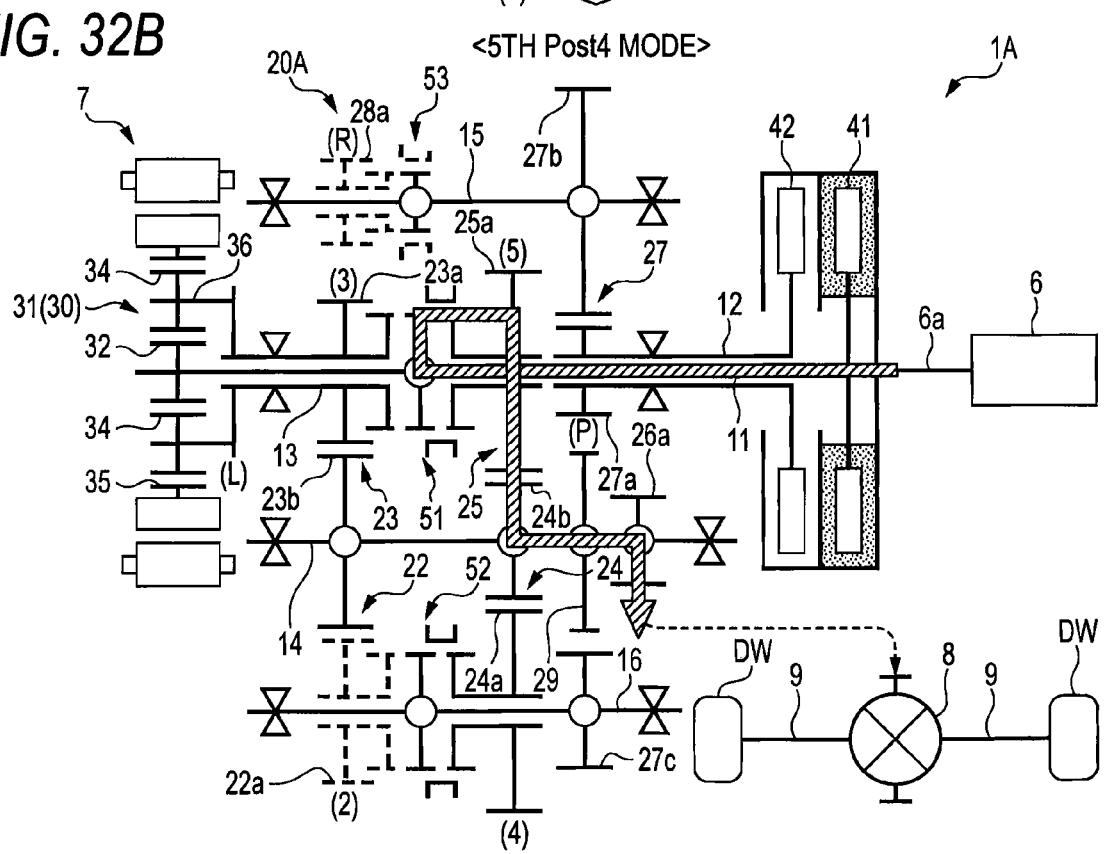
FIG. 32B is a view showing a situation where the torque of the power output apparatus is transmitted in a 5th Post4 mode.

During traveling in the 4th mode where the second clutch 42 is connected and the second speed change shifter 52 is brought into an engaged state in the connecting position for fourth speed, as shown in FIG. 32A, the first speed change shifter 51 is brought into an engaged state in the connecting position for fifth speed, and the first main shaft 11 and the driving gear 25a for fifth speed are connected together (a 4th Pre5 mode). Subsequently, by reconnecting the first and second clutches 41 and 42, i.e., by disconnecting the second clutch 42 and connecting the first clutch 41, as shown in FIG. 32B, the engine torque is transmitted to the driving wheels DW and Dw via the fifth transmission path, thereby realizing the fifth speed traveling. A state of FIG. 32B where the second speed change shifter 52 is brought into an engaged state in the connecting position for fourth speed in the fifth speed traveling is hereinafter referred to as a 5th Post4 mode.

In addition, if the second speed change shifter 52 is brought into an engaged state in the connecting position for fourth speed, it is preferable to move the second speed change shifter 52 to the neutral position in order to co-rotate the second intermediate shaft 16, the first intermediate shaft 15, and the second main shaft 12. The 5th mode is realized by moving the second speed change shifter 52 to the neutral position from the 5th Post4 mode.

Next, a case where assisting or charging by the motor 7 is made during the fifth speed traveling will be described. Hereinafter, a state (5th mode) where the first speed change shifter 51 has been moved to the neutral position will first be described. In addition, a mode shown below is referred to as a first mode of 5th traveling for convenience.

In this state, a state where a certain ratio is forcibly created in the engine 6 and the motor 7 by utilizing the fact that the number of revolutions of the sun gear 32 connected via the gear pair 25 for fifth speed necessarily becomes lower than the number of revolutions of the carrier 36 which rotates by the engagement between the driving gear 23a for third speed and the first common driven gear 23b in the fifth speed traveling where traveling is made via the gear pair 25 for fifth speed is already created by moving the first speed change shifter 51 to the connecting position for fifth speed, thereby bringing the shifter into an engaged state.

Figure 33B:
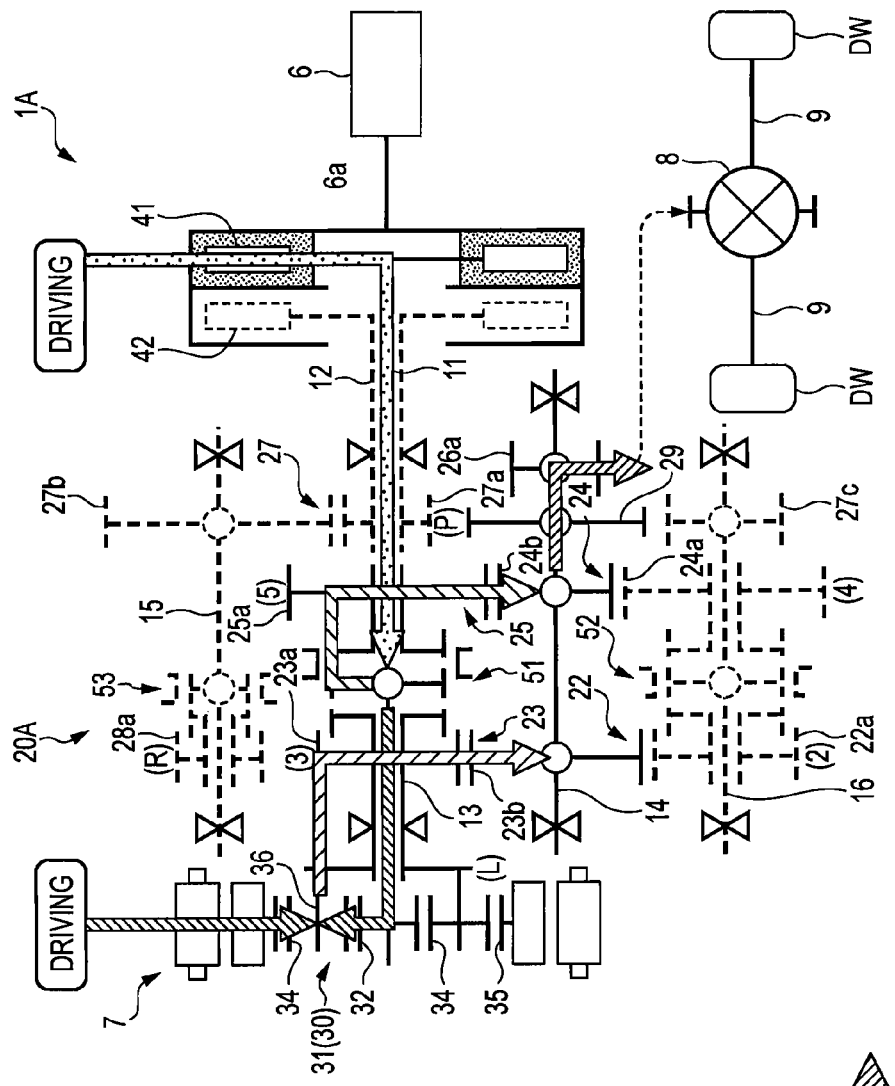
FIGS. 33A and 33B are views during assisting in a first mode of 5th traveling.
Figure 33A:
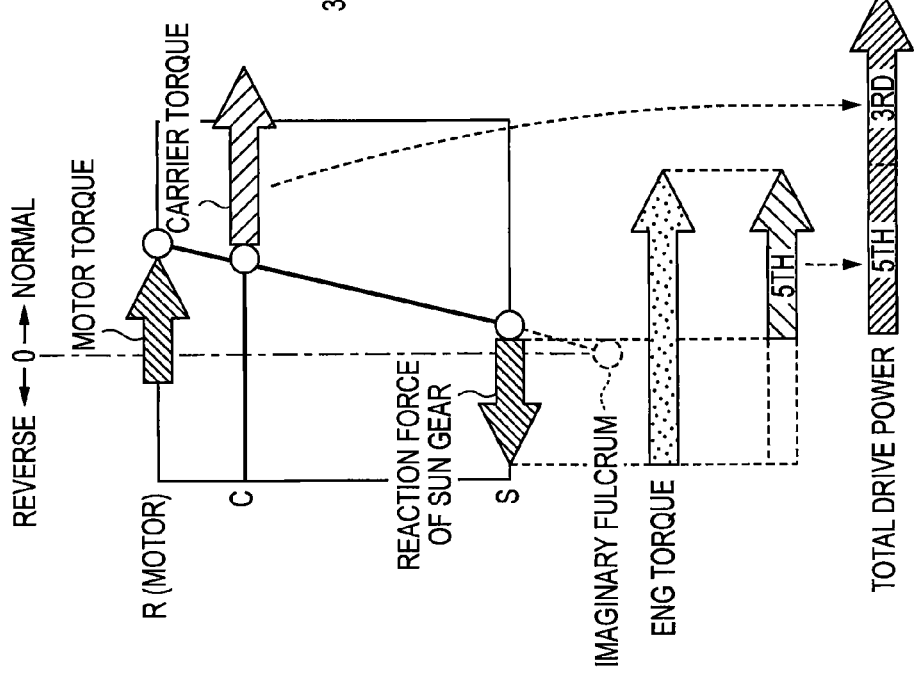

When assisting is made by the motor 7 in this mode, as shown in FIGS. 33A and 33B, the combined torque of the motor torque in the normal direction transmitted from the ring gear 35 and the torque in the normal direction transmitted from the sun gear 32 is transmitted to the carrier 36 as the carrier torque by making the motor torque in the normal direction act from the motor 7, and is transmitted to the first common driven gear 23b as the 3rd torque by the engagement between the driving gear 23a for third speed and the first common driven gear 23b. Additionally, since a reaction force in a direction opposite to the motor torque, here in the reverse direction acts on the sun gear 32 by the engagement with the planetary gear 34, the torque obtained by deducting the reaction force of the sun gear 32 from the engine torque is transmitted to the gear pair 25 for fifth speed from the first main shaft 11 as the 5th torque. Accordingly, the torque obtained by adding the 3rd torque and the 5th torque in the counter shaft 14 is transmitted to the driving wheels DW and DW via the final gear 26a, the differential gear mechanism 8, and the driving shafts 9 and 9 as the total drive power. As a result, engine traveling can be assisted by the motor 7.

Figure 34A:
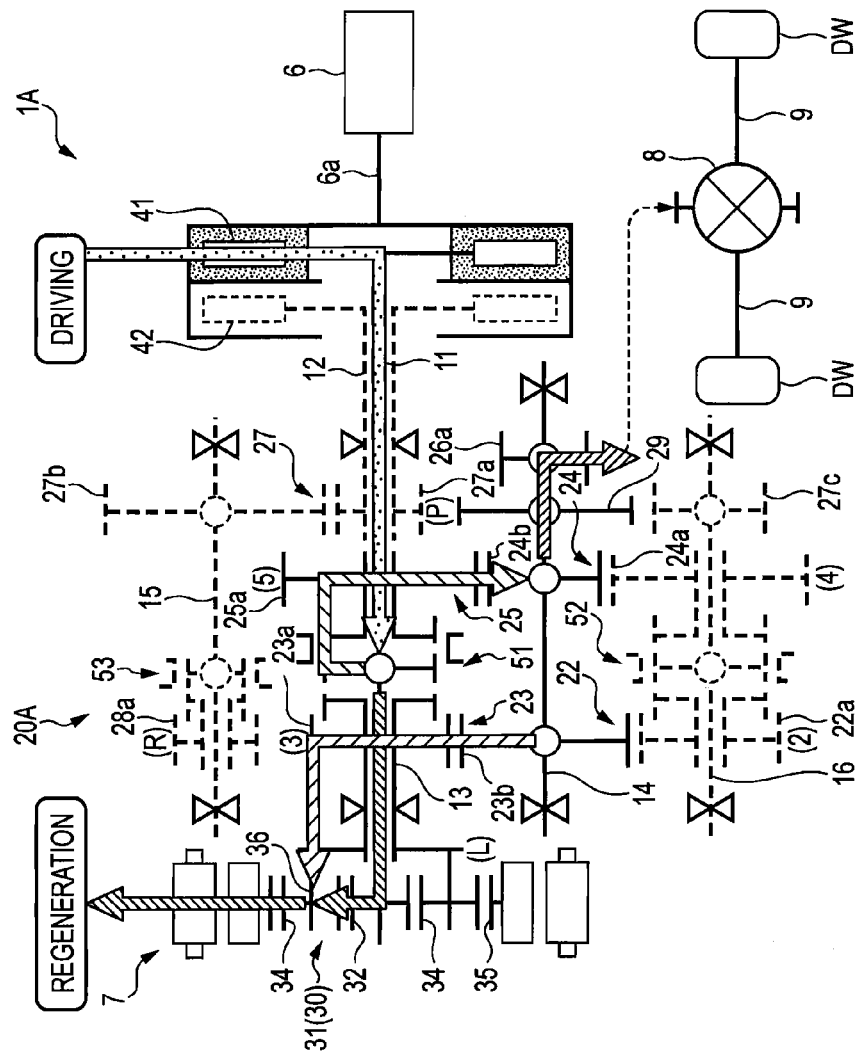
FIGS. 34A and 34B are views during charging in the first mode of 5th traveling.
Figure 34B:
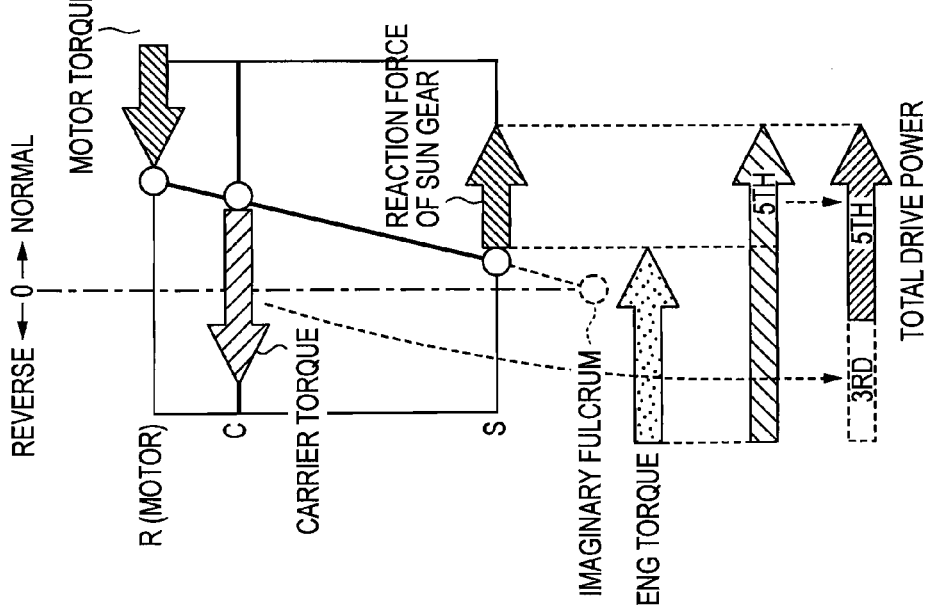

When charging is made by the motor 7 in this mode, as shown in FIGS. 34A and 34B, the motor torque in a direction opposite to the rotational direction, i.e., in the reverse direction, acts on the ring gear 35 by regenerating the motor 7 this time and utilizing the regenerated torque as a load. Additionally, since a reaction force in a direction opposite to the motor torque, here in the normal direction acts on the sun gear 32 by the engagement with the planetary gear 34, the torque obtained by adding the engine torque and the reaction force of the sun gear 32 is transmitted to the gear pair 25 for fifth speed as the 5th torque. Additionally, by the engagement between the driving gear 23a for third speed and the first common driven gear 23b, in the first common driven gear 23b, the carrier torque in the reverse direction is transmitted as the 3rd torque. Accordingly, the torque obtained by deducting the 3rd torque from the 5th torque in the counter shaft 14 is transmitted to the driving wheels DW and DW via the final gear 26a, the differential gear mechanism 8, and the driving shafts 9 and 9 as the total drive power. As a result, charging can be made by the motor 7 while a vehicle is driven.

Additionally, the power output apparatus 1A includes a separate second mode of motor traveling in addition to the first mode of motor traveling as motor traveling.

Figure 35A:
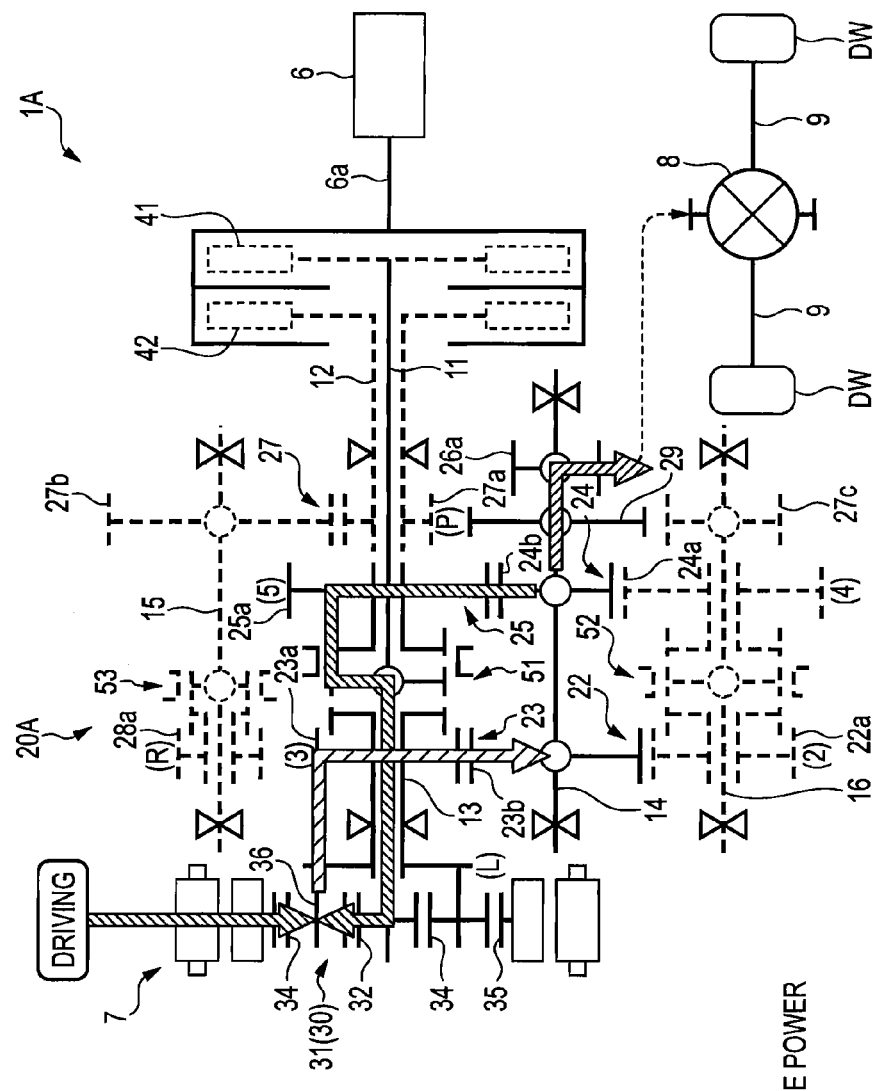
FIGS. 35A and 35B are views in a second mode of motor traveling.
Figure 35B:
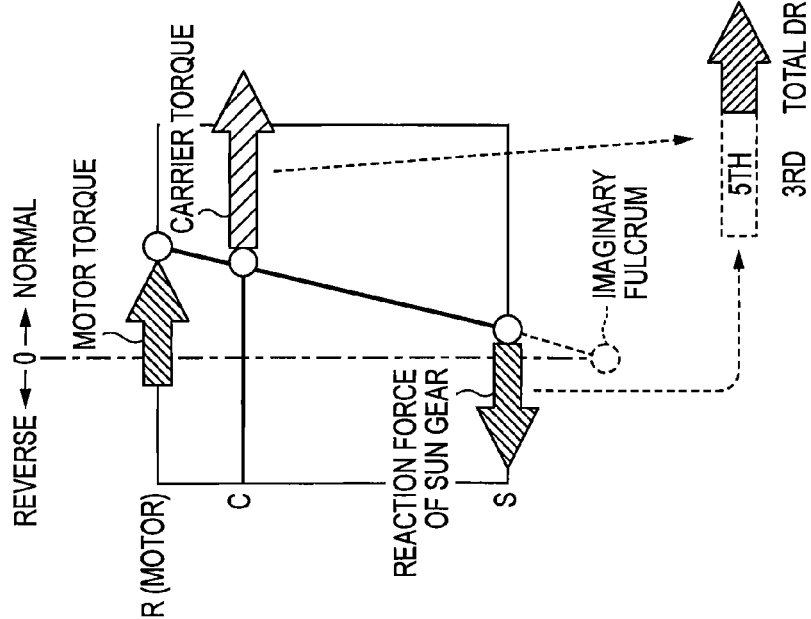

The second mode of motor traveling, as shown in FIG. 35B, is realized by disconnecting the first and second clutches 41 and 42, and moving the first speed change shifter 51 to the connecting position for fifth speed to bring the shifter into an engaged state. A certain ratio is forcibly created in the engine 6 and the motor 7 by utilizing the fact that the number of revolutions of the sun gear 32 necessarily becomes higher than the number of revolutions of the carrier 36 as described above by moving the first speed change shifter 51 to the connecting position for fifth speed, thereby bringing the shifter into an engaged state.

In this state, as shown in FIG. 35B, the combined torque of the motor torque in the normal direction transmitted from the ring gear 35 and the torque in the normal direction transmitted from the sun gear 32 is transmitted to the carrier 36 as the carrier torque by making the motor torque in the normal direction act on the motor 7, and is transmitted to the gear pair 23 for third speed as the 3rd torque by the engagement between the driving gear 23a for third speed and the first common driven gear 23b. Additionally, a reaction force in a direction opposite to the motor torque, here in the reverse direction acts on the sun gear 32 by the engagement with the planetary gear 34 and the 5th torque acts on the second common driven gear 24b by the engagement between the driving gear 25a for fifth speed and the second common driven gear 24b. Accordingly, the torque obtained by deducting the 5th torque from the 3rd torque in the counter shaft 14 is transmitted to the driving wheels DW and DW via the final gear 26a, the differential gear mechanism 8, and the driving shafts 9 and 9 as the total drive power. As a result, a vehicle can travel only by the torque of the motor 7.

Figure 16A:
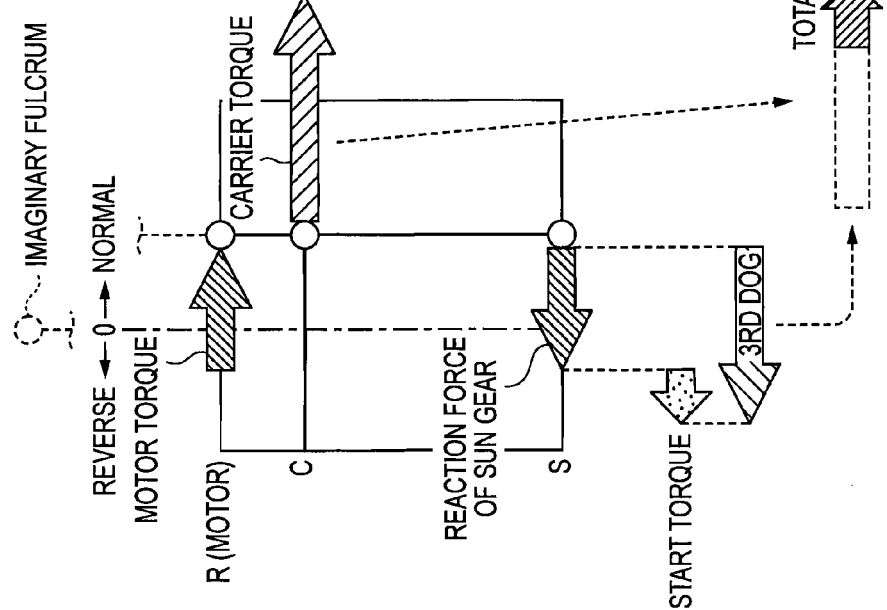
Figure 17A:
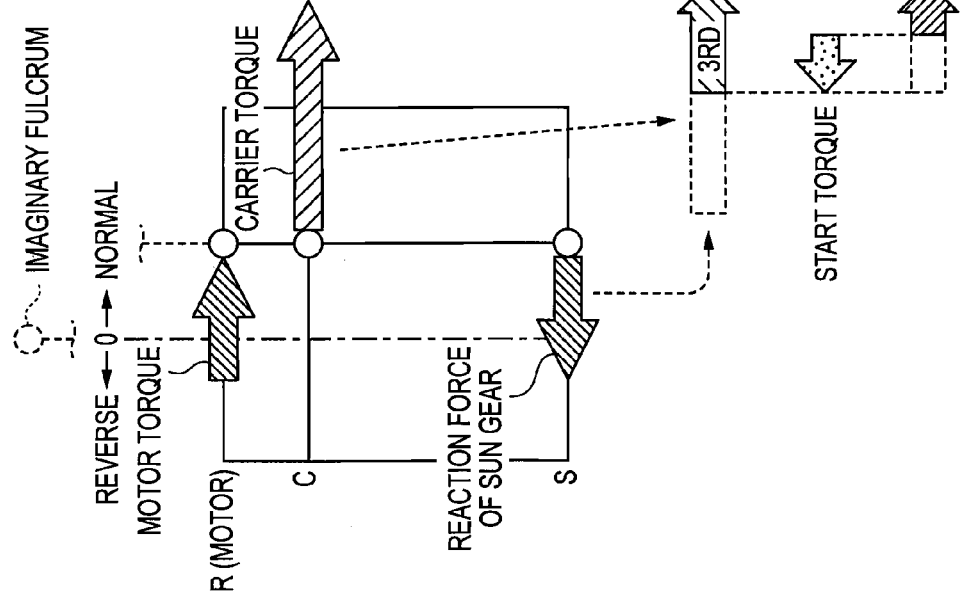

Additionally, even in the second mode of motor traveling, as explained in FIGS. 16 and 17, the engine 6 can be started by connecting either the first clutch 41 or the second clutch 42.

Additionally, in the power output apparatus 1A, assisting or charging by the motor 7 can be made in reverse traveling. In addition, a mode shown below is referred to as a first mode of reverse traveling for convenience.

Figure 36A:
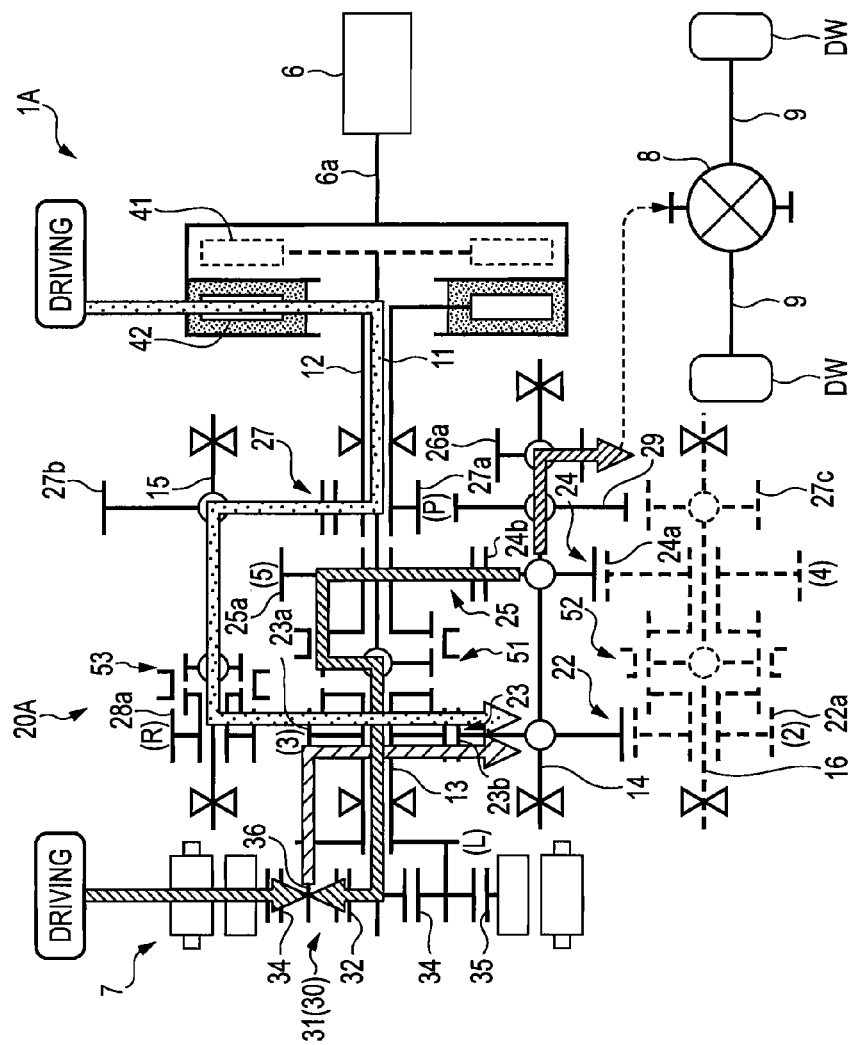
FIGS. 36A and 36B are views during assisting in a first mode of reverse traveling.
Figure 36B:
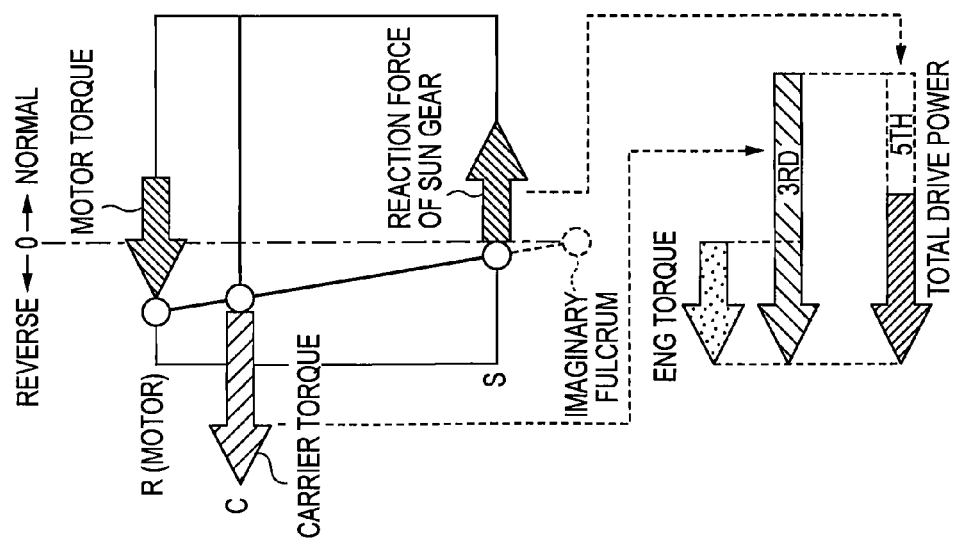

The first mode of reverse traveling, as shown in FIGS. 36A and 36B, is realized by bringing the reverse shifter 53 into an engaged state in a connecting position for reverse, thereby connecting the second clutch 42, and bringing the first speed change shifter 51 into an engaged state in connecting position for fifth speed, thereby making the torque in the reverse direction act on the motor 7. Thereby, the engine torque is transmitted to the second main shaft 12, the idle driving gear 27a, the first idle driven gear 27b, the driving gear 28a for reverse, and the first common driven gear 23b. On the other hand, the combined torque of the motor torque in the reverse direction transmitted from ring gear 35 and the torque in the reverse direction from the sun gear 32 is transmitted to the carrier 36 as the carrier torque, and is transmitted to the gear pair 23 for third speed as the 3rd torque. Additionally, a reaction force in a direction opposite to the motor torque, here in the normal direction acts on the sun gear by the engagement with the planetary gear 34 and is transmitted to the second common driven gear 24b by the engagement between the driving gear 25a for fifth speed and the second common driven gear 24b as the 5th torque. Accordingly, the torque obtained by deducting the 5th torque from the torque obtained by adding the engine torque and the 3rd torque in the counter shaft 14 is transmitted to the driving wheels DW and DW via the final gear 26a, the differential gear mechanism 8, and the driving shafts 9 and 9 as the total drive power, so that a vehicle can be reversed while being assisted by the motor 7.

According to the power output apparatuses 1 and 1A of these embodiments 1 and 2 constructed in this way, since the sun gear 32 is connected to the first main shaft 11 that is one of the two transmission shafts, the carrier 36 is connected to the driving shafts 9 and 9, and the ring gear 35 is connected to the motor 7, the carrier 36 can combine the torque transmitted from the sun gear 32, and the torque transmitted from the ring gear 35, and can transmit the combined torque to the driving shafts 9 and 9. Accordingly, the torque of the engine 6 and the torque of the motor 7 can be combined and transmitted to the driving shafts 9 and 9, and consequently, a larger drive power can be transmitted to the driving shafts 9 and 9.

Additionally, according to the power output apparatuses 1 and 1A, since two transmission shafts of the first main shaft 11 and the second intermediate shaft 16 are included, the degree of freedom in design can be made high as a hybrid vehicle. Additionally, since the first main shaft 11 is connected to the engine 6 via the first clutch 41 and the second intermediate shaft 16 is connected to the engine 6 via the second clutch, as explained in the above-described first mode of motor traveling and the second mode of motor traveling, the motor traveling can be performed without co-rotating the engine 6 by disconnecting the first clutch 41 and the second clutch 42. This makes it possible to reduce the load during motor traveling, thereby improving fuel consumption.

Moreover, by reconnecting the first clutch 41 and the second clutch 42 after the first speed change shifter 51 or the second speed change shifter 52 is brought into an engaged state with a gear to be shift-changed in advance (preshifted) during a shift change, the time taken to connect or disconnect a clutch can be shortened, and thereby a speed change shock can be suppressed.

Additionally, according to the power output apparatuses 1 and 1A, slip can be absorbed by the planetary gear mechanism 31 by regenerating the motor 7 during the idling of the engine 6. Thus, this makes it unnecessary to provide a slip mechanism on a clutch, and makes it possible to reduce the size of the clutch. Additionally, since the shock caused by a change in drive power resulting from an engine brake, etc. can be absorbed by the planetary gear mechanism 31, a small dry clutch can be used. Additionally, the connecting/disconnecting time of the clutch can be further shortened by using the dry clutch. Thereby, the heat energy generated by absorbing slip in a conventional clutch can be reused as electric power by generating electricity by the motor 7 and charging the battery 3 as explained in the above-described charging during stop, and energy saving can be achieved.

Additionally, according to the power output apparatuses 1 and 1A, by adjusting the torque of the motor 7 according to the torque of the engine 6 in torque combination driving, the engine 6 can be driven within a range of a highest number of revolutions from an engine stall region, and an excessive load can be prevented from being applied to the engine 6. Especially, fuel consumption can be improved by driving the engine 6 in a proper driving region, and an excessive load can be prevented from being applied to the motor 7 by driving the motor 7 within a range where the rated output and maximum number of revolutions of the engine are not exceeded.

Additionally, according to the power output apparatuses 1 and 1A, the motor 7 can be used to assist engine traveling or perform charge in a plurality of modes. Thus, an efficient operation is allowed by suitably selecting a mode according to situations, for example, according to the residual capacity of an electric storage device, the torque and number of revolutions of the motor 7, etc.

Additionally, according to the power output apparatuses 1 and 1A, the engine 6 can be started in three kinds of modes including the first start mode of motor traveling, the second start mode of motor traveling, and the engine start during stop as described above. This makes it possible to use the motor 7 also as a starter motor, makes it unnecessary to provide a starter motor, and makes it possible to reduce cost in addition to reduction in size and weight of the power output apparatuses 1 and 1A.

Additionally, according to the power output apparatuses 1 and 1A, since power can be transmitted to a driving shaft via the gear pair 23 for third speed commonly in a case where the first main shaft 11 and the driving gear 23a for third speed are connected together by the first speed change shifter 51, thereby performing the third speed traveling and a case where the first speed change shifter 51 is disconnected to release the connection between the first main shaft 11 and the driving gear 23a for third speed, thereby performing the torque combination driving for third speed, the number of gears can be reduced, and the reduction in size and weight of the power output apparatuses 1 and 1A and can be achieved. Additionally, since the change machine 20 is adapted so that the power transmitted to the driving shafts 9 and 9 via the third transmission path from a carrier 36 becomes a drive power equivalent to the first speed in a state where the engine 6 is driven to regenerate the motor 7 in the torque combination driving, start and low speed traveling can be performed while being charged by an electric motor even in a state where there is no residual capacity of an electric storage device. Moreover, it is possible to achieve reduction in size and in weight without the need for providing the gear pair for first speed.

Additionally, according to the power output apparatuses 1 and 1A, since the first common driven gear 23b serves also as the gear pair 23 for third speed and the gear pair 22 for second speed, reduction in size and weight of the power output apparatuses 1 and 1A can be achieved.

Additionally, according to the power output apparatus 1A, the second common driven gear 24b serves also as the gear pair 24 for fourth speed and the gear pair 25 for fifth speed, reduction in size and weight of the power output apparatus 1A can be achieved. Additionally, since the first main shaft 11 is provided with the driving gear 23a for third speed and the driving gear 25a for fifth speed, the second intermediate shaft 16 is provided with the driving gear 22a for second speed and the driving gear 24a for fourth speed, and the counter shaft 14 is provided with the first common driven gear 23b which meshes with the driving gear 23a for third speed and the driving gear 22a for second speed and the driving gear 24b for fourth speed which engages with the driving gear 25a for fifth speed and the driving gear 24a for fourth speed, the layout of the speed change gear pairs can be compressed, and the reduction in size and weight of the power output apparatus 1A can be achieved. Accordingly, the power output apparatus can also be arranged within an engine chamber of, for example, an FF (front engine front drive) vehicle.

Additionally, according to the power output apparatuses 1 and 1A, the reduction in size and weight of the power output apparatuses 1 and 1A can be achieved by providing the driving gear 28a for reverse in the first intermediate shaft 15 for transmitting the power of the engine 6 to the gear pair 22 for second speed.

Additionally, according to the power output apparatuses 1 and 1A, since the number of engagement of gears of the motor 7 to the driving shafts 9 and 9 in the gear pair 23 for third speed to be used during the Low traveling or in the gear pair 25 for fifth speed to be used during the fifth speed traveling is small, the transmission efficiency can be raised especially in gears where the assisting by the motor 7 is required.

Besides, in the power output apparatus 1 of the first embodiment and the power output apparatus 1A of the second embodiment, preferably, the ring gear 35 is connected to a locking mechanism that allows or stops rotation of the ring gear 35. Then, a sixth embodiment in which the ring gear 35 is connected to the locking mechanism will hereinafter be described in detail with referring to the power output apparatus 1A of the second embodiment.

Third Embodiment

Figure 38:
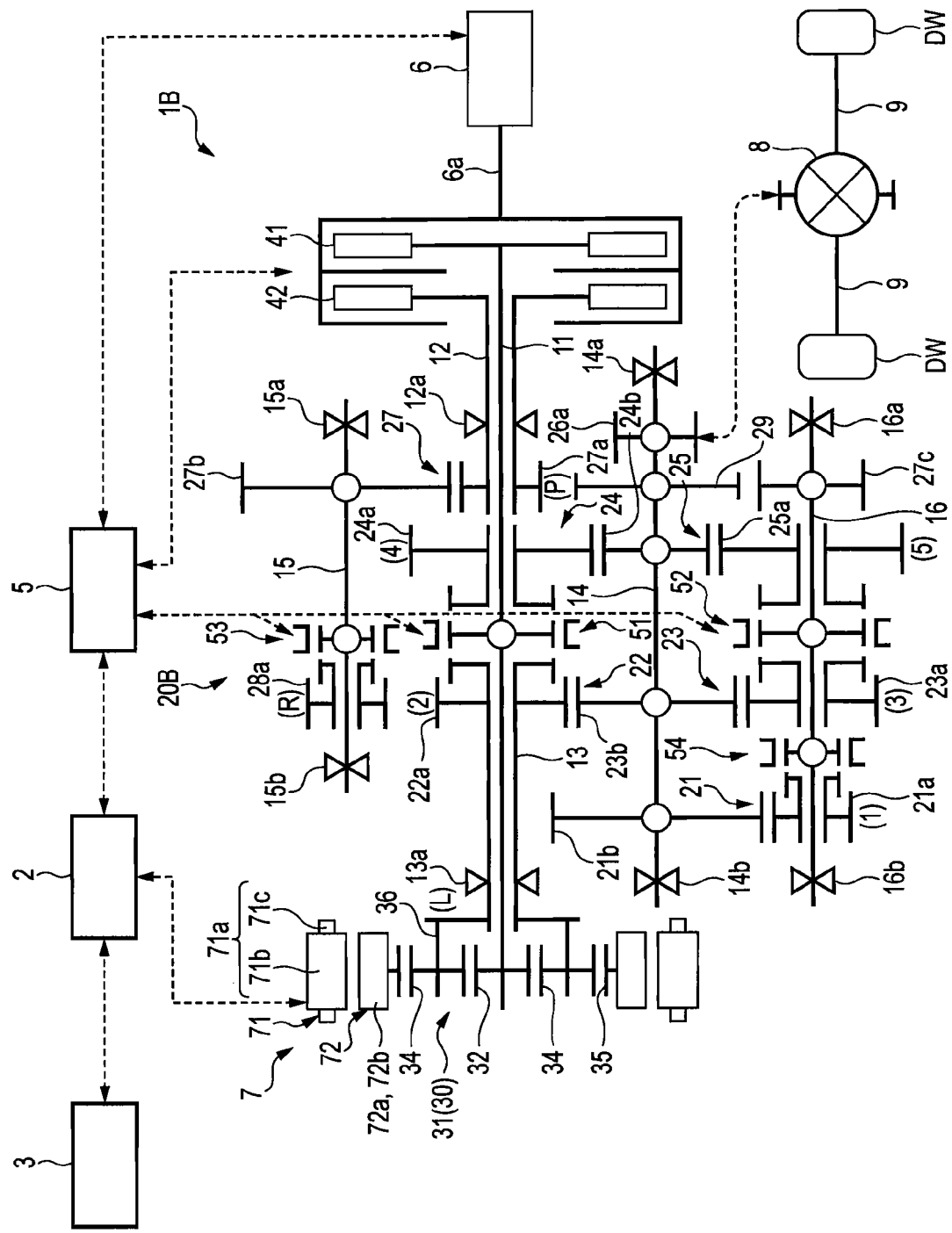
FIG. 38 is a view schematically showing a power output apparatus according to a third embodiment of the invention.

Next, a power output apparatus according to a third embodiment of the invention will be described with reference to FIG. 38. In addition, the power output apparatus 1B of the third embodiment has the same construction as the power output apparatus 1A of the second embodiment except that the constructions of the transmissions are different from each other. For this reason, the same portions as or portions equivalent to those of the power output apparatus 1A of the second embodiment are denoted by the same or equivalent reference numerals, and the description thereof is simplified or omitted.

Accordingly, the transmission 20B of this embodiment is adapted such that the driving gear 22a for second speed and the driving gear 24a for fourth speed that are even-numbered speed change stages are provided around the first main shaft 11 (first transmission shaft) that is one transmission shaft of the two transmission shafts, the driving gear 21a for first speed and, driving gear 23a for third speed, and the driving gear 25a for fifth speed that are odd-numbered speed change stages are provided at the second intermediate shaft 16 (second transmission shaft) that is the other transmission shaft of the two transmission shafts, and the sun gear 32 of the planetary gear mechanism 31 which constitutes the power combination mechanism 30 is attached to the first main shaft 11.

More specifically, the first speed change shifter 51 which connects or disconnects the driving gear 24a for fourth speed which is rotatable relative to the first main shaft 11, and the driving gear 22a for second speed attached to the first main shaft 11 and the connecting shaft 13 and which connects or disconnects the first main shaft 11 and the driving gear 24a for fourth speed is provided between the driving gear 22a for second speed attached to the connecting shaft 13 and the idle driving gear 27a attached to the second main shaft 12 in the first main shaft 11. Also, the first speed change shifter 51 is adapted to be movable among the connecting position for second speed, the neutral position, and the connecting position for fourth speed. When the first speed change shifter 51 is in an engaged state in the connecting position for second speed, the first main shaft 11 and the driving gear 22a for second speed rotate integrally, when the first speed change shifter 51 is in an engaged state in the connecting position for fourth speed, the first main shaft 11 and the driving gear 24a for fourth speed rotate integrally, and when the first speed change shifter 51 is in the neutral position, the first main shaft 11 rotates relative to the driving gear 22a for second speed and the driving gear 24a for fourth speed. In addition, when the first main shaft 11 and the driving gear 22a for second speed rotate integrally, the sun gear 32 attached to the first main shaft 11 and the carrier 36 connected to the driving gear 22a for second speed by the connecting shaft 13 rotate integrally, the ring gear 35 also rotates integrally, and the planetary gear mechanism 31 is locked and integrated.

The driven gear 21b for first speed, the first common driven gear 23b which engages with the driving gear 22a for second speed attached to the connecting shaft 13, the second common driven gear 24b which engages with the driving gear 24a for fourth speed provided at the first main shaft 11, and the final gear 26a which engages with the differential gear mechanism 8 are attached to the counter shaft 14. In addition, the first common driven gear 23b constitutes the gear pair 22 for second speed along with the driving gear 22a for second speed, and the second common driven gear 24b constitutes the gear pair 24 for fourth speed along with the driving gear 24a for fourth speed.

The driving gear 21a for first speed, the driving gear 23a for third speed, and the driving gear 25a for fifth speed which are rotatable relative to the second intermediate shaft are provided at the second intermediate shaft 16 sequentially from the motor 7. The driving gear 21a for first speed engages with the driven gear 21b for first speed attached to the counter shaft 14, and constitutes the gear pair 21 for first speed along with the driven gear 21b for first speed. Additionally, the driving gear 23a for third speed engages with the first common driven gear 23b attached to the counter shaft 14, and constitutes the gear pair 23 for third speed along with the first common driven gear 23b, and the driving gear 25a for fifth speed engages with the second common driven gear 24b attached to the counter shaft 14 and constitutes the gear pair 25 for fifth speed along with the second common driven gear 24b.

Additionally, a third speed change shifter 54 which connects or disconnects the second intermediate shaft 16 and the driving gear 21a for first speed is provided between the driving gear 21a for first speed and the driving gear 23a for third speed in the second intermediate shaft 16. Then, when the third speed change shifter 54 is in an engaged state in the connecting position for first speed, the second intermediate shaft 16 and the driving gear 21a for first speed are connected together and rotate integrally, and when the third speed change shifter 54 is in the neutral position, the second intermediate shaft 16 and the driving gear 21a for first speed are disconnected, and rotate relative to each other.

Moreover, the second speed change shifter 52 which connects or disconnects the second intermediate shaft 16 and the driving gear 23a for third speed and which connects or disconnects the second intermediate shaft 16 and the driving gear 25a for fifth speed is provided between the driving gear 23a for third speed and the driving gear 25a for fifth speed in the second intermediate shaft 16. Also, the second speed change shifter 52 is adapted to be movable among the connecting position for third speed, the neutral position, and the connecting position for fifth speed. When the second speed change shifter 52 is in an engaged state in the connecting position for third speed, the second intermediate shaft 16 and the driving gear 23a for third speed rotate integrally, when the second speed change shifter 52 is in an engaged state in the connecting position for fifth speed, the second intermediate shaft 16 and the driving gear 25a for fifth speed rotate integrally, and when the second speed change shifter 52 is in the neutral position, the second intermediate shaft 16 rotates relative to the driving gear 23a for third speed and the driving gear 25a for fifth speed.

The power output apparatus 1B constructed in this way is basically constructed by replacing the gear pair 22 for second speed and the gear pair 23 for third speed in the first and second embodiments, and replacing the gear pair 24 for fourth speed and the gear pair 25 for fifth speed, and has the same operation and effects through a suitable reading replacement.

Additionally, the power output apparatus 1B of this embodiment includes the gear pair 21 for first speed. Thus, even in the event of an emergency, such as a case where the planetary gear mechanism 31 breaks down, the power of the engine 6 can be transmitted to the driving wheels DW and DW via the second main shaft 12, the idle gear train 27, the second intermediate shaft 16, the gear pair 21 for first speed (the driving gear 21a for first speed and the driven gear 21b for first speed), the counter shaft 14, the final gear 26a, the differential gear mechanism 8, and the driving shafts 9 and 9, thereby performing the first speed traveling, by bringing the third speed change shifter 54 into an engaged state in the connecting position for first speed, and connecting the second clutch 42.

Fourth Embodiment

Figure 39:
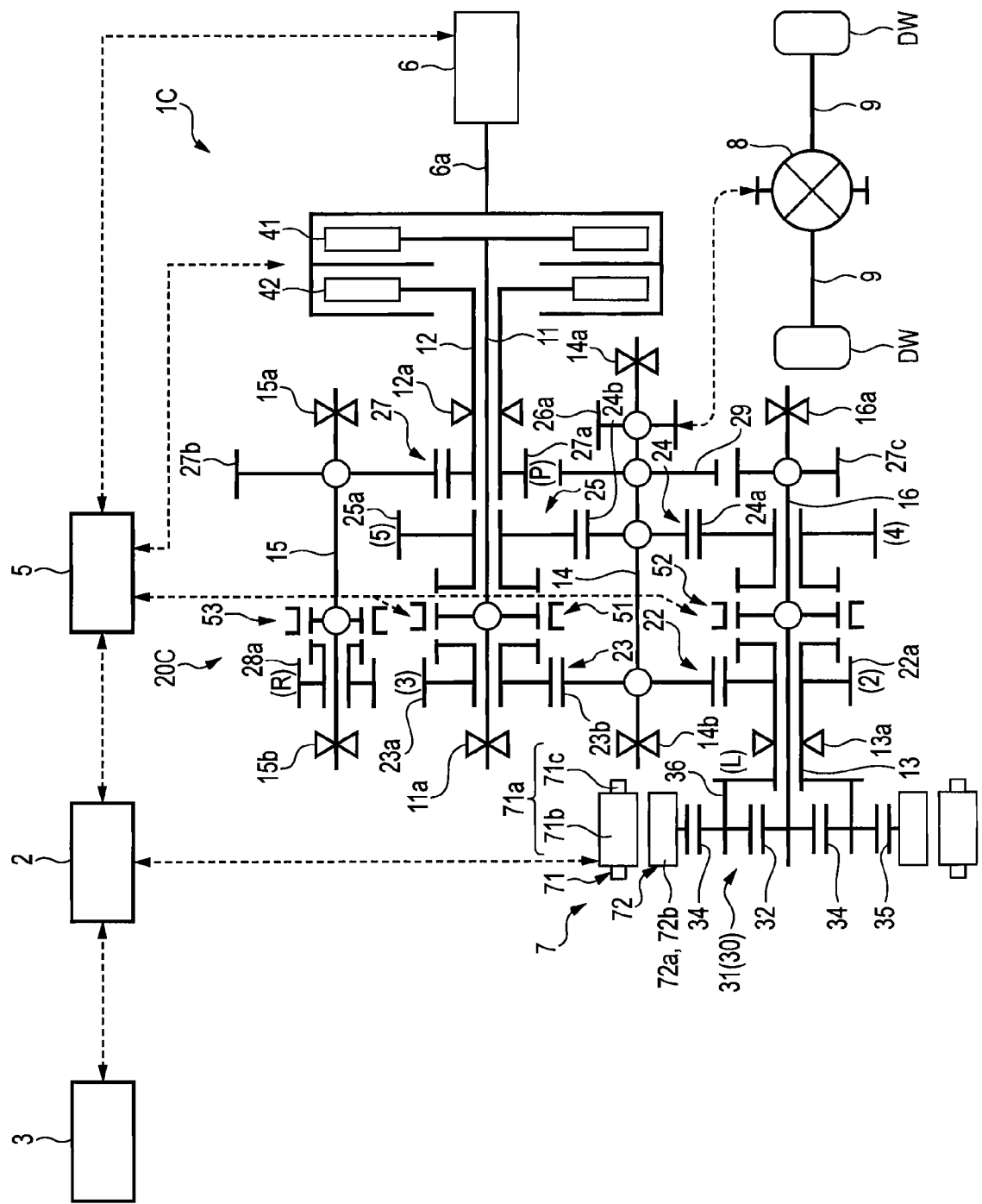
FIG. 39 is a view schematically showing a power output apparatus according to a fourth embodiment of the invention.

Next, a power output apparatus according to a fourth embodiment of the invention will be described with reference to FIG. 39. In addition, the power output apparatus 1C of a fourth embodiment has the same construction as the power output apparatus 1A of a second embodiment, except that the connecting position between a planetary gear mechanism and a transmission which constitutes a power combination mechanism differs. For this reason, the same portions as or portions equivalent to those of the power output apparatus 1A of the second embodiment are denoted by the same or equivalent reference numerals, and the description thereof is simplified or omitted.

Accordingly, the transmission 20C of this embodiment is adapted such that the driving gear 23a for third speed and the driving gear 25a for fifth speed that are odd-numbered speed change stages are provided around the first main shaft 11 (second transmission shaft) that is one transmission shaft of the two transmission shafts, the driving gear 22a for second speed and the driving gear 24a for fourth speed that are even-numbered speed change stages are provided at the second intermediate shaft 16 (first transmission shaft) that is the other transmission shaft of the two transmission shafts, and the sun gear 32 of the planetary gear mechanism 31 which constitutes the power combination mechanism 30 is attached to the second intermediate shaft 16. Also, the first main shaft 11 is connected to the engine 6 via the first clutch 41 (the second connecting/disconnecting section), and the second intermediate shaft 16 is connected to the engine 6 via the second clutch 42 (the first connecting/disconnecting section) provided at the second main shaft 12.

More specifically, the first main shaft 11 is supported by a bearing 11a fixed to the casing (not shown) on the side opposite to the engine 6, and the connecting shaft 13 is adapted to be shorter than the second intermediate shaft 16 in a hollow shape, is relatively rotatably arranged so as to cover the second intermediate shaft 16 on the side opposite to the engine 6, and is supported by the bearing 13a fixed to the casing (not shown). Additionally, the driving gear 22a for second speed is attached to the connecting shaft 13 on the side of the engine 6, and the carrier 36 of the planetary gear mechanism 31 is attached to the connecting shaft on the side opposite to the engine 6 across the bearing 13a. Accordingly, the carrier 36 and the driving gear 22a for second speed which are attached to the connecting shaft 13 are adapted to rotate integrally by the revolution of the planetary gear 34.

Also, the sun gear 32 of the planetary gear mechanism 31 is attached to the portion of the second intermediate shaft 16 on the side opposite to the engine 6 so that the transmission of power to the sun gear 32 from the crankshaft 6a can be connected or disconnected by the second clutch 42 connected to the second main shaft 12.

The power output apparatus 1C constructed in this way also has the same operation and effects as the first to third embodiments. In addition, this embodiment can also be adapted to be able to cope with an emergency, such as a case where the planetary gear mechanism 31 breaks down, by providing the first main shaft 11 including odd-numbered speed change stages with the driving gear 21a for first speed, and attaching the driven gear 21b for first speed, which constitutes the gear pair 21 for first speed, to the counter shaft 14, similarly to the third embodiment.

Fifth Embodiment

Figure 40:
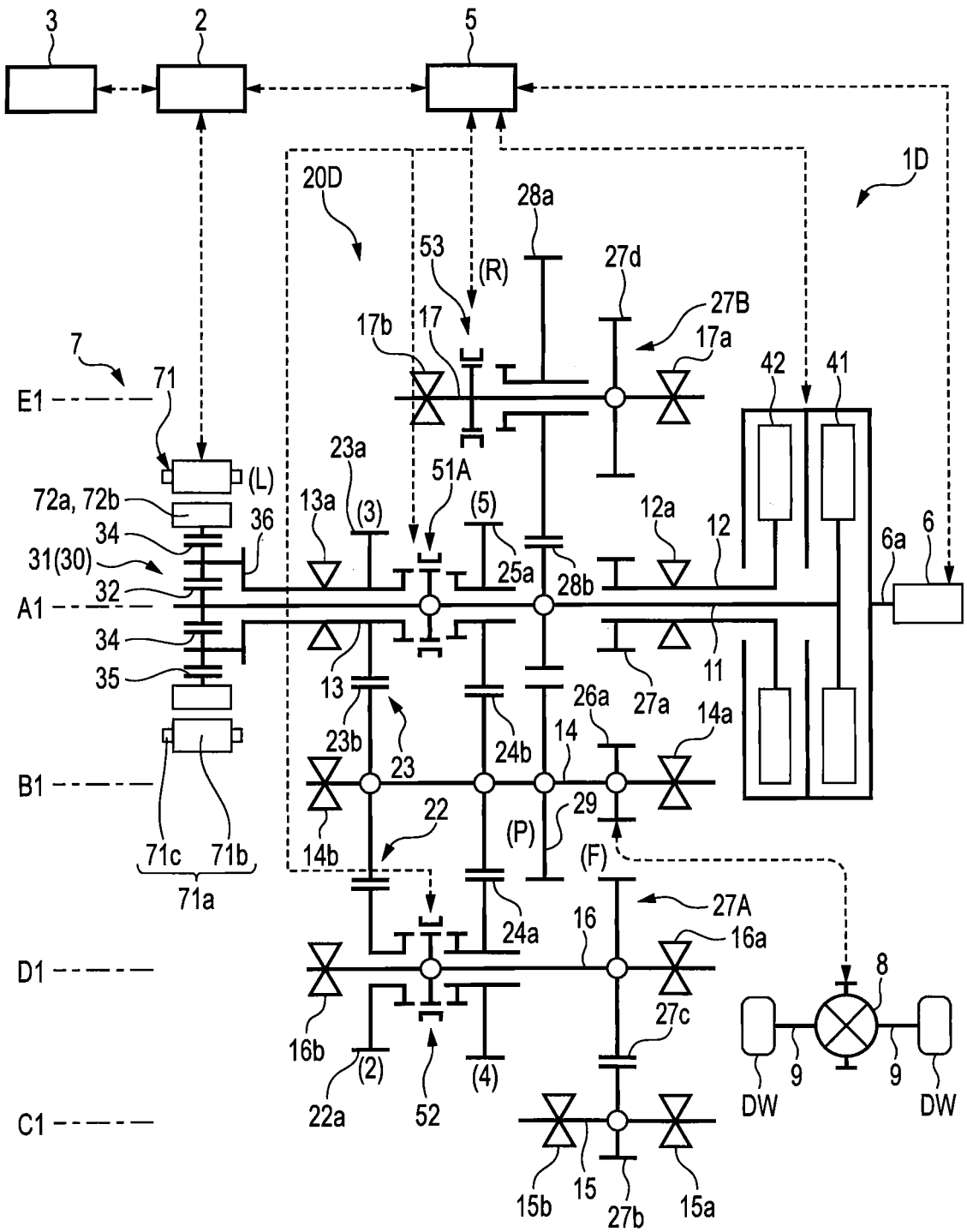
FIG. 40 is a view schematically showing a power output apparatus according to a fifth embodiment of the invention.

Next, a power output apparatus according to a fifth embodiment of the invention will be described with reference to FIG. 40. In addition, the power output apparatus 1D of the fifth embodiment has the same construction as the power output apparatus 1A of the second embodiment except for the construction of a gear train for reverse. For this reason, the same portions as or portions equivalent to those of the power output apparatus 1A of the second embodiment are denoted by the same or equivalent reference numerals, and the description thereof is simplified or omitted.

In the transmission 20D of this embodiment, only the first idle driven gear 27b which engages with the idle driving gear 27a attached to the second main shaft 12 is attached to the first intermediate shaft 15. The first idle driven gear 27b constitutes a first idle gear train 27A along with the idle driving gear 27a attached to the second main shaft 12 and the second idle driven gear 27c attached to the second intermediate shaft 16, and by connecting the second clutch 42, the counter shaft 6a of the engine 6 is connected to the second intermediate shaft 16 that is one transmission shaft of the two transmission shafts.

On the other hand, the driving gear 28a for reverse is relatively rotatably provided at a reverse shaft 17 supported by bearings 17a and 17b so as to be rotatable about a rotational axis E1 parallel to the rotational axis A1, engages with the reverse driven gear 28b attached to the first main shaft 11, and constitutes the gear pair 28 for reverse. Additionally, a third idle driven gear 27d which engages with the first idle driven gear 27b attached to the first intermediate shaft 15 is attached to the reverse shaft 17. The third idle driven gear 27d constitutes a second idle gear train 27B along with the idle driving gear 27a and the first idle driven gear 27b. Moreover, the reverse shifter 53 which connects or disconnects the reverse shaft 17 and the driving gear 28a for reverse is provided on the side of the driving gear 28a for reverse opposite to the engine 6. Also, when the reverse shifter 53 is in an engaged state in the connecting position for reverse, the reverse shaft 17 and the driving gear 28a for reverse rotate integrally, and when the reverse shifter 53 is in the neutral position, the reverse shaft 17 and the driving gear 28a for reverse rotate relative to each other.

The power output apparatus 1D constructed in this way is realized by bringing the reverse shifter 53 into an engaged state in the connecting position for reverse from its initial state, and applying the motor torque in the reverse direction to the motor 7, thereby fastening the second clutch 42. Thereby, the torque of the engine 6 is transmitted to the sun gear 32 of the planetary gear mechanism 30 via the second main shaft 12, the second idle gear train 27B (the idle driving gear 27a, the first idle driven gear 27b, and the third idle driven gear 27d), the reverse shaft 17, the gear pair 28 for reverse (the driving gear 28a for reverse and the driven gear 28b for reverse), and the first main shaft 11, the engine torque and the motor torque are combined at the carrier 36, and the combined torque is transmitted to the driving wheels DW and DW via the connecting shaft 13, the gear pair 23 for third speed (the driving gear 23a for third speed and the first common driven gear 23b), the counter shaft 14, the final gear 26a, the differential gear mechanism 8, and the driving shafts 9 and 9.

The power output apparatus 1D constructed in this way also has the same operation and effects as the first to fourth embodiments.

Besides, also in the power output apparatus 1D of the fifth embodiment, preferably, the ring gear 35 is connected to a locking mechanism. Then, a seventh embodiment in which the ring gear 35 is connected to the locking mechanism will hereinafter be described in detail with referring to the power output apparatus 1D of the fifth embodiment.

Sixth Embodiment

Figure 41:
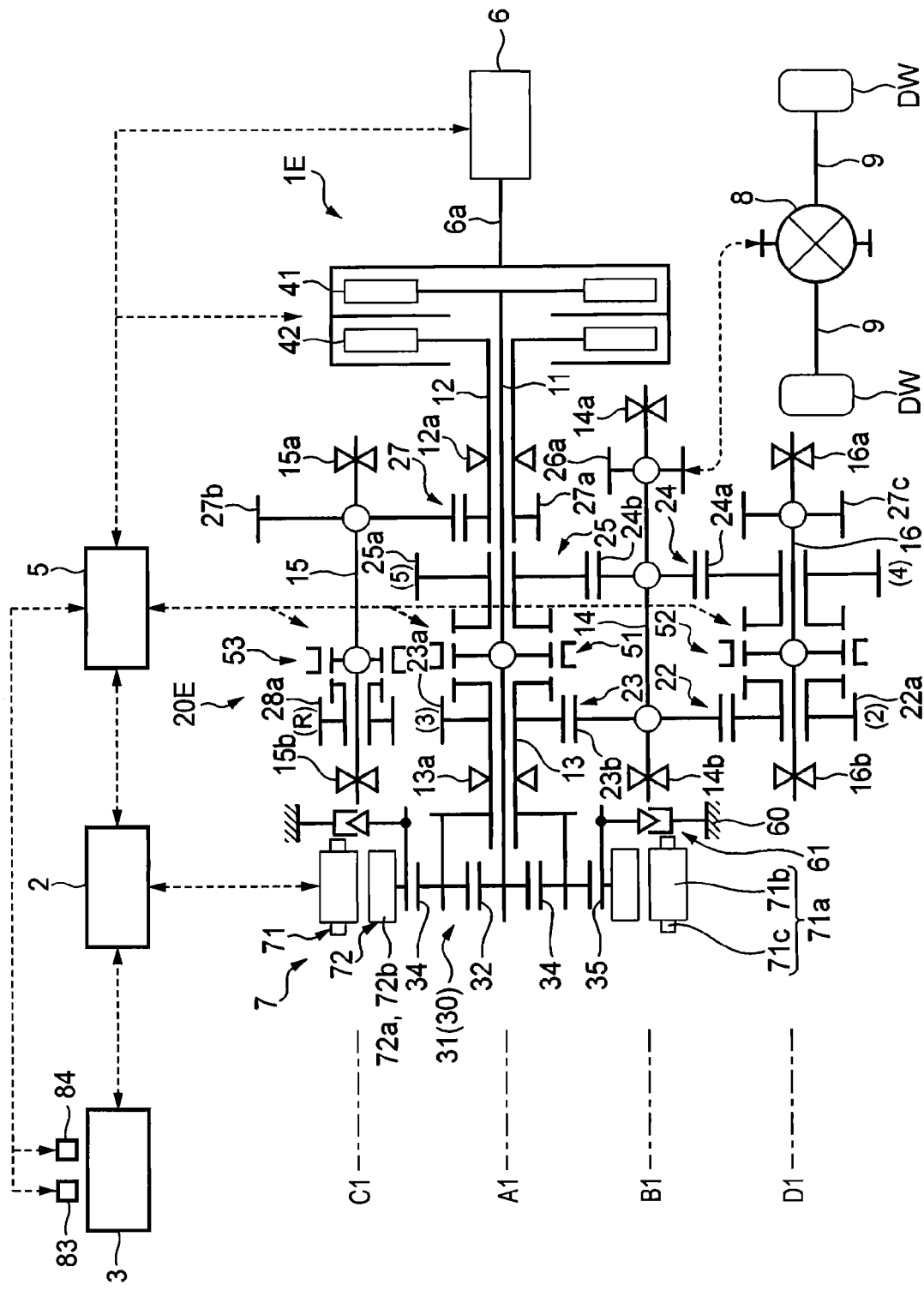
FIG. 41 is a view schematically showing a power output apparatus according to a sixth embodiment of the invention.

Next, a power output apparatus according to a sixth embodiment of the invention will be described with reference to FIGS. 41 and 42. In addition, the power output apparatus 1E of the sixth embodiment has the same construction as the power output apparatus 1A of the second embodiment except for a locking mechanism. For this reason, the same portions as or portions equivalent to those of the power output apparatus 1A of the second embodiment are denoted by the same or equivalent reference numerals, and the description thereof is simplified or omitted.

In a transmission 20E of this embodiment, the ring gear 35 is connected to a one-way clutch 61 which is adapted to be able to lock the ring gear 35 to a housing 60 which houses at least a portion of the power output apparatus 1E. The one-way clutch 61 includes a switching section of electric drive. By driving the switching section, the one-way clutch 61 is adapted to take three states including a locked state where the ring gear 35 is locked, and the rotation of the rotor 72 attached to the outer peripheral surface of the ring gear 35 is stopped, a one-way state where the one-way clutch 61 permits only the one-way rotation of the ring gear 35 and permits only the rotation of the rotor 72 in the normal direction, and an idle state where the rotation of the ring gear 35 in both directions is permitted by idling to permit the rotation of the rotor 72 in both the normal and reverse directions. The one-way clutch 61 is set to the locked state only during motor non-driving traveling which will be described later, is set to a non-locked state usually including the one-way state or the idle state, and is able to realize the same traveling modes as the power output apparatus 1A of the second embodiment. Also, the motor non-driving traveling which will be described later is performed when a defect is in the motor 7, or according to the SOC of the battery 3.

The motor non-driving traveling is a traveling function when start or acceleration cannot be performed by motor traveling and torque combination driving because the driving of the motor 7, and when driving or regeneration of the motor 7 cannot be performed according to the SOC of the battery 3 during the torque combination traveling. In addition, in FIG. 42, "Lock ON" represents a case where the one-way clutch 61 is set to the locked state, and the rotation of the motor 7 is stopped.

The case where start and acceleration cannot be performed in the torque combination driving because the driving of the motor 7 cannot be performed is exemplified as a case where the SOC of the battery 3 is equal to or less than a traveling threshold value (first predetermined value), a case where the temperature of the battery 3 is equal to or less than a critical temperature (third predetermined value) at which output cannot be normally output, a case where there is a trouble in at least one of wiring lines (not shown) which connect together the battery 3, the motor 7, the battery 3, an inverter, and the motor 7, or a case where the inverter has a temperature at which output cannot be normally performed.

Figures 42A, 42B:
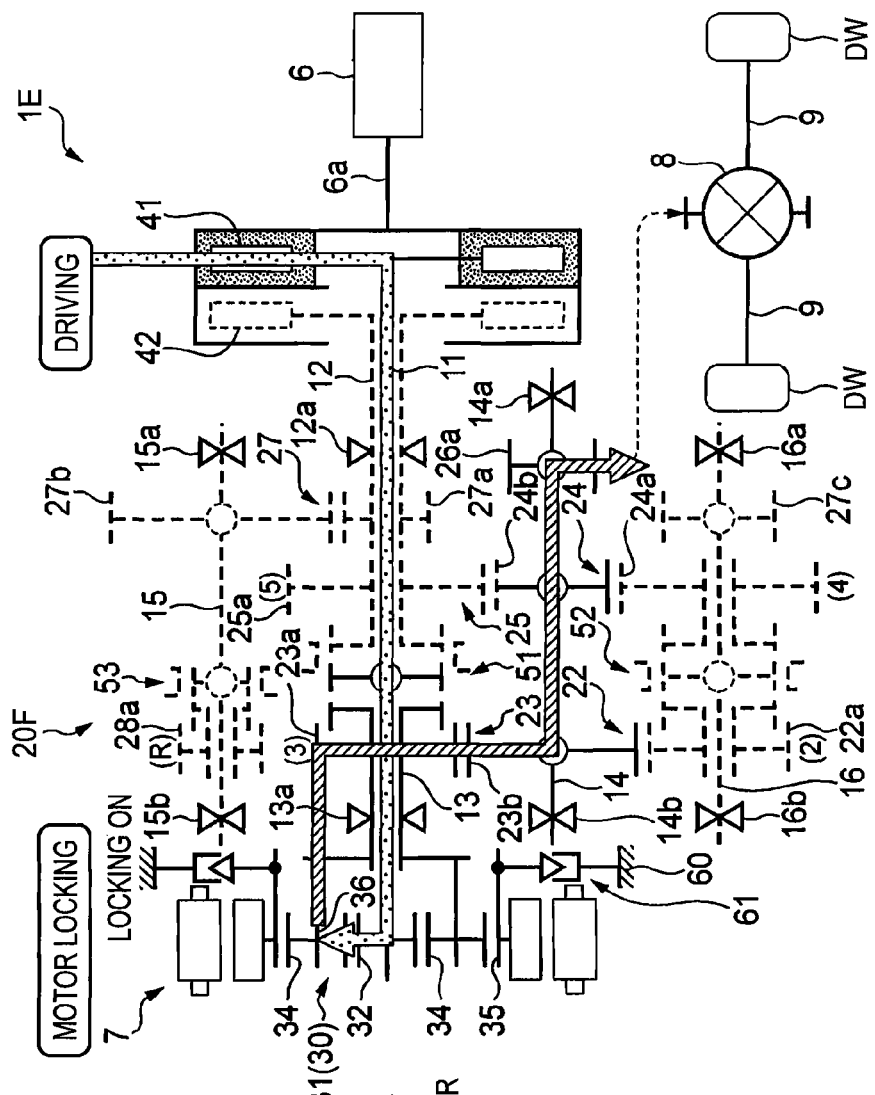
FIGS. 42A and 42B are views in a motor non-driving mode.

The motor non-driving traveling, as shown in FIGS. 42A and 42B, is performed by connecting the first clutch 41, bringing the one-way clutch 61 into a locked state by the switching section by locking control, thereby locking the ring gear 35, and stopping the rotation of the rotor 72 of the motor 7. Namely, the ring gear 35 is in the locked state by the locking control in torque combination driving. By driving the engine 6 in this state, the torque of the engine 6 is transmitted to the sun gear 32 from the first main shaft 11, and is transmitted to the driving shafts 9 and 9 via the third transmission path as the planetary gear 34 revolves while rotating between the ring gear 35 and the sun gear 32 which are fixed. By locking the ring gear 35 by the locking control in the motor non-driving traveling in this way, the start torque of a vehicle can be secured at a speed reduction ratio of the planetary gear mechanism 31 which constitutes the power combination mechanism 30, and the vehicle can be started. That is, under normal circumstances, the start torque obtained by the combined torque of the engine torque and the motor torque which is combined in the power combination mechanism 30 can be provided only by the engine torque by locking the ring gear 35 to makes the power combination mechanism 30 function as a pure reducer.

More specifically, if the SOC of the battery 3 detected by an SOC detecting device 83 is equal to or less than the traveling threshold value which is a lower limit at which the motor 7 can be driven, since the motor 7 cannot be driven, the motor non-driving traveling is performed by the locking control. After the start or acceleration of a vehicle is performed by the motor non-driving traveling, the vehicle travels in the 2nd mode (the first mode of 2nd traveling and the second mode of 2nd traveling), etc. in the above-described normal traveling which is shifted up, and non-locking control is performed during the above traveling to regenerate the motor 7, so that the SOC of the battery 3 can be increased.

Additionally, if the temperature of the battery 3 detected by the temperature detecting device 84 is equal to or less than a critical temperature at which the battery 3 cannot generate normal output and cannot drive the motor 7 properly, since the motor 7 cannot be properly driven, the motor non-driving traveling is performed by the locking control. Also, if the temperature of the battery 3 becomes higher than a critical temperature by the waste heat, air conditioning, etc. of the engine 6, the non-locking control is performed, so that torque combination can be performed by the engine 6 and the motor 7, and thereby performing torque combination driving.

Moreover, when a trouble or disconnection of the motor 7, the battery 3, and the inverter has been recognized by a comparing section (not shown) which compares a control signal output from the ECU 5 with a detection signal input to the ECU 5, the motor non-driving traveling is performed by the locking control. This makes it possible to secure the start torque of a vehicle at a speed reduction ratio of the planetary gear mechanism 31 which constitutes the power combination mechanism 30, to start a vehicle, and to avoid an additional trouble resulting from rotating the motor 7 forcibly in a state where there is a defect. At this time, troubles of other instruments can be suppressed and emergency traveling can be terminated in a short time by notifying a driver of emergency traveling by car navigation or other display devices and by guiding the driver to a service center.

On the other hand, the case where driving or regeneration of the motor 7 cannot be performed according to the SOC of the battery 3 during traveling in the torque combination driving is exemplified as a case (for example, a case where a vehicle travel along an uphill) where the SOC of the battery 3 becomes equal to or less than a traveling threshold value during traveling in the torque combination driving, and a large driving torque is required according to the traveling state of the vehicle, or a case (for example, a case where the vehicle travels along downhill) where the SOC of the battery 3 becomes equal to or more than the regeneration threshold value and the motor 7 should be regenerated according to the traveling state of the vehicle, but the motor 7 cannot be regenerated.

More specifically, when the SOC of the battery 3 detected by the SOC detecting device 83 during traveling in the torque combination driving becomes equal to or less than a traveling threshold value, and a vehicle enters an uphill by virtue of a height difference on a path of car navigation by a driving state prediction device, the motor non-driving traveling is performed by the locking control. If the SOC of the battery 3 which requires a larger torque is low the motor 7 cannot be driven when the vehicle enters an uphill, the ring gear 35 is locked by the locking control, so that a required torque can be obtained at a speed reduction ratio of the planetary gear mechanism 31 which constitutes the power combination mechanism 30, and the vehicle can travel along the uphill. Also, when the vehicle travels along a flat road or a downhill, the SOC of the battery 3 can be increased by performing the non-locking control to regenerate the motor 7.

Additionally, when the SOC of the battery 3 detected by the SOC detecting device 83 during traveling in the torque combination driving becomes equal to or more than a regeneration threshold value, and a vehicle enters a downhill by virtue of a height difference on a path of car navigation by a driving state prediction device, the motor non-driving traveling is performed by the locking control. This makes it possible to prevent the co-rotation of the motor 7 when the battery 3 is brought into an overcharging state during traveling in the torque combination driving. Also, when the vehicle enters a flat road or an uphill from a downhill, the SOC of the battery 3 can be reduced by positively using the motor 7 by the non-locking control. In addition, at this time, since the rotation in the reverse direction of the motor 7 can be controlled if the one-way clutch 61 is switched to the one-way state by the non-locking control, the regeneration of the motor 7 can be mechanically stopped during acceleration of the torque combination driving shown in FIG. 4A.

Here, the traveling threshold value, the regeneration threshold value, and the critical temperature can be properly set according to the specification of a motor or a battery.

Seventh Embodiment

Figure 43:
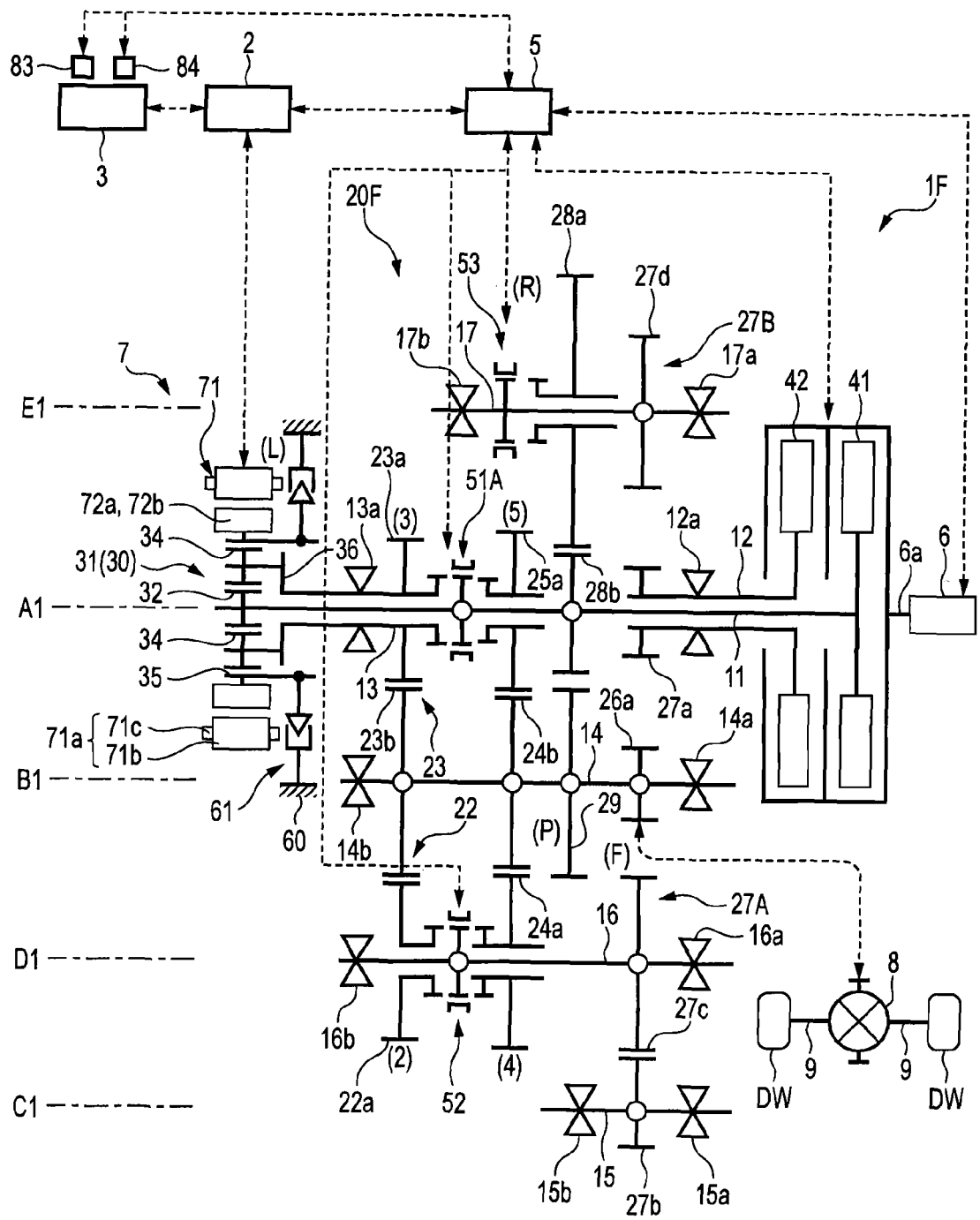
FIG. 43 is a view schematically showing a power output apparatus according to a seventh embodiment of the invention.
Figure 44:
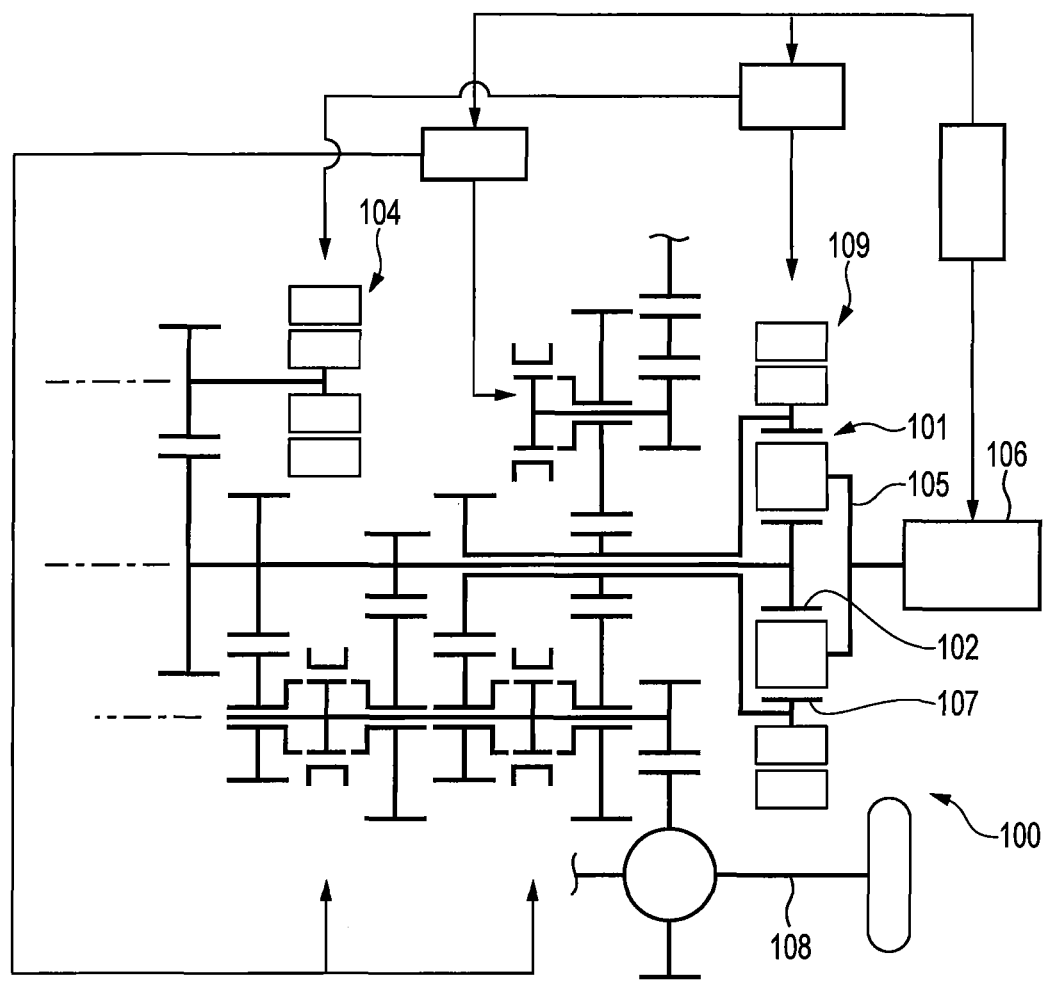
FIG. 44 is a view schematically showing a power output apparatus described in Patent Document 1.

Next, a power output apparatus according to a seventh embodiment of the invention will be described with reference to FIG. 43. In addition, the power output apparatus 1F of the seventh embodiment has the same construction as the power output apparatus 1D of the fifth embodiment except for a locking mechanism. For this reason, the same portions as or portions equivalent to those of the power output apparatus 1D of the fifth embodiment are denoted by the same or equivalent reference numerals, and the description thereof is simplified or omitted.

In a transmission 20F of this embodiment, similarly to the transmission 20E of the sixth embodiment, the ring gear 35 is connected to the one-way clutch 61 adapted to be able to lock the ring gear 35 to the housing 60 which houses at least a portion of the power output apparatus 1F. Thus, the motor non-driving traveling can be performed even in this embodiment, and the driving of the motor 7 cannot be performed. Therefore, even when start and acceleration cannot be performed in the motor traveling and the torque combination driving, or even when driving or regeneration of the motor 7 cannot be performed according to the SOC of the battery 3 during traveling in the torque combination, positive start or traveling of the vehicle can be performed.

In addition, the invention is not limited to the aforementioned respective embodiments, and modifications, improvements, etc. thereof can be suitably made. For example, the power combination mechanism is not limited to the single pinion type planetary gear mechanism, and may be a double pinion type planetary gear mechanism. Also, the power combination mechanism is not limited to a mechanical mechanism like the planetary gear mechanism, and for example, may be a mechanism which magnetically makes differential rotation like a reciprocal differential motor.

Additionally, as odd-numbered speed change stages, gears for seventh speed, ninth speed, etc. may be provided in addition to the driving gear for third speed and the driving gear for fifth speed, and as even-numbered speed change stages, gears for sixth speed, eighth speed, etc. may be provided in addition to the driving gear for second speed and the driving gear for fourth speed.

What is claimed is:
1. A power output apparatus comprising:
an internal combustion engine,
an electric motor, and
a transmission having a first transmission shaft connected to the internal combustion engine via a first connecting/disconnecting section, and a second transmission shaft connected to the internal combustion engine via a second connecting/disconnecting section, wherein the transmission includes a power combination mechanism adapted to be able to rotate first to third elements differentially from each other, the first element is connected to the first transmission shaft, the second element is connected to a driving shaft, the third element is connected to the electric motor, the second element combines power transmitted from the first element and the power transmitted from the third element, and transmits the combined power to the driving shaft, and the second transmission shaft transmits power to the driving shaft without going via the power combination mechanism.

2. The power output apparatus according to claim 1, wherein the first transmission shaft is provided with speed change stages composed of odd-numbered stages, and the second transmission shaft is provided with speed change stages composed of even-numbered stages.

3. The power output apparatus according to claim 1, wherein the first transmission shaft is provided with speed change stages composed of even-numbered stages, and the second transmission shaft is provided with speed change stages composed of odd-numbered stages.

4. The power output apparatus according to claim 1, wherein the transmission includes a counter shaft arranged parallel to the first and second transmission shafts, the first transmission shaft includes a driving gear which rotates integrally with the second element and is rotatable relative to the first transmission shaft, and a shifter which connects or disconnects the first transmission shaft and the driving gear, the counter shaft includes a driven gear which engages with the driving gear, and a final gear connected to the driving shaft, the driving gear and the driven gear constitute a speed change gear pair, and a gear ratio of the power combination mechanism and the speed change gear pair is set so that the combined power of the internal combustion engine and the electric motor to be transmitted to the driving shaft becomes equivalent to a first speed by connecting the first connecting/disconnecting section, driving the internal combustion engine, and driving the electric motor or regenerating electrical energy by using the electric motor in a state where the shifter has disconnected the first transmission shaft and the driving gear.

5. The power output apparatus according to claim 1, wherein the transmission includes a counter shaft arranged parallel to the first and second transmission shafts, the first transmission shaft includes a driving gear for third speed which rotates integrally with the second element, and is rotatable relative to the first transmission shaft, and a first speed change shifter which connects or disconnects the first transmission shaft and the driving gear for third speed, the second transmission shaft includes a driving gear for second speed which is rotatable relative to the second transmission shaft, and a second speed change shifter which connects or disconnects the second transmission shaft and the driving gear for second speed, the counter shaft includes a first common driven gear which engages with the driving gear for third speed and the driving gear for second speed, and a final gear connected to the driving shaft, the driving gear for third speed and the first common driven gear constitute a gear pair for third speed, the driving gear for second speed and the first common driven gear constitute a gear pair for second speed, and a gear ratio of the power combination mechanism and the gear pair for third speed is set so that a combined power of the internal combustion engine and the electric motor to be transmitted to the driving shaft becomes equivalent to a first speed by connecting the first connecting/disconnecting section, driving the internal combustion engine, and driving the electric motor or regenerating electrical energy by using the electric motor in a state where the first speed change shifter has disconnected the first transmission shaft and the driving gear for third speed.

6. The power output apparatus according to claim 5, wherein first speed traveling is performed by connecting the first connecting/disconnecting section in a state where the first speed change shifter disconnects the first transmission shaft and the driving gear for third speed, regenerating electrical energy by using the electric motor in a state where the electric motor is rotating in a reverse direction, and driving the electric motor to rotate the electric motor in a forward direction in a state where the number of revolutions of the second element is equal to or more than a predetermined number of revolutions.

7. The power output apparatus according to claim 5, wherein power is not transmitted to the driving shaft from the second element by connecting the first connecting/disconnecting section to idle the electric motor during idling of the internal combustion engine.

8. The power output apparatus according to claim 5, wherein power of the electric motor is transmitted to the internal combustion engine via the first element from the third element to start the internal combustion engine, by connecting the first connecting/disconnecting section and locking the second element to drive the electric motor in a reverse direction.

9. The power output apparatus according to claim 5, wherein power of the internal combustion engine is transmitted to the electric motor via the third element from the first element, and is regenerated in the electric motor, by connecting the first connecting/disconnecting section and locking the second element to drive the internal combustion engine.

10. The power output apparatus according to claim 6, further comprising:

a required torque setting section which sets a required torque to be transmitted to the driving shaft, wherein according to the required torque, the first connecting/disconnecting section is connected to transmit torque of the internal combustion engine to the second element from the first element, and the electric motor is driven or regenerated to transmit torque of the electric motor to the second element from the third element, so that a combined torque of the internal combustion engine and the electric motor is transmitted to the driving shaft via the second element.

11. The power output apparatus according to claim 10, wherein
torque of the electric motor is controlled with respect to the required torque from the required torque setting section so that torque of the internal combustion engine is within a range of a highest number of revolutions from an engine stall region.

12. The power output apparatus according to claim 11, wherein
with respect to the required torque from the required torque setting section,
the internal combustion engine is driven in a proper driving region of the internal combustion engine,
torque of the internal combustion engine supplied to the second element from the first element, and the required torque are compared with each other to drive or regenerate the electric motor,
the electric motor is driven at a rated output or a maximum number of revolutions when the electric motor exceeds the rated output or the maximum number of revolutions, and
torque of the electric motor supplied to the second element from the third element and the required torque are compared with each other to control the torque of the internal combustion engine.

13. The power output apparatus according to claim 5, wherein
second speed traveling is performed by connecting the second transmission shaft and the driving gear for second speed by the second speed change shifter, and connecting the second connecting/disconnecting section to transmit power of the internal combustion engine to the driving shaft via the gear pair for second speed from the second transmission shaft.

14. The power output apparatus according to claim 13, wherein
in the second speed traveling, traveling is performed while assisting or regeneration is made by the electric motor by further connecting the first connecting/disconnecting section to drive or regenerate the electric motor.

15. The power output apparatus according to claim 13, wherein
in the second speed traveling, traveling is performed while assisting or regeneration is made by the electric motor by connecting the first transmission shaft and the driving gear for third speed by the first speed change shifter to lock the power combination mechanism, and driving the electric motor or regenerating electrical energy by using the electric motor.

16. The power output apparatus according to claim 5, wherein
third speed traveling is performed by connecting the first transmission shaft and the driving gear for third speed by the first speed change shifter to lock the power combination mechanism, and connecting the first connecting/disconnecting section to transmit power of the internal combustion engine to the driving shaft via the gear pair for third speed from the first transmission shaft.

17. The power output apparatus according to claim 16, wherein
in the third speed traveling, traveling is performed while assisting or regeneration is made by the electric motor by driving the electric motor or regenerating electrical energy by using the electric motor.

18. The power output apparatus according to claim 5, wherein
an electric vehicle traveling is performed by disconnecting the first connecting/disconnecting section and the second connecting/disconnecting section, connecting the first transmission shaft and the driving gear for third speed by the first speed change shifter to lock the power combination mechanism, and driving the electric motor to transmit the power of the electric motor to the driving shaft via the gear pair for third speed from the power combination mechanism.

19. The power output apparatus according to claim 18, wherein
in the electric vehicle, travelling is performed by connecting the first connecting/disconnecting section to start the internal combustion engine by a start torque transmitted to the internal combustion engine via the first transmission shaft from the power combination mechanism, and transmitting torque, which is obtained by deducting the start torque from the torque of the electric motor transmitted from the power combination mechanism, to the driving shaft via the gear pair for third speed.

20. The power output apparatus according to claim 18, wherein
in the electric vehicle, travelling is performed by connecting the second connecting/disconnecting section to start the internal combustion engine by a start torque transmitted to the internal combustion engine via the gear pair for second speed from torque of the electric motor transmitted to the gear pair for third speed from the power combination mechanism, and transmitting the torque, which is obtained by deducting the start torque from the torque of the electric motor transmitted from the power combination mechanism, to the driving shaft.

21. The power output apparatus according to claim 5, wherein
the first transmission shaft further includes a driving gear for fifth speed which is rotatable relative to the first transmission shaft,
the second transmission shaft further includes a driving gear for fourth speed which is rotatable relative to the second transmission shaft,
the counter shaft includes a second common driven gear which engages with the driving gear for fifth speed and the driving gear for fourth speed,
the first speed change shifter further connects and disconnects the first transmission shaft and the driving gear for fifth speed,
the second speed change shifter further connects or disconnects the second transmission shaft and the driving gear for fourth speed,
the driving gear for fifth speed and the second common driven gear constitute a gear pair for fifth speed, and
the driving gear for fourth speed and the second common driven gear constitute a gear pair for fourth speed.

22. The power output apparatus according to claim 21, wherein
second speed traveling is performed by connecting the second transmission shaft and the driving gear for second speed by the second speed change shifter, and connecting the second connecting/disconnecting section to transmit the power of the internal combustion engine to the driving shaft via the gear pair for second speed from the second transmission shaft, and
in the second speed traveling, traveling is performed while assisting or regeneration is made by the electric motor by connecting the first transmission shaft and the driving gear for fifth speed by the first speed change shifter to drive or regenerate the electric motor.

23. The power output apparatus according to claim 21, wherein
fourth speed traveling is performed by connecting the second transmission shaft and the driving gear for fourth speed by the second speed change shifter, and connecting the second connecting/disconnecting section to transmit the power of the internal combustion engine to the driving shaft via the gear pair for fourth speed from the second transmission shaft.

24. The power output apparatus according to claim 23, wherein
in the fourth speed traveling, traveling is performed while assisting or regeneration is made by the electric motor by further connecting the first connecting/disconnecting section to drive or regenerate the electric motor.

25. The power output apparatus according to claim 23, wherein
in the fourth speed traveling, traveling is performed while assisting or regeneration is made by the electric motor by connecting the first transmission shaft and the driving gear for third speed by the first speed change shifter to lock the power combination mechanism, and driving the electric motor or regenerating electrical energy by using the electric motor.

26. The power output apparatus according to claim 23, wherein
in the fourth speed traveling, traveling is performed while assisting or regeneration is made by the electric motor by connecting the first transmission shaft and the driving gear for fifth speed by the first speed change shifter to drive or regenerate the electric motor.

27. The power output apparatus according to claim 21, wherein
fifth speed traveling is performed by connecting the first transmission shaft and the driving gear for fifth speed by the first speed change shifter, and connecting the first connecting/disconnecting section to transmit the power of the internal combustion engine to the driving shaft via the gear pair for fifth speed from the first transmission shaft.

28. The power output apparatus according to claim 27, wherein
in the fifth speed traveling, traveling is performed while assisting or regeneration is made by the electric motor by driving the electric motor or regenerating electrical energy by using the electric motor.

29. The power output apparatus according to claim 27, wherein
electric vehicle traveling is performed by disconnecting the first connecting/disconnecting section and the second connecting/disconnecting section, connecting the first transmission shaft and the driving gear for fifth speed by the first speed change shifter to drive the electric motor.

30. The power output apparatus according to claim 21, wherein
the transmission includes an input shaft which is relatively rotatably arranged so as to cover the periphery of the first transmission shaft and is connected to the internal combustion engine via the second connecting/disconnecting section, and an intermediate shaft arranged parallel to the first and second transmission shafts,
the input shaft includes an idle driving gear,
the intermediate shaft includes a first idle driven gear which engages with the idle driving gear, a driving gear for reverse which engages with the first common driven gear and which is rotatable relative to the intermediate shaft, and a reverse shifter which connects or disconnects the intermediate shaft and the driving gear for reverse,
the second transmission shaft further includes a second idle driven gear which engages with the first idle driven gear, and
the driving gear for reverse and the first common driven gear constitute a gear pair for reverse.

31. The power output apparatus according to claim 30, wherein
reverse traveling is performed by connecting the intermediate shaft and the driving gear for reverse by the reverse shifter, connecting the second connecting/disconnecting section, and driving the internal combustion engine to transmit the power of the internal combustion engine to the driving shaft via the gear pair for reverse from the intermediate shaft.

32. The power output apparatus according to claim 31, wherein
in the reverse traveling, reverse traveling is performed while assisting is made by the electric motor by connecting the first transmission shaft and the driving gear for fifth speed by the first speed change shifter to drive the electric motor in the reverse direction.

33. The power output apparatus claim 30, wherein
the transmission includes an input shaft which is relatively rotatably arranged so as to cover the periphery of the first transmission shaft and is connected to the internal combustion engine via the second connecting/disconnecting section, and an intermediate shaft and a reverse shaft which are arranged parallel to the first and second transmission shafts,
the input shaft includes an idle driving gear,
the intermediate shaft includes a first idle driven gear which engages with the idle driving gear,
the second transmission shaft further includes a second idle driven gear which engages with the first idle driven gear,
the first transmission shaft further includes a driven gear for reverse,
the reverse shaft includes a third idle driven gear which engages with the first idle driven gear, a driving gear for reverse which engages with the driven gear for reverse and is rotatable relative to the reverse shaft, and a reverse shifter which connects and disconnects the reverse shaft and the driving gear for reverse, and
the driving gear for reverse and the driven gear for reverse constitute the gear pair for reverse.

34. The power output apparatus according to claim 33, wherein
reverse traveling is performed by connecting the reverse shaft and the driving gear for reverse by the reverse shifter and connecting the second connecting/disconnecting section, and driving the internal combustion engine and driving the electric motor in the reverse direction to combine the power of the internal combustion engine and the power of the electric motor.

35. The power output apparatus according to claim 8, wherein
the counter shaft includes a parking gear which constitutes a parking locking mechanism, and
a locking torque is made to act on the second element from the parking gear.

36. The power output apparatus according to claim 30, wherein
when the first connecting/disconnecting section is connected and the second element is locked to drive the internal combustion engine so as to perform regeneration by the electric motor, the intermediate shaft and the driving gear for reverse are connected and the second connecting/disconnecting section are connected while being slipped, by the reverse shifter, and the torque in the reverse direction is made to act on the first common driven gear from the driving gear for reverse to offset the torque in the normal direction generated to the second element.

37. The power output apparatus according to claim 6, wherein
if the state of charge of a battery has reached a regeneration limit when first speed traveling is performed while the internal combustion engine is driven and the electric motor is regenerated, traveling is performed by connecting the second transmission shaft and the driving gear for second speed by the second speed change shifter, and connecting the first connecting/disconnecting section and the second connecting/disconnecting section while being slipped.

38. The power output apparatus according to claim 6, wherein
if the state of charge of a battery has reached a regeneration limit when shifting to electric vehicle traveling is made during first speed traveling while the internal combustion engine is driven and the electric motor is regenerated, traveling is performed by further connecting the second transmission shaft and the driving gear for second speed by the second speed change shifter, and connecting the second connecting/disconnecting section while being slipped.

39. The power output apparatus according to claim 18, wherein
when the electric motor continues rotating at the same number of revolutions for a predetermined period of time during the electric vehicle traveling, the power of the electric motor is fluctuated, and a brake is actuated in cooperation.

40. The power output apparatus according to claim 1, wherein
at least one of the first connecting/disconnecting section and the second connecting/disconnecting section is a dry clutch.

41. The power output apparatus according to claim 1, wherein
the power combination mechanism is a planetary gear mechanism including a sun gear and a ring gear which are arranged on the same axis, a plurality of planetary gears which engage with the ring gear and the sun gear, and a carrier which rotatably supports the plurality of planetary gears, and
the first element is the sun gear, the second element is the carrier, and the third element is the ring gear.

42. The power output apparatus according to claim 1, wherein
some or all of a rotor, a stator, or winding portions, which constitute the electric motor, are arranged so as to overlap the power combination mechanism in the axial direction.

43. The power output apparatus according to claim 1, wherein
the third element is connected to a locking mechanism capable of locking the third element.

44. The power output apparatus according to claim 43, wherein
first speed traveling is performed by locking the third element by the locking mechanism to stop the rotation of the electric motor, and driving the internal combustion engine to transmit the power of the internal combustion engine to the driving shaft via the first and second elements.

45. The power output apparatus according to claim 43, wherein
the locking mechanism includes a one-way clutch capable of switching a state where the third element is locked to stop the rotation of the electric motor, a state where only one-way rotation of the third element is permitted to permit only the rotation of the electric motor in a normal direction, and a state where the rotation of the third element in both directions is permitted to permit the rotation of the electric motor in both the normal and reverse directions, and
the one-way clutch locks the third element during locking control to stop the rotation of the electric motor.

46. The power output apparatus according to claim 44, further comprising:
an electric storage device which supplies electric power to the electric motor, wherein
the locking mechanism locks the third element and stops the rotation of the electric motor, if the SOC of the electric storage device is equal to or less than a first predetermined value and the electric motor cannot be driven.

47. The power output apparatus according to claim 44, further comprising:
an electric storage device which supplies electric power to the electric motor, wherein
the locking mechanism locks the third element and stops the rotation of the electric motor, if the state of charge of the electric storage device is equal to or more than a second predetermined value and the electric motor cannot be regenerated.

48. The power output apparatus according to claim 46, further comprising:
a driving state prediction device which predicts a driving state, wherein
the locking mechanism is operated on the basis of the information on the driving state prediction device according to the state of the state of charge of the electric storage device.

49. The power output apparatus according to claim 44, further comprising:
an electric storage device which supplies electric power to the electric motor, and
a temperature detecting device which detects the temperature of the electric storage device, wherein
the locking mechanism locks the third element to stop the rotation of the electric motor, if the temperature of the electric storage device is equal to or less than a third predetermined value where output cannot be normally performed.

50. The power output apparatus according to claim 43, further comprising:
a control unit which controls the electric motor, and
wiring lines which connect the electric motor with the electric storage device, wherein
the locking mechanism locks the third element and stops the rotation of the electric motor, if there is a defect in at least one of the electric motor, the electric storage device, the control unit, and the wiring lines.

51. The power output apparatus according to claim 50, further comprising:

a notification section which notifies a driver of emergency traveling, if there is a defect in at least one of the electric motor, the electric storage device, the control unit, and the wiring lines.

52. A power output apparatus comprising:

an internal combustion engine, an electric motor, and a transmission having a first transmission shaft connected to the internal combustion engine via a first connecting/disconnecting section, and a second transmission shaft connected to the internal combustion engine via a second connecting/disconnecting section, wherein the transmission is a planetary gear mechanism including a sun gear and a ring gear which are arranged on the same axis, a plurality of planetary gears which engage with the ring gear and the sun gear, and a carrier which rotatably supports the plurality of planetary gears, the sun gear is connected to the first transmission shaft, the carrier is connected to a driving shaft, the ring gear is connected to the electric motor, and the second transmission shaft transmits power to the driving shaft without going via the planetary gear mechanism.

53. The power output apparatus according to claim 9, wherein the counter shaft includes a parking gear which constitutes a parking locking mechanism, and a locking torque is made to act on the second element from the parking gear.

54. The power output apparatus according to claim 47, further comprising:

a driving state prediction device which predicts a driving state, wherein the locking mechanism is operated on the basis of the information on the driving state prediction device according to the state of the state of charge of the electric storage device.

* * * * *